US012459987B2

United States Patent
Herold et al.

(10) Patent No.: US 12,459,987 B2
(45) Date of Patent: Nov. 4, 2025

(54) MONOCLONAL ANTIBODIES FOR PREVENTION AND TREATMENT OF HERPES SIMPLEX VIRAL INFECTIONS

(71) Applicants: ALBERT EINSTEIN COLLEGE OF MEDICINE, Bronx, NY (US); DUKE UNIVERSITY, Durham, NC (US)

(72) Inventors: Betsy C. Herold, Rowayton, CT (US); Garnett Kelsoe, Durham, NC (US); Masayuki Kuraoka, Durham, NC (US); Clare Burn, Bronx, NY (US); William R. Jacobs, Jr., Bronx, NY (US)

(73) Assignees: DUKE UNIVERSITY, Durham, NC (US); ALBERT EINSTEIN COLLEGE OF MEDICINE, Bronx, NY (US)

( * ) Notice: Subject to any disclaimer, the term of this patent is extended or adjusted under 35 U.S.C. 154(b) by 1004 days.

(21) Appl. No.: 17/440,452

(22) PCT Filed: Mar. 19, 2020

(86) PCT No.: PCT/US2020/023600
§ 371 (c)(1),
(2) Date: Sep. 17, 2021

(87) PCT Pub. No.: WO2020/191181
PCT Pub. Date: Sep. 24, 2020

(65) Prior Publication Data
US 2022/0162291 A1    May 26, 2022

Related U.S. Application Data

(60) Provisional application No. 62/820,495, filed on Mar. 19, 2019.

(51) Int. Cl.
*A61K 31/522* (2006.01)
*A61K 39/42* (2006.01)
*C07K 16/08* (2006.01)

(52) U.S. Cl.
CPC .......... *C07K 16/087* (2013.01); *A61K 31/522* (2013.01); *A61K 39/42* (2013.01); *C07K 2317/21* (2013.01); *C07K 2317/24* (2013.01); *C07K 2317/732* (2013.01)

(58) Field of Classification Search
None
See application file for complete search history.

(56) References Cited

U.S. PATENT DOCUMENTS

| | | |
|---|---|---|
| 4,816,567 A | 3/1989 | Cabilly et al. |
| 5,530,101 A | 6/1996 | Queen et al. |
| 5,585,089 A | 12/1996 | Queen et al. |
| 5,693,761 A | 12/1997 | Queen et al. |
| 5,693,762 A | 12/1997 | Queen et al. |
| 5,807,715 A | 9/1998 | Morrison et al. |
| 5,866,692 A | 2/1999 | Shitara et al. |
| 5,997,867 A | 12/1999 | Waldmann et al. |
| 6,054,297 A | 4/2000 | Carter et al. |
| 6,156,313 A | 12/2000 | Burton et al. |
| 6,180,370 B1 | 1/2001 | Queen et al. |
| 6,180,377 B1 | 1/2001 | Morgan et al. |
| 6,210,671 B1 | 4/2001 | Co |
| 6,331,415 B1 | 12/2001 | Cabilly et al. |
| 6,350,861 B1 | 2/2002 | Co et al. |
| 6,982,321 B2 | 1/2006 | Winter |
| 7,087,409 B2 | 8/2006 | Barbas, III et al. |
| 9,657,088 B2 | 5/2017 | Roggendorf et al. |
| 2020/0239549 A1 | 7/2020 | Mori et al. |

FOREIGN PATENT DOCUMENTS

| | | |
|---|---|---|
| EP | 0519596 A1 | 12/1992 |
| WO | 9958572 A1 | 11/1999 |
| WO | 0127160 A1 | 4/2001 |
| WO | 2015197763 A1 | 12/2015 |
| WO | 2018115003 A2 | 6/2018 |
| WO | 2019044926 A1 | 3/2019 |

OTHER PUBLICATIONS

Dondelinger, et al. Front Immunol. Oct. 16, 2018;9:2278. doi: 10.3389/fimmu.2018.02278. PMID: 30386328 (Year: 2018).*
Daumer, et al. Med Microbiol Immunol. May 2011;200(2):85-97. doi: 10.1007/s00430-010-0174-x. Epub Oct. 8, 2010. PMID: 20931340. (Year: 2011).*
Shore, et al. J. Immunol. Jan. 1976; 116(1)194-201, PMID: 173757; Abstract. (Year: 1976).*
Daumer, et al., "Characterisation of hte epitope for a herpes simplex virus glycoprotein B-specific monoclonal antibody with high protecitve capacity" Med Microbiol Immunol (2011) 200:85-97.

(Continued)

*Primary Examiner* — Benjamin P Blumel
*Assistant Examiner* — Jeffrey Mark Sifford
(74) *Attorney, Agent, or Firm* — CANTOR COLBURN LLP

(57) ABSTRACT

Provided are antibodies and antigen-binding fragments which bind to herpes simplex virus-2 (HSV-2), methods of use employing the antibodies and/or antigen-binding fragments, and pharmaceutical compositions comprising the antibodies and/or antigen-binding fragments.

27 Claims, 13 Drawing Sheets

Specification includes a Sequence Listing.

(56) References Cited

OTHER PUBLICATIONS

International Search Report mailed Nov. 19, 2020; International Appln No. PCT/US2020/023600; International Filing Date Mar. 19, 2020 (9 pgs).
Ward et al. "Binding activities of a repertoire of single immunoglobulin variable domains secreted from *Escherichia coil*" Nature; 1989; 341; 544-546.
Written Opinion mailed Nov. 19, 2020; International Appln No. PCT/US2020/023600; International Filing Date Mar. 19, 2020 (8 pgs).
Bird, et al., "Single-Chain Antigen-Binding Proteins", Science, vol. 242 (1988), pp. 423-426.
Brown, et al., "Tumor-specific Genetically Engineered Murine/Human Chimeric Monoclonal Antibody", Cancer Research, vol. 47, (1987) pp. 3577-3583.
Chothia, et al., "Canonical Structures for the Hypervariable Regions of Immunoglobulins", J. Mol. Biol., (1987) vol. 196, pp. 901-917.
Chothia, et al., "Conformations of immunoglobulin hypervariable regions", Nature, vol. 342 (1989) pp. 877-883.
Daugherty, et al., "Cloning, Expression, and Characterization of the Human Eosinophil Eotaxin Receptor", J. Exp. Med., vol. 183 (May 1996) pp. 2349-2354.
Dilillo, et al., "Broadly neutralizing hemagglutinin stalk-specific antibodies require FcγR interactions for protection against influenza virus in vivo", Nature Medicine, Jan. 2014; vol. 20 No. 2, pp. 143-153.
Harris, W. J., "Therapeutic Monoclonals", Biochemical Society Transactions, (1995), vol. 23, pp. 1035-1038.
Hurle, et al., "Protein engineering techniques for antibody humanization", Current Opinion in Biotechnology, (1994) 5:428-433.
Huston, et al., "Protein engineering of antibody bonding sites: Recovery of specific activity in an anti-digoxin single-chain Fv analogue produced in *Escherichia coli*", Proc. Natl. Acad. Sci., vol. 85, (1988) pp. 5879-5883.
Jones, et al., "Replacing the complementarity-determining regions in a human antibody with those from a mouse", Nature, vol. 321 (1986) pp. 522-525.
Kuraoka, et al., "Complex Antigens Drive Permissive Clonal Selection in Germinal Centers", Immunity. vol. 44 (2016) pp. 542-552.
Lobuglio, et al., "Mouse/human chimeric monoclonal antibody in man: Kinetics and immune response", Proc. Natl. Acad. Sci., vol. 86, (1989) pp. 4220-4224.
Paul, W., Ch. 7, "Chapter 7. Non-specific components", Fundamental Immunology, 2nd ed. Raven Press, N.Y., (1989) pp. 63-69.
Presta, L.G., "Antibody engineering", Current Opinion in Structural Biology 1992, 2:593-596.
Riechmann, et al., "Reshaping human antibodies for therapy", Nature, vol. 332, 1988, pp. 323-327.
Shaw, et al., "Characterization of a mouse/human chimeric monoclonal antibody (17-1A) to a colon cancer tumor-associated antigen", Journal of Immunology, 1987, 138:4534-4538.
Vaswani, et al., "Humanized antibodies as potential therapeutic drugs", Annals of Allergy, Asthma & Immunology, (1998) 81:105-119.
Verhoeyen, et al., "Reshaping Human Antibodies: Grafting an Antilysozyme Activity", Science, vol. 239, No. 4847 (1988) pp. 1534-1536.
Watanabe, et al., "Antibodies to a Conserved Influenza Head Interface Epitope Protect by an IgG Subtype-Depdendent Mechanism", Cell (2019) vol. 177, pp. 1124-1135.
Winter, et al., "Man-made antibodies", Nature, vol. 349, (1991) pp. 293-299.
Rudikoff al.; "Single amino acid substitution alerting antigen-binding specificity"; Proc. Natl. Acad. Sci USA, vol. 79; pp. 1979-1983 (1982).

* cited by examiner

HSV-2 G lysate

Uninfected Vero lysate

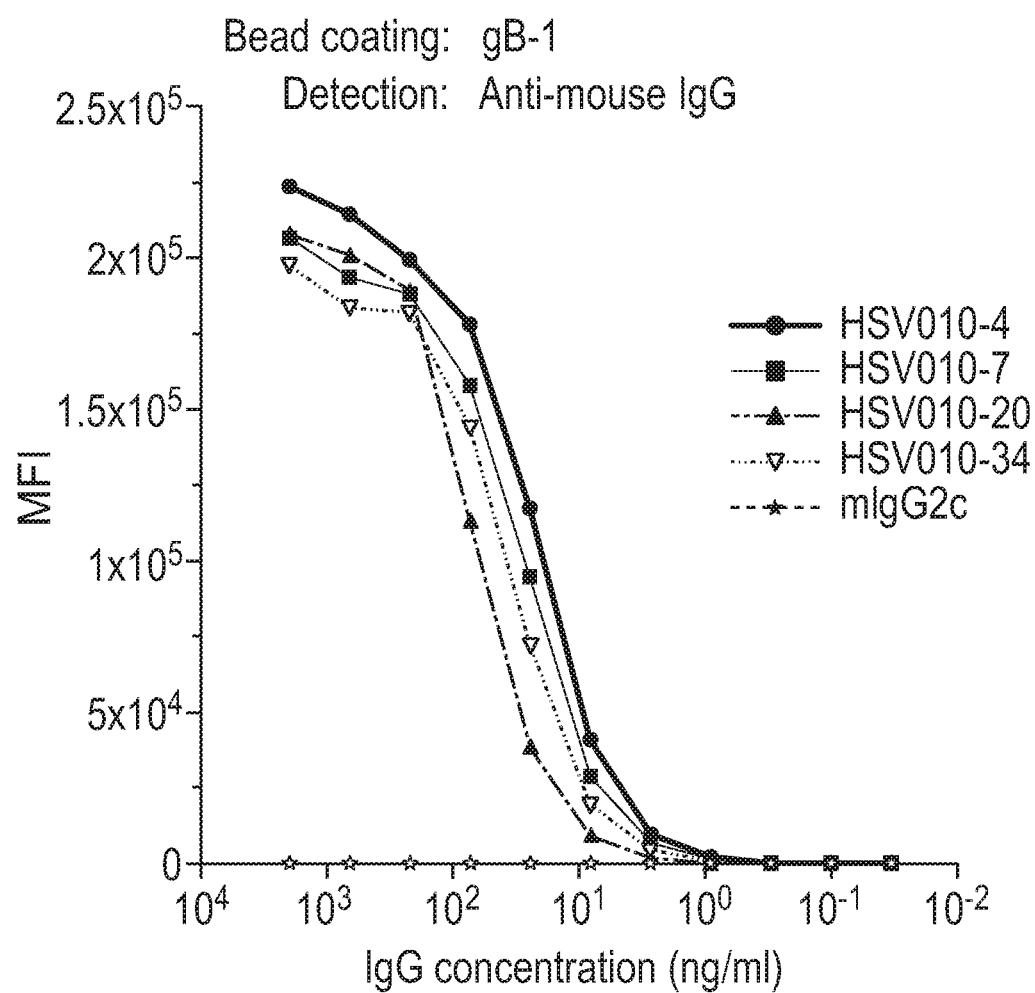

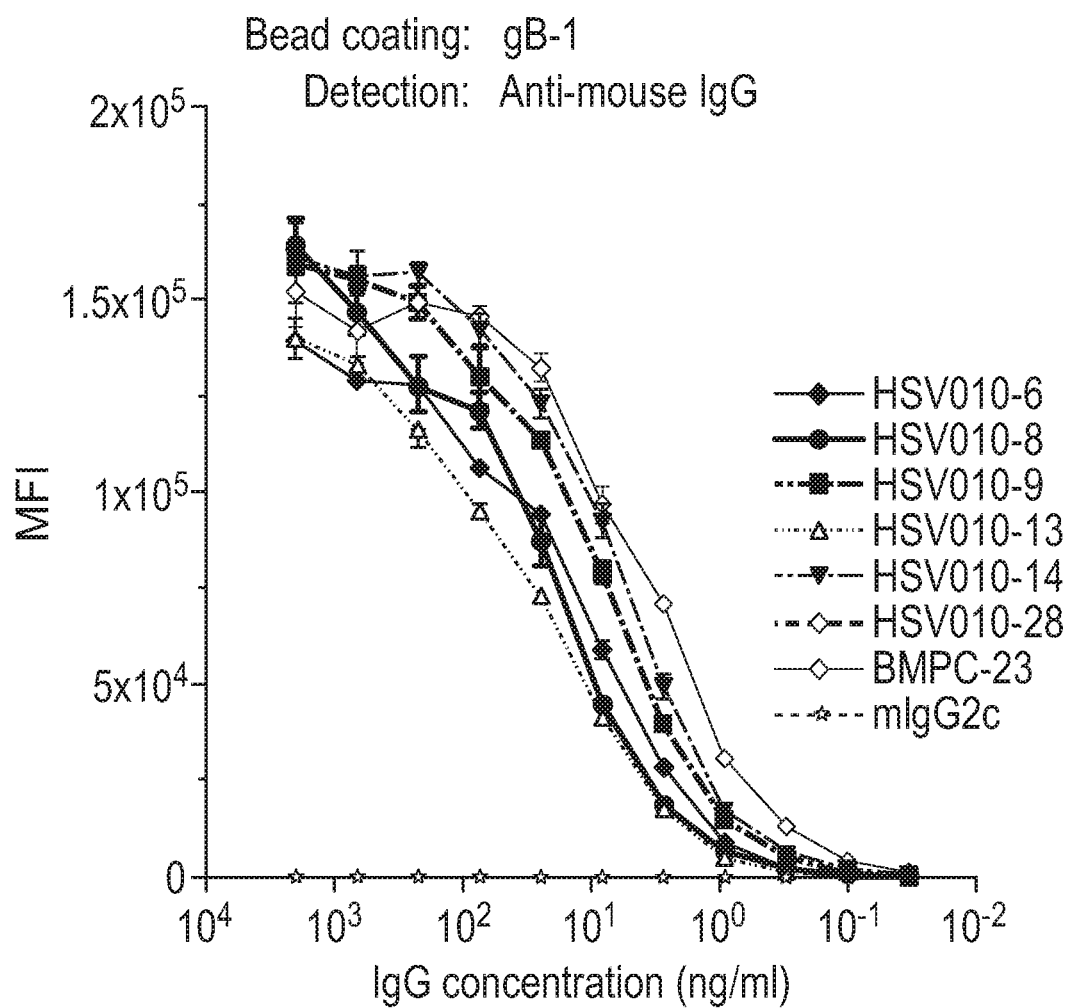

SEQUENCE LISTING

<160> NUMBER OF SEQ ID NOS: 163

<210> SEQ ID NO 1
<211> LENGTH: 8
<212> TYPE: PRT
<213> ORGANISM: Artificial sequence
<220> FEATURE:
<223> OTHER INFORMATION: Antibody heavy chain CDR1

<400> SEQUENCE: 1

Gly Tyr Ser Phe Thr Thr Tyr Asp
1               5

<210> SEQ ID NO 2
<211> LENGTH: 8
<212> TYPE: PRT
<213> ORGANISM: Artificial sequence
<220> FEATURE:
<223> OTHER INFORMATION: Antbody heavy chain CDR2

<400> SEQUENCE: 2

Ile Tyr Pro Arg Glu Gly Ser Thr
1               5

<210> SEQ ID NO 3
<211> LENGTH: 13
<212> TYPE: PRT
<213> ORGANISM: Artificial sequence
<220> FEATURE:
<223> OTHER INFORMATION: Antibody heavy chain CDR3

<400> SEQUENCE: 3

Ala Thr Tyr Gly Ser Ser Arg Tyr Tyr Thr Met Asp Tyr
1               5                   10

<210> SEQ ID NO 4
<211> LENGTH: 10
<212> TYPE: PRT
<213> ORGANISM: Artificial sequence
<220> FEATURE:
<223> OTHER INFORMATION: Antibody light chain CDR1

<400> SEQUENCE: 4

Glu Ser Val Asp Asn Phe Gly Ile Ser Phe

```
1               5              10
```

<210> SEQ ID NO 5
<211> LENGTH: 3
<212> TYPE: PRT
<213> ORGANISM: Artificial sequence
<220> FEATURE:
<223> OTHER INFORMATION: Antibody light chain CDR2

<400> SEQUENCE: 5

Ala Ala Ser
1

<210> SEQ ID NO 6
<211> LENGTH: 9
<212> TYPE: PRT
<213> ORGANISM: Artificial sequence
<220> FEATURE:
<223> OTHER INFORMATION: Antibody light chain CDR3

<400> SEQUENCE: 6

Gln Gln Ser Lys Glu Val Pro Leu Thr
1               5

<210> SEQ ID NO 7
<211> LENGTH: 9
<212> TYPE: PRT
<213> ORGANISM: Artificial sequence
<220> FEATURE:
<223> OTHER INFORMATION: Antibody heavy chain CDR1

<400> SEQUENCE: 7

Gly Tyr Ser Ile Thr Asn Gly Asn His
1               5

<210> SEQ ID NO 8
<211> LENGTH: 7
<212> TYPE: PRT
<213> ORGANISM: Artificial sequence
<220> FEATURE:
<223> OTHER INFORMATION: Antibody heavy chain CDR2

<400> SEQUENCE: 8

Ile Arg Ser Ser Gly Ser Ser
1               5

<210> SEQ ID NO 9
<211> LENGTH: 12
<212> TYPE: PRT
<213> ORGANISM: Artificial sequence
<220> FEATURE:
<223> OTHER INFORMATION: Antibody heavy chain CDR3

<400> SEQUENCE: 9

Ala Arg Gly Gly Gly Leu Arg His Tyr Phe Asp Tyr
1               5                   10

<210> SEQ ID NO 10
<211> LENGTH: 6
<212> TYPE: PRT
<213> ORGANISM: Artificial sequence
<220> FEATURE:
<223> OTHER INFORMATION: Antibody light chain CDR1

<400> SEQUENCE: 10

Gly Asn Ile His Asn Tyr
1               5

<210> SEQ ID NO 11
<211> LENGTH: 3
<212> TYPE: PRT
<213> ORGANISM: Artificial sequence
<220> FEATURE:
<223> OTHER INFORMATION: Antibody light chain CDR2

<400> SEQUENCE: 11

His Ala Glu
1

<210> SEQ ID NO 12
<211> LENGTH: 9
<212> TYPE: PRT
<213> ORGANISM: Artificial sequence
<220> FEATURE:
<223> OTHER INFORMATION: Antibody light chain CDR3

<400> SEQUENCE: 12

Gln His Phe Trp Ser Thr Pro Tyr Thr
1               5

<210> SEQ ID NO 13
<211> LENGTH: 8
<212> TYPE: PRT
<213> ORGANISM: Artificial sequence
<220> FEATURE:
<223> OTHER INFORMATION: Antibody heavy chain CDR1

<400> SEQUENCE: 13

Gly Phe Thr Phe Thr Asp Tyr Tyr
1               5

<210> SEQ ID NO 14
<211> LENGTH: 10
<212> TYPE: PRT
<213> ORGANISM: Artificial sequence
<220> FEATURE:
<223> OTHER INFORMATION: Antibody heavy chain CDR2

<400> SEQUENCE: 14

Ile Arg Asn Lys Ala Asn Gly Tyr Thr Thr
1               5                   10

<210> SEQ ID NO 15
<211> LENGTH: 12
<212> TYPE: PRT
<213> ORGANISM: Artificial sequence
<220> FEATURE:
<223> OTHER INFORMATION: Antibody heavy chain CDR3

<400> SEQUENCE: 15

Ala Cys Gly Asn Tyr Val Gly Tyr Ala Met Asp Tyr
1               5                   10

<210> SEQ ID NO 16
<211> LENGTH: 12
<212> TYPE: PRT
<213> ORGANISM: Artificial sequence
<220> FEATURE:
<223> OTHER INFORMATION: Antibody light chain CDR1

<400> SEQUENCE: 16

Gln Ser Leu Leu Asn Ser Arg Thr Arg Lys Asn Tyr
1               5                   10

<210> SEQ ID NO 17
<211> LENGTH: 3
<212> TYPE: PRT
<213> ORGANISM: Artificial sequence
<220> FEATURE:
<223> OTHER INFORMATION: Antibody light chain CDR2

<400> SEQUENCE: 17

Trp Ala Ser
1

<210> SEQ ID NO 18
<211> LENGTH: 8
<212> TYPE: PRT
<213> ORGANISM: Artificial sequence
<220> FEATURE:
<223> OTHER INFORMATION: Antibody light chain CDR3

<400> SEQUENCE: 18

Lys Gln Ser Tyr Asn Leu Tyr Thr
1               5

<210> SEQ ID NO 19
<211> LENGTH: 363
<212> TYPE: DNA
<213> ORGANISM: Artificial sequence
<220> FEATURE:
<223> OTHER INFORMATION: BMPC-23_IgH heavy chain

<400> SEQUENCE: 19
caggttcagc tgcagcagtc tggacctgag ctggtgaagc ctggggcttc agtgaagttg      60
tcctgcaagg cttctggcta cagtttcaca acctacgata taaactgggt gaaggagagg     120
cctggacagg gacttgagtg gattgggtgg atttatccta gagagggtag tacgaattac     180
aatgagaagt tcaggggcaa ggccacattg actgcagaca catcctccag tacagcgtac     240
atggagctcc acagcctgac atctgaggac tctgcggtct atttctgtgc aacctacggt     300
agtagtcgct actatactat ggactactgg ggtcaaggaa cctcagtcac cgtctcctca     360
gcc                                                                    363

<210> SEQ ID NO 20
<211> LENGTH: 121
<212> TYPE: PRT
<213> ORGANISM: Artificial sequence
<220> FEATURE:
<223> OTHER INFORMATION: BMPC-23_IgH heavy chain

<400> SEQUENCE: 20

Gln Val Gln Leu Gln Gln Ser Gly Pro Glu Leu Val Lys Pro Gly Ala
1               5                   10                  15

Ser Val Lys Leu Ser Cys Lys Ala Ser Gly Tyr Ser Phe Thr Thr Tyr
            20                  25                  30

Asp Ile Asn Trp Val Lys Glu Arg Pro Gly Gln Gly Leu Glu Trp Ile
        35                  40                  45

Gly Trp Ile Tyr Pro Arg Glu Gly Ser Thr Asn Tyr Asn Glu Lys Phe
    50                  55                  60

Arg Gly Lys Ala Thr Leu Thr Ala Asp Thr Ser Ser Ser Thr Ala Tyr
65                  70                  75                  80

Met Glu Leu His Ser Leu Thr Ser Glu Asp Ser Ala Val Tyr Phe Cys
                85                  90                  95

Ala Thr Tyr Gly Ser Ser Arg Tyr Tyr Thr Met Asp Tyr Trp Gly Gln

```
                    100                 105                 110
Gly Thr Ser Val Thr Val Ser Ser Ala
        115                 120

<210> SEQ ID NO 21
<211> LENGTH: 336
<212> TYPE: DNA
<213> ORGANISM: Artificial sequence
<220> FEATURE:
<223> OTHER INFORMATION: BMPC-23_IgL light chain

<400> SEQUENCE: 21
gacattgtgc tgacccaatc tccaacttct ttggctgtgt ctctagggca gagggccacc    60
atctcctgca gagccagcga aagtgttgat aattttggca ttagttttat gaactggttc   120
cagcagaaac aggacagcc acccaaactc ctcatctacg ctgcatccaa cctaggatcc    180
ggggtccctg ccaggtttag tggcagtggg tctgggacag acttcagcct caacatccat   240
cctatggagg atgatgatac tgcaatgtat ttctgtcagc aaagtaagga ggttccgctc   300
acgttcggtg ctgggaccaa gctggagctg aaacgg                            336

<210> SEQ ID NO 22
<211> LENGTH: 112
<212> TYPE: PRT
<213> ORGANISM: Artificial sequence
<220> FEATURE:
<223> OTHER INFORMATION: BMPC-23_IgL light chain

<400> SEQUENCE: 22

Asp Ile Val Leu Thr Gln Ser Pro Thr Ser Leu Ala Val Ser Leu Gly
1               5                   10                  15

Gln Arg Ala Thr Ile Ser Cys Arg Ala Ser Glu Ser Val Asp Asn Phe
            20                  25                  30

Gly Ile Ser Phe Met Asn Trp Phe Gln Gln Lys Pro Gly Gln Pro Pro
        35                  40                  45

Lys Leu Leu Ile Tyr Ala Ala Ser Asn Leu Gly Ser Gly Val Pro Ala
    50                  55                  60

Arg Phe Ser Gly Ser Gly Ser Gly Thr Asp Phe Ser Leu Asn Ile His
65                  70                  75                  80

Pro Met Glu Asp Asp Asp Thr Ala Met Tyr Phe Cys Gln Gln Ser Lys
                85                  90                  95

Glu Val Pro Leu Thr Phe Gly Ala Gly Thr Lys Leu Glu Leu Lys Arg
            100                 105                 110

<210> SEQ ID NO 23
<211> LENGTH: 363
<212> TYPE: DNA
<213> ORGANISM: Artificial sequence
<220> FEATURE:
<223> OTHER INFORMATION: 22D10 heavy chain

<400> SEQUENCE: 23
gatgtacagc ttcaggagtc aggacctgcc ctggtgaagc cttctcagac agtgtccctc    60
acctgcactg tcactggcta ctctatcact aatggtaatc attggtggaa ctggatccgg   120
caggtttcag gaagcaaact ggagtggtta gggtacataa ggtccagtgg tagctctgac   180
agcaatccat ctctcaaaag tcgaatctcc atcactagag acacttccaa gaaccagtta   240
ttcctgcact tgaactctat gactactgaa gatatagcca catattactg tgcaagaggg   300
gggggattac ggcactactt tgactactgg ggccaaggca ccactctcac agtctcctca   360
``` gcc                                                                    363

<210> SEQ ID NO 24
<211> LENGTH: 121
<212> TYPE: PRT
<213> ORGANISM: Artificial sequence
<220> FEATURE:
<223> OTHER INFORMATION: 22D10 heavy chain

<400> SEQUENCE: 24

Asp Val Gln Leu Gln Glu Ser Gly Pro Ala Leu Val Lys Pro Ser Gln
1               5                   10                  15

Thr Val Ser Leu Thr Cys Thr Val Thr Gly Tyr Ser Ile Thr Asn Gly
            20                  25                  30

Asn His Trp Trp Asn Trp Ile Arg Gln Val Ser Gly Ser Lys Leu Glu
        35                  40                  45

Trp Leu Gly Tyr Ile Arg Ser Ser Gly Ser Ser Asp Ser Asn Pro Ser
    50                  55                  60

Leu Lys Ser Arg Ile Ser Ile Thr Arg Asp Thr Ser Lys Asn Gln Leu
65                  70                  75                  80

Phe Leu His Leu Asn Ser Met Thr Thr Glu Asp Ile Ala Thr Tyr Tyr
                85                  90                  95

Cys Ala Arg Gly Gly Leu Arg His Tyr Phe Asp Tyr Trp Gly Gln
            100                 105                 110

Gly Thr Thr Leu Thr Val Ser Ser Ala
        115                 120

<210> SEQ ID NO 25
<211> LENGTH: 324
<212> TYPE: DNA
<213> ORGANISM: Artificial sequence
<220> FEATURE:
<223> OTHER INFORMATION: 22D10 light chain

<400> SEQUENCE: 25
gacatccaga tgactcagtc tccagcctcc ctatctgcat ctgtgggaga tactgtcacc      60
atcacatgtc gagcaagtgg gaatattcac aattatttag catggtatca ccagaaacag    120
ggaaaatctc ctcaactcct ggtctatcat gcagaaacct taacagatgg tgtgccatca    180
aggttcagtg gcagtggatc aggaacacaa tattctctca agatcaacag cctgcagcct    240
gaagattttg ggagttatta ctgtcaacat ttttggagta ctccgtacac attcggaggg    300
gggaccaagc tggaaataaa acgg                                            324

<210> SEQ ID NO 26
<211> LENGTH: 108
<212> TYPE: PRT
<213> ORGANISM: Artificial sequence
<220> FEATURE:
<223> OTHER INFORMATION: 22D10 light chain

<400> SEQUENCE: 26

Asp Ile Gln Met Thr Gln Ser Pro Ala Ser Leu Ser Ala Ser Val Gly
1               5                   10                  15

Asp Thr Val Thr Ile Thr Cys Arg Ala Ser Gly Asn Ile His Asn Tyr
            20                  25                  30

Leu Ala Trp Tyr His Gln Lys Gln Gly Lys Ser Pro Gln Leu Leu Val
        35                  40                  45

Tyr His Ala Glu Thr Leu Thr Asp Gly Val Pro Ser Arg Phe Ser Gly

Ser Gly Ser Gly Thr Gln Tyr Ser Leu Lys Ile Asn Ser Leu Gln Pro
65                  70                  75                  80

Glu Asp Phe Gly Ser Tyr Tyr Cys Gln His Phe Trp Ser Thr Pro Tyr
                85                  90                  95

Thr Phe Gly Gly Gly Thr Lys Leu Glu Ile Lys Arg
            100                 105

<210> SEQ ID NO 27
<211> LENGTH: 366
<212> TYPE: DNA
<213> ORGANISM: Artificial sequence
<220> FEATURE:
<223> OTHER INFORMATION: 33B8 heavy chain

<400> SEQUENCE: 27
gaggtgaagc tggtggagtc tggaggaggc ttggtacagc ctgggggttc tctgagtctc    60
tcctgtgcaa cttctggatt caccttcact gattactaca tgaactgggt ccgccagcct   120
ccagggaagg cacttgagtg gttgggtttt attagaaaca agctaatgg ttacacaaca    180 gagtacagtg catctgtgaa gggtcggttc accatctcca gagataattc caaagcatc    240 ctctatcttc aaatgaattc cctgagagct gaggacagtg ccacttatta ctgtgcttgt   300
ggtaactacg taggctatgc tatggactac tggggtcaag gaacctcagt caccgtctcc   360
tcagcc                                                             366

<210> SEQ ID NO 28
<211> LENGTH: 122
<212> TYPE: PRT
<213> ORGANISM: Artificial sequence
<220> FEATURE:
<223> OTHER INFORMATION: 33B8 heavy chain

<400> SEQUENCE: 28

Glu Val Lys Leu Val Glu Ser Gly Gly Gly Leu Val Gln Pro Gly Gly
1               5                   10                  15

Ser Leu Ser Leu Ser Cys Ala Thr Ser Gly Phe Thr Phe Thr Asp Tyr
            20                  25                  30

Tyr Met Asn Trp Val Arg Gln Pro Pro Gly Lys Ala Leu Glu Trp Leu
        35                  40                  45

Gly Phe Ile Arg Asn Lys Ala Asn Gly Tyr Thr Thr Glu Tyr Ser Ala
    50                  55                  60

Ser Val Lys Gly Arg Phe Thr Ile Ser Arg Asp Asn Ser Gln Ser Ile
65                  70                  75                  80

Leu Tyr Leu Gln Met Asn Ser Leu Arg Ala Glu Asp Ser Ala Thr Tyr
                85                  90                  95

Tyr Cys Ala Cys Gly Asn Tyr Val Gly Tyr Ala Met Asp Tyr Trp Gly
            100                 105                 110

Gln Gly Thr Ser Val Thr Val Ser Ser Ala
        115                 120

<210> SEQ ID NO 29
<211> LENGTH: 339
<212> TYPE: DNA
<213> ORGANISM: Artificial sequence
<220> FEATURE:
<223> OTHER INFORMATION: 33B8 light chain

<400> SEQUENCE: 29

```
gacattgtga tgtcacagtc tccatcctcc ctggctgtgt cagcaggaga gaaggtcact    60
atgagctgca atccagtca gagtctgctc aacagtagaa cccgaaagaa ctacttggct   120
tggtaccagc agaaaccagg gcagtctcct aaactgctga tctactgggc atccactagg   180
gaatctgggg tccctgatcg cttcacaggc agtggatctg ggacagattt cactctcacc   240
atcagcagtg tgcaggctga agacctggca gtttattact gcaagcaatc ttataatctg   300
tacacgttcg agggggggac caagctggaa ataaaacgg                          339
```

```
<210> SEQ ID NO 30
<211> LENGTH: 113
<212> TYPE: PRT
<213> ORGANISM: Artificial sequence
<220> FEATURE:
<223> OTHER INFORMATION: 33B8 light chain

<400> SEQUENCE: 30
```

Asp Ile Val Met Ser Gln Ser Pro Ser Ser Leu Ala Val Ser Ala Gly
1               5                   10                  15

Glu Lys Val Thr Met Ser Cys Lys Ser Ser Gln Ser Leu Leu Asn Ser
            20                  25                  30

Arg Thr Arg Lys Asn Tyr Leu Ala Trp Tyr Gln Gln Lys Pro Gly Gln
        35                  40                  45

Ser Pro Lys Leu Leu Ile Tyr Trp Ala Ser Thr Arg Glu Ser Gly Val
    50                  55                  60

Pro Asp Arg Phe Thr Gly Ser Gly Ser Gly Thr Asp Phe Thr Leu Thr
65                  70                  75                  80

Ile Ser Ser Val Gln Ala Glu Asp Leu Ala Val Tyr Tyr Cys Lys Gln
                85                  90                  95

Ser Tyr Asn Leu Tyr Thr Phe Gly Gly Gly Thr Lys Leu Glu Ile Lys
            100                 105                 110

Arg

```
<210> SEQ ID NO 31
<211> LENGTH: 351
<212> TYPE: DNA
<213> ORGANISM: Artificial sequence
<220> FEATURE:
<223> OTHER INFORMATION: HSV010-4 heavy chain

<400> SEQUENCE: 31
caggtgcagc tgaaggagtc aggacctggc ctggtggcgc cctcacagag cctgtccatc    60
acatgcactg tctcagggtt ctcattaagc agacatgatg taagctgggt tcgccagcct   120
ccaggaaagg gtctggagtg gctgggagta atatggggtg acgggagcac aaattatcat   180
tcagctctca tatccagact gagcatcagc aaagataact ccaagagcca gttttcttta   240
aaactgaaca gtctgcaaaa tgatgacaca gccacgtact actgtgccaa agaagactat   300 ggtattttc cttactgggg ccaagggact ctggtcactg tctctgcagc c             351
```

```
<210> SEQ ID NO 32
<211> LENGTH: 117
<212> TYPE: PRT
<213> ORGANISM: Artificial sequence
<220> FEATURE:
<223> OTHER INFORMATION: HSV010-4 heavy chain

<400> SEQUENCE: 32
```

Gln Val Gln Leu Lys Glu Ser Gly Pro Gly Leu Val Ala Pro Ser Gln
1               5                   10                  15

```
Ser Leu Ser Ile Thr Cys Thr Val Ser Gly Phe Ser Leu Ser Arg His
            20                  25                  30

Asp Val Ser Trp Val Arg Gln Pro Pro Gly Lys Gly Leu Glu Trp Leu
        35                  40                  45

Gly Val Ile Trp Gly Asp Gly Ser Thr Asn Tyr His Ser Ala Leu Ile
    50                  55                  60

Ser Arg Leu Ser Ile Ser Lys Asp Asn Ser Lys Ser Gln Val Phe Leu
65                  70                  75                  80

Lys Leu Asn Ser Leu Gln Asn Asp Asp Thr Ala Thr Tyr Tyr Cys Ala
                85                  90                  95

Lys Glu Asp Tyr Gly Ile Phe Pro Tyr Trp Gly Gln Gly Thr Leu Val
            100                 105                 110

Thr Val Ser Ala Ala
        115
```

<210> SEQ ID NO 33
<211> LENGTH: 324
<212> TYPE: DNA
<213> ORGANISM: Artificial sequence
<220> FEATURE:
<223> OTHER INFORMATION: HSV010-4 light chain

<400> SEQUENCE: 33

```
gacatcaaga tgacccagtc tccatcttcc atgtatgcat ctctaggaga gaaagtcact    60
atcacttgca aggcgagtca ggacattagt agctatttaa gctggttcca gcagaaacca   120
gggaaatctc ctaagaccct gatctatcgt gcaaacagat tggtagatgg ggtcccatca   180
aggttcagtg gcagtggatc tgggcaagat tattctctct ccatcagcag cctggactat   240
gaagatatgg gaatttatta ttgtctacag tatgatgagt ttccgctcac gttcggtgct   300
gggaccaagc tggagctgaa acgg                                          324
```

<210> SEQ ID NO 34
<211> LENGTH: 108
<212> TYPE: PRT
<213> ORGANISM: Artificial sequence
<220> FEATURE:
<223> OTHER INFORMATION: HSV010-4 light chain

<400> SEQUENCE: 34

```
Asp Ile Lys Met Thr Gln Ser Pro Ser Ser Met Tyr Ala Ser Leu Gly
1               5                   10                  15

Glu Lys Val Thr Ile Thr Cys Lys Ala Ser Gln Asp Ile Ser Ser Tyr
            20                  25                  30

Leu Ser Trp Phe Gln Gln Lys Pro Gly Lys Ser Pro Lys Thr Leu Ile
        35                  40                  45

Tyr Arg Ala Asn Arg Leu Val Asp Gly Val Pro Ser Arg Phe Ser Gly
    50                  55                  60

Ser Gly Ser Gly Gln Asp Tyr Ser Leu Ser Ile Ser Ser Leu Asp Tyr
65                  70                  75                  80

Glu Asp Met Gly Ile Tyr Tyr Cys Leu Gln Tyr Asp Glu Phe Pro Leu
                85                  90                  95

Thr Phe Gly Ala Gly Thr Lys Leu Glu Leu Lys Arg
            100                 105
```

<210> SEQ ID NO 35
<211> LENGTH: 360
<212> TYPE: DNA

<213> ORGANISM: Artificial sequence
<220> FEATURE:
<223> OTHER INFORMATION: HSV010-7 heavy chain

<400> SEQUENCE: 35

```
caggttcagc tgcagcagtc tggacctgag ctggtgaagc ctggggcttc agtgaagttg      60
tcctgcaagg cttctggcta caccttcaca aactacgata taaactgggt gaagcagagg     120
cctggacagg gacttgagtg gattggatgg atttatccta gagatggtag cactaaatac     180
aatgagaaat tcaagggcaa ggccacattg actattgaca catcctccag cacagcgtac     240
atggagctcc acagcctgac atctgaggac tctgcggtct atttctgtgc aagagggatc     300
ttctatgtta actacgacgt ttactggggc caagggactc tggtcactgt ctctgcagcc     360
```

<210> SEQ ID NO 36
<211> LENGTH: 120
<212> TYPE: PRT
<213> ORGANISM: Artificial sequence
<220> FEATURE:
<223> OTHER INFORMATION: HSV010-7 heavy chain

<400> SEQUENCE: 36

```
Gln Val Gln Leu Gln Gln Ser Gly Pro Glu Leu Val Lys Pro Gly Ala
1               5                   10                  15

Ser Val Lys Leu Ser Cys Lys Ala Ser Gly Tyr Thr Phe Thr Asn Tyr
            20                  25                  30

Asp Ile Asn Trp Val Lys Gln Arg Pro Gly Gln Gly Leu Glu Trp Ile
        35                  40                  45

Gly Trp Ile Tyr Pro Arg Asp Gly Ser Thr Lys Tyr Asn Glu Lys Phe
    50                  55                  60

Lys Gly Lys Ala Thr Leu Thr Ile Asp Thr Ser Ser Ser Thr Ala Tyr
65                  70                  75                  80

Met Glu Leu His Ser Leu Thr Ser Glu Asp Ser Ala Val Tyr Phe Cys
                85                  90                  95

Ala Arg Gly Ile Phe Tyr Val Asn Tyr Asp Val Tyr Trp Gly Gln Gly
            100                 105                 110

Thr Leu Val Thr Val Ser Ala Ala
        115                 120
```

<210> SEQ ID NO 37
<211> LENGTH: 324
<212> TYPE: DNA
<213> ORGANISM: Artificial sequence
<220> FEATURE:
<223> OTHER INFORMATION: HSV010-7 light chain

<400> SEQUENCE: 37

```
gacatccaga tgacacaatc ttcatccttc ttgtctgtat ctctaggagg cagagtcacc      60
attacttgca aggcaagtga ccacattaat aattggttag cctggtatca gcagaaacca     120
ggacatgctc ctaggctctt aatatctggt gcagccagtt tggaaactgg ggttccttca     180
agattcagtg gcagtggatc tggaaaggat tacactctca ccattaccag tcttcagact     240
gaagatgttg ctacttatta ctgtcaacag tattggagta gtccgctcac gttcggtggt     300
gggaccaagc tggagctgaa acgg                                             324
```

<210> SEQ ID NO 38
<211> LENGTH: 108
<212> TYPE: PRT
<213> ORGANISM: Artificial sequence
<220> FEATURE:
<223> OTHER INFORMATION: HSV010-7 light chain

<400> SEQUENCE: 38

Asp Ile Gln Met Thr Gln Ser Ser Phe Leu Ser Val Ser Leu Gly
1               5                   10                  15

Gly Arg Val Thr Ile Thr Cys Lys Ala Ser Asp His Ile Asn Asn Trp
            20                  25                  30

Leu Ala Trp Tyr Gln Gln Lys Pro Gly His Ala Pro Arg Leu Leu Ile
        35                  40                  45

Ser Gly Ala Ala Ser Leu Glu Thr Gly Val Pro Ser Arg Phe Ser Gly
    50                  55                  60

Ser Gly Ser Gly Lys Asp Tyr Thr Leu Thr Ile Thr Ser Leu Gln Thr
65                  70                  75                  80

Glu Asp Val Ala Thr Tyr Tyr Cys Gln Gln Tyr Trp Ser Ser Pro Leu
                85                  90                  95

Thr Phe Gly Gly Gly Thr Lys Leu Glu Leu Lys Arg
            100                 105

<210> SEQ ID NO 39
<211> LENGTH: 357
<212> TYPE: DNA
<213> ORGANISM: Artificial sequence
<220> FEATURE:
<223> OTHER INFORMATION: HSV010-34 heavy chain

<400> SEQUENCE: 39
gaggtgcagc tggtggagtc tgggggaggc ttagtgcagc ctggagagtc cctgaaactc      60
tcctgtgaat ccaatgaata cgaattccct tcccatgaca tgtcttgggt ccgcaagact     120
ccggagaaga ggctggagtt ggtcgcagcc attaatagtg atggtggtag cacctactat     180
ccagacacca tggagagacg attcatcatc tccagagaca taccaagaa gaccctgtac      240 ctgcaaatga gcagtctgag gtctgaggac acagccttgt attactgtgc aagacatagc     300
tcaggctatg ttttggacta ctggggtcaa ggaacctcag tcaccgtctc ctcagcc       357

<210> SEQ ID NO 40
<211> LENGTH: 119
<212> TYPE: PRT
<213> ORGANISM: Artificial sequence
<220> FEATURE:
<223> OTHER INFORMATION: HSV010-34 heavy chain

<400> SEQUENCE: 40

Glu Val Gln Leu Val Glu Ser Gly Gly Gly Leu Val Gln Pro Gly Glu
1               5                   10                  15

Ser Leu Lys Leu Ser Cys Glu Ser Asn Glu Tyr Glu Phe Pro Ser His
            20                  25                  30

Asp Met Ser Trp Val Arg Lys Thr Pro Glu Lys Arg Leu Glu Leu Val
        35                  40                  45

Ala Ala Ile Asn Ser Asp Gly Gly Ser Thr Tyr Tyr Pro Asp Thr Met
    50                  55                  60

Glu Arg Arg Phe Ile Ile Ser Arg Asp Asn Thr Lys Lys Thr Leu Tyr
65                  70                  75                  80

Leu Gln Met Ser Ser Leu Arg Ser Glu Asp Thr Ala Leu Tyr Tyr Cys
                85                  90                  95

Ala Arg His Ser Ser Gly Tyr Val Leu Asp Tyr Trp Gly Gln Gly Thr
            100                 105                 110

Ser Val Thr Val Ser Ser Ala
        115

<210> SEQ ID NO 41
<211> LENGTH: 324
<212> TYPE: DNA
<213> ORGANISM: Artificial sequence
<220> FEATURE:
<223> OTHER INFORMATION: HSV010-34 light chain

<400> SEQUENCE: 41
gacatccaga tgacacaatc ttcatcctac ttgtctgtat ctctaggagg cagagtcacc      60
attacttgca aggcaagtga ccacattaat cattggttag cctggtatca gcagaaacca     120
ggaaatgctc ctaggctctt aatatctggt gcaaccagtt tggaaactgg ggttccttca     180
agattcagtg gcagtggatc tggaaaggat tacactctca gcattgccag tcttcagact     240
gaagatgttg ctacttatta ctgtcaacag tattggagta ctccgtacac gttcggaggg     300
gggaccaagc tggaaataaa acgg                                             324

<210> SEQ ID NO 42
<211> LENGTH: 108
<212> TYPE: PRT
<213> ORGANISM: Artificial sequence
<220> FEATURE:
<223> OTHER INFORMATION: HSV010-34 light chain

<400> SEQUENCE: 42

Asp Ile Gln Met Thr Gln Ser Ser Ser Tyr Leu Ser Val Ser Leu Gly
1               5                   10                  15

Gly Arg Val Thr Ile Thr Cys Lys Ala Ser Asp His Ile Asn His Trp
            20                  25                  30

Leu Ala Trp Tyr Gln Gln Lys Pro Gly Asn Ala Pro Arg Leu Leu Ile
        35                  40                  45

Ser Gly Ala Thr Ser Leu Glu Thr Gly Val Pro Ser Arg Phe Ser Gly
    50                  55                  60

Ser Gly Ser Gly Lys Asp Tyr Thr Leu Ser Ile Ala Ser Leu Gln Thr
65                  70                  75                  80

Glu Asp Val Ala Thr Tyr Tyr Cys Gln Gln Tyr Trp Ser Thr Pro Tyr
                85                  90                  95

Thr Phe Gly Gly Gly Thr Lys Leu Glu Ile Lys Arg
            100                 105

<210> SEQ ID NO 43
<211> LENGTH: 363
<212> TYPE: DNA
<213> ORGANISM: Artificial sequence
<220> FEATURE:
<223> OTHER INFORMATION: HSV010-6 heavy chain

<400> SEQUENCE: 43
caggtccaac tgcagcagcc tggggctgag ctggtaaagc ctggggcttc agtgaagttg      60
tcctgcaagg cttctggcta cactttcacc aactactgga tacactgggt gaagcagagg     120
cctggacaag ccttgagtg gattggaatg attcatccta atattggtat tactcactac     180
agtgagaggt tcaagagcaa ggccacactg actgtagaca atcctccac cacagcctac     240 atgcaactca gcagcctgac atctgaggac tctgcggtct attactgtgc aagagggtcg     300
gactcaggct ccgcctggtt tgcttactgg ggccaaggga ctctggtcac tgtctctgca     360
gcc                                                                    363

<210> SEQ ID NO 44
<211> LENGTH: 121
<212> TYPE: PRT
<213> ORGANISM: Artificial sequence
<220> FEATURE:
<223> OTHER INFORMATION: HSV010-6 heavy chain

<400> SEQUENCE: 44

Gln Val Gln Leu Gln Gln Pro Gly Ala Glu Leu Val Lys Pro Gly Ala
1               5                   10                  15

Ser Val Lys Leu Ser Cys Lys Ala Ser Gly Tyr Thr Phe Thr Asn Tyr
            20                  25                  30

Trp Ile His Trp Val Lys Gln Arg Pro Gly Gln Gly Leu Glu Trp Ile
        35                  40                  45

Gly Met Ile His Pro Asn Ile Gly Ile Thr His Tyr Ser Glu Arg Phe
    50                  55                  60

Lys Ser Lys Ala Thr Leu Thr Val Asp Lys Ser Ser Thr Thr Ala Tyr
65                  70                  75                  80

Met Gln Leu Ser Ser Leu Thr Ser Glu Asp Ser Ala Val Tyr Tyr Cys
                85                  90                  95

Ala Arg Gly Ser Asp Ser Gly Ser Ala Trp Phe Ala Tyr Trp Gly Gln
            100                 105                 110

Gly Thr Leu Val Thr Val Ser Ala Ala
        115                 120

<210> SEQ ID NO 45
<211> LENGTH: 324
<212> TYPE: DNA
<213> ORGANISM: Artificial sequence
<220> FEATURE:
<223> OTHER INFORMATION: HSV010-6 light chain

<400> SEQUENCE: 45
gacatccaga tgacacaatc ttcatcctac ttgtctgttt ctctaggagg cagagtcacc      60
attacttgca aggcaagtga ccacattaat aattggttag cctggtatct gcagaaacca     120
ggaaatgctc ctagactctt aatgtctggt gcaaccagtt tggaaactgg ggttccttca     180
agattcagtg gcagtggatc tggaaaggat tacactctca gcattaccag tcttcagact     240
gaagatgttg ctacttatta ctgtcaacag tattggagta ctccgctcac gttcggtgct     300
gggaccaagc tggagctgaa acgg                                            324

<210> SEQ ID NO 46
<211> LENGTH: 108
<212> TYPE: PRT
<213> ORGANISM: Artificial sequence
<220> FEATURE:
<223> OTHER INFORMATION: HSV010-6 light chain

<400> SEQUENCE: 46

Asp Ile Gln Met Thr Gln Ser Ser Ser Tyr Leu Ser Val Ser Leu Gly
1               5                   10                  15

Gly Arg Val Thr Ile Thr Cys Lys Ala Ser Asp His Ile Asn Asn Trp
            20                  25                  30

Leu Ala Trp Tyr Leu Gln Lys Pro Gly Asn Ala Pro Arg Leu Leu Met
        35                  40                  45

Ser Gly Ala Thr Ser Leu Glu Thr Gly Val Pro Ser Arg Phe Ser Gly
    50                  55                  60

Ser Gly Ser Gly Lys Asp Tyr Thr Leu Ser Ile Thr Ser Leu Gln Thr
65                  70                  75                  80

Glu Asp Val Ala Thr Tyr Tyr Cys Gln Gln Tyr Trp Ser Thr Pro Leu
                85                  90                  95

Thr Phe Gly Ala Gly Thr Lys Leu Glu Leu Lys Arg
            100                 105

<210> SEQ ID NO 47
<211> LENGTH: 363
<212> TYPE: DNA
<213> ORGANISM: Artificial sequence
<220> FEATURE:
<223> OTHER INFORMATION: HSV010-9 heavy chain

<400> SEQUENCE: 47
caggtccaac tgcagcagcc tggggctgag ttggtaaagc ctggggcttc agtgaagttg     60
tcctgcaagt cttctggcta cactttcacc agctactgga tgcactgggt gaagcagagg    120
cctggacaag ccttgagtg gattggaatg attcatccta atagtggtat tactcactac     180
aatgagaagt tcaagaccaa ggccacactg actgtagaca atcctccag cacagcctac     240 atgcaactca gcagcctgac atctgaggac tctgcggtct cttactgtgc aagagggtcg     300
aactcaggct ccgcctggtt tgcttactgg ggccaaggga ctctggtcac tgtctctgca     360
gcc                                                                   363

<210> SEQ ID NO 48
<211> LENGTH: 121
<212> TYPE: PRT
<213> ORGANISM: Artificial sequence
<220> FEATURE:
<223> OTHER INFORMATION: HSV010-9 heavy chain

<400> SEQUENCE: 48

Gln Val Gln Leu Gln Gln Pro Gly Ala Glu Leu Val Lys Pro Gly Ala
1               5                   10                  15

Ser Val Lys Leu Ser Cys Lys Ser Ser Gly Tyr Thr Phe Thr Ser Tyr
                20                  25                  30

Trp Met His Trp Val Lys Gln Arg Pro Gly Gln Gly Leu Glu Trp Ile
            35                  40                  45

Gly Met Ile His Pro Asn Ser Gly Ile Thr His Tyr Asn Glu Lys Phe
        50                  55                  60

Lys Thr Lys Ala Thr Leu Thr Val Asp Lys Ser Ser Ser Thr Ala Tyr
65                  70                  75                  80

Met Gln Leu Ser Ser Leu Thr Ser Glu Asp Ser Ala Val Ser Tyr Cys
                85                  90                  95

Ala Arg Gly Ser Asn Ser Gly Ser Ala Trp Phe Ala Tyr Trp Gly Gln
            100                 105                 110

Gly Thr Leu Val Thr Val Ser Ala Ala
        115                 120

<210> SEQ ID NO 49
<211> LENGTH: 324
<212> TYPE: DNA
<213> ORGANISM: Artificial sequence
<220> FEATURE:
<223> OTHER INFORMATION: HSV010-9 light chain

<400> SEQUENCE: 49
gacatccaga tgacacaatc ttcatcctac ttgtctgtat ctctaggagg cagagtcacc     60

```
attacttgca aggcaagtga ccacattaat aattggttag cctggtatca gcagaaacca    120
ggaaatgctc ctaggctctt aatatctggt gcaaccagtt tggaaactgg ggttccttca    180
agattcagtg gcagtggatc tggaaaggat tacactctca gcattaccag tcttcagact    240
gaagatgttg ctacttatta ctgtcaacag tattggagta ctccgctcac gttcggtgct    300
gggaccaagc tggagctgaa acgg                                           324
```

<210> SEQ ID NO 50
<211> LENGTH: 108
<212> TYPE: PRT
<213> ORGANISM: Artificial sequence
<220> FEATURE:
<223> OTHER INFORMATION: HSV010-9 light chain

<400> SEQUENCE: 50

```
Asp Ile Gln Met Thr Gln Ser Ser Ser Tyr Leu Ser Val Ser Leu Gly
 1               5                  10                  15

Gly Arg Val Thr Ile Thr Cys Lys Ala Ser Asp His Ile Asn Asn Trp
            20                  25                  30

Leu Ala Trp Tyr Gln Gln Lys Pro Gly Asn Ala Pro Arg Leu Leu Ile
        35                  40                  45

Ser Gly Ala Thr Ser Leu Glu Thr Gly Val Pro Ser Arg Phe Ser Gly
    50                  55                  60

Ser Gly Ser Gly Lys Asp Tyr Thr Leu Ser Ile Thr Ser Leu Gln Thr
65                  70                  75                  80

Glu Asp Val Ala Thr Tyr Tyr Cys Gln Gln Tyr Trp Ser Thr Pro Leu
                85                  90                  95

Thr Phe Gly Ala Gly Thr Lys Leu Glu Leu Lys Arg
            100                 105
```

<210> SEQ ID NO 51
<211> LENGTH: 363
<212> TYPE: DNA
<213> ORGANISM: Artificial sequence
<220> FEATURE:
<223> OTHER INFORMATION: HSV010-13 heavy chain

<400> SEQUENCE: 51

```
caggtccaac tgcagcagcc tggggctgag ctggtaaagc ctggggcttc agtgaagttg     60
tcctgcaagg cttctggcta cactttcacc agctactgga tacactgggt gaagcagggg    120
cctggacaag ccttgagtg gattggaatg attcatccta atagtggtat tactcactac    180
aatgagaagt tcaagaccaa ggccacactg actgtagaca atcctccag cacagcctac    240 atgcaactca gcagcctgac atctgaggac tctgcggtct gttactgtgc aagagggtcg    300
agctcaggct ccgcctggtt tgcttactgg ggccaaggga ctctggtcac tgtctctgca    360
gcc                                                                  363
```

<210> SEQ ID NO 52
<211> LENGTH: 121
<212> TYPE: PRT
<213> ORGANISM: Artificial sequence
<220> FEATURE:
<223> OTHER INFORMATION: HSV010-13 heavy chain

<400> SEQUENCE: 52

```
Gln Val Gln Leu Gln Gln Pro Gly Ala Glu Leu Val Lys Pro Gly Ala
 1               5                  10                  15

Ser Val Lys Leu Ser Cys Lys Ala Ser Gly Tyr Thr Phe Thr Ser Tyr
```

```
                20                  25                  30
Trp Ile His Trp Val Lys Gln Gly Pro Gly Gln Gly Leu Glu Trp Ile
             35                  40                  45

Gly Met Ile His Pro Asn Ser Gly Ile Thr His Tyr Asn Glu Lys Phe
         50                  55                  60

Lys Thr Lys Ala Thr Leu Thr Val Asp Lys Ser Ser Thr Ala Tyr
 65                  70                  75                  80

Met Gln Leu Ser Ser Leu Thr Ser Glu Asp Ser Ala Val Cys Tyr Cys
                 85                  90                  95

Ala Arg Gly Ser Ser Gly Ser Ala Trp Phe Ala Tyr Trp Gly Gln
             100                 105                 110

Gly Thr Leu Val Thr Val Ser Ala Ala
             115                 120

<210> SEQ ID NO 53
<211> LENGTH: 324
<212> TYPE: DNA
<213> ORGANISM: Artificial sequence
<220> FEATURE:
<223> OTHER INFORMATION: HSV010-13 light chain

<400> SEQUENCE: 53
gacatccaga tgacacaatc ttcatcctac ttgtctgaat ctctaggagg cagagtcacc      60
attacttgca aggcaagtga ccacattaat aattggttag cctggtatca gcagaaacca     120
ggaaatgctc ccaggctctt aatatctggt gcaaccagtt tggaaactgg ggttccttca     180
agattcagtg gcagtggatc tggaaaggat tacactctca gcattaccag tcttcagact     240
gaagatgttg ctacttatta ctgtcaacag tattggagta gtccgctcac gttcggtgct     300
gggaccaagc tggagctgaa acgg                                             324

<210> SEQ ID NO 54
<211> LENGTH: 108
<212> TYPE: PRT
<213> ORGANISM: Artificial sequence
<220> FEATURE:
<223> OTHER INFORMATION: HSV010-13 light chain

<400> SEQUENCE: 54

Asp Ile Gln Met Thr Gln Ser Ser Ser Tyr Leu Ser Glu Ser Leu Gly
 1               5                  10                  15

Gly Arg Val Thr Ile Thr Cys Lys Ala Ser Asp His Ile Asn Asn Trp
             20                  25                  30

Leu Ala Trp Tyr Gln Gln Lys Pro Gly Asn Ala Pro Arg Leu Leu Ile
         35                  40                  45

Ser Gly Ala Thr Ser Leu Glu Thr Gly Val Pro Ser Arg Phe Ser Gly
     50                  55                  60

Ser Gly Ser Gly Lys Asp Tyr Thr Leu Ser Ile Thr Ser Leu Gln Thr
 65                  70                  75                  80

Glu Asp Val Ala Thr Tyr Tyr Cys Gln Gln Tyr Trp Ser Ser Pro Leu
                 85                  90                  95

Thr Phe Gly Ala Gly Thr Lys Leu Glu Leu Lys Arg
             100                 105

<210> SEQ ID NO 55
<211> LENGTH: 363
<212> TYPE: DNA
<213> ORGANISM: Artificial sequence
<220> FEATURE:
```

<223> OTHER INFORMATION: HSV010-14 heavy chain

<400> SEQUENCE: 55

```
caggtccaac tgcagcagcc tggggctgag ctggtaaagc ctggggcttc agtgaagttg    60
tcctgcaagg cttctggcta cactttcacc agctactgga tacactgggt gaagcagagg   120
cctggccaag gccttgagtg gattggaatg attcatccta atagtggtat tgctcactac   180
agtgagaagt tcaagagcac ggccacactg actgtagaca atcctccag cacagcctac    240 atgcaactca gcagcctgac atctgaggac tcttcggtct attactgtgc aagagggtcg   300
agctcaggct ccgcctggtt tgcttattgg ggccaaggga ctctggtcac tgtctctgca   360
gcc                                                                  363
```

<210> SEQ ID NO 56
<211> LENGTH: 121
<212> TYPE: PRT
<213> ORGANISM: Artificial sequence
<220> FEATURE:
<223> OTHER INFORMATION: HSV010-14 heavy chain

<400> SEQUENCE: 56

```
Gln Val Gln Leu Gln Gln Pro Gly Ala Glu Leu Val Lys Pro Gly Ala
1               5                   10                  15

Ser Val Lys Leu Ser Cys Lys Ala Ser Gly Tyr Thr Phe Thr Ser Tyr
            20                  25                  30

Trp Ile His Trp Val Lys Gln Arg Pro Gly Gln Gly Leu Glu Trp Ile
        35                  40                  45

Gly Met Ile His Pro Asn Ser Gly Ile Ala His Tyr Ser Glu Lys Phe
    50                  55                  60

Lys Ser Thr Ala Thr Leu Thr Val Asp Lys Ser Ser Ser Thr Ala Tyr
65                  70                  75                  80

Met Gln Leu Ser Ser Leu Thr Ser Glu Asp Ser Ser Val Tyr Tyr Cys
                85                  90                  95

Ala Arg Gly Ser Ser Ser Gly Ser Ala Trp Phe Ala Tyr Trp Gly Gln
            100                 105                 110

Gly Thr Leu Val Thr Val Ser Ala Ala
        115                 120
```

<210> SEQ ID NO 57
<211> LENGTH: 324
<212> TYPE: DNA
<213> ORGANISM: Artificial sequence
<220> FEATURE:
<223> OTHER INFORMATION: HSV010-14 light chain

<400> SEQUENCE: 57

```
gacatccaga tgacacaatc ttcatcctac ttgtctgttt ctctaggagg cagagtcacc    60
attacttgca aggcaggtga ccacattaat aattggttag cctggtatca gcagaaacca   120
ggaaatgctc ctaggctctt aatatctggt gcaaccagtt tggaaactgg ggttccttca   180
agattcagtg gcagtggatc tggaaaggat tacactctca gcattaccag tcttcagact   240
gaagatgttg ctacttatta ctgtcaacag tattggagta ctccgctcac gttcggtgct   300
gggaccaagc tggagctgaa acgg                                           324
```

<210> SEQ ID NO 58
<211> LENGTH: 108
<212> TYPE: PRT
<213> ORGANISM: Artificial sequence
<220> FEATURE:
<223> OTHER INFORMATION: HSV010-14 light chain

<400> SEQUENCE: 58

Asp Ile Gln Met Thr Gln Ser Ser Tyr Leu Ser Val Ser Leu Gly
1               5                   10                  15

Gly Arg Val Thr Ile Thr Cys Lys Ala Gly Asp His Ile Asn Asn Trp
            20                  25                  30

Leu Ala Trp Tyr Gln Gln Lys Pro Gly Asn Ala Pro Arg Leu Leu Ile
        35                  40                  45

Ser Gly Ala Thr Ser Leu Glu Thr Gly Val Pro Ser Arg Phe Ser Gly
    50                  55                  60

Ser Gly Ser Gly Lys Asp Tyr Thr Leu Ser Ile Thr Ser Leu Gln Thr
65                  70                  75                  80

Glu Asp Val Ala Thr Tyr Tyr Cys Gln Gln Tyr Trp Ser Thr Pro Leu
                85                  90                  95

Thr Phe Gly Ala Gly Thr Lys Leu Glu Leu Lys Arg
            100                 105

<210> SEQ ID NO 59
<211> LENGTH: 351
<212> TYPE: DNA
<213> ORGANISM: Artificial sequence
<220> FEATURE:
<223> OTHER INFORMATION: HSV010-28 heavy chain

<400> SEQUENCE: 59
cagatccagt tggtacagtc tggacctgag ctgaagaagc tggagagaca agtcaagatc        60
tcctgcaagg cttctgggta taccttcaca acctatggaa tgagctgggt gaaacaggct       120
ccaggaaagg gtttaaagtg gatgggctgg ataaacacct actctggagt gtcaacatat       180
gctgatgact caagggacg gtttgccttc tctttggaaa cctctgccag cactgcctat        240
ttgcagatca caaccctcaa aaatgaggac acggctacat atttctgtgc tcaggtaaac       300
tatgctatgg actactgggg tcaaggaacc tcagtcaccg tctcctcagc c                351

<210> SEQ ID NO 60
<211> LENGTH: 117
<212> TYPE: PRT
<213> ORGANISM: Artificial sequence
<220> FEATURE:
<223> OTHER INFORMATION: HSV010-28 heavy chain

<400> SEQUENCE: 60

Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Thr Tyr
            20                  25                  30

Gly Met Ser Trp Val Lys Gln Ala Pro Gly Lys Gly Leu Lys Trp Met
        35                  40                  45

Gly Trp Ile Asn Thr Tyr Ser Gly Val Ser Thr Tyr Ala Asp Asp Phe
    50                  55                  60

Lys Gly Arg Phe Ala Phe Ser Leu Glu Thr Ser Ala Ser Thr Ala Tyr
65                  70                  75                  80

Leu Gln Ile Asn Asn Leu Lys Asn Glu Asp Thr Ala Thr Tyr Phe Cys
                85                  90                  95

Ala Gln Val Asn Tyr Ala Met Asp Tyr Trp Gly Gln Gly Thr Ser Val
            100                 105                 110

Thr Val Ser Ser Ala
    115

<210> SEQ ID NO 61
<211> LENGTH: 324
<212> TYPE: DNA
<213> ORGANISM: Artificial sequence
<220> FEATURE:
<223> OTHER INFORMATION: HSV010-28 light chain

<400> SEQUENCE: 61
gacattgtga tgacccagtc tcacaaattc ttgtccacat cagtaggaga ctgggtcacc     60
atcacctgca aggccagtca ggatgtgagt actgctgtag cctggtttca gcagaaacca    120
ggacaatctc ctaaagtact gatttactcg gcatcctacc ggtacactgg agtccctgat    180
cgcttcactg gcagtggatc tgggacggat ttcactttca ccatcagcag tgtgcaggct    240
gaagacctgg cagtttatta ctgtcagcaa cattatagta ctcctcggac gttcggtgga    300
ggcaccaagc tggaaatcaa acgg                                           324

<210> SEQ ID NO 62
<211> LENGTH: 108
<212> TYPE: PRT
<213> ORGANISM: Artificial sequence
<220> FEATURE:
<223> OTHER INFORMATION: HSV010-28 light chain

<400> SEQUENCE: 62

Asp Ile Val Met Thr Gln Ser His Lys Phe Leu Ser Thr Ser Val Gly
1               5                   10                  15

Asp Trp Val Thr Ile Thr Cys Lys Ala Ser Gln Asp Val Ser Thr Ala
            20                  25                  30

Val Ala Trp Phe Gln Gln Lys Pro Gly Gln Ser Pro Lys Val Leu Ile
        35                  40                  45

Tyr Ser Ala Ser Tyr Arg Tyr Thr Gly Val Pro Asp Arg Phe Thr Gly
    50                  55                  60

Ser Gly Ser Gly Thr Asp Phe Thr Phe Thr Ile Ser Ser Val Gln Ala
65                  70                  75                  80

Glu Asp Leu Ala Val Tyr Tyr Cys Gln Gln His Tyr Ser Thr Pro Arg
                85                  90                  95

Thr Phe Gly Gly Gly Thr Lys Leu Glu Ile Lys Arg
            100                 105

<210> SEQ ID NO 63
<211> LENGTH: 354
<212> TYPE: DNA
<213> ORGANISM: Artificial sequence
<220> FEATURE:
<223> OTHER INFORMATION: HSV010-20 heavy chain

<400> SEQUENCE: 63
gatgtgcagc ttcaggagtc aggacctggc atggtgagac cttctcagtc actttccctc     60
acctgcactg tcactggcta ctccatcacc agtggttatg actggcactg gatccgacat    120
tttccaggaa acaaactgga gtggatgggc tacataagct acagtggtct cactaactac    180
aacccatccc tcagaagtcg attctccatc actcatgaca catctaagaa ccatttcttc    240
ctgaagttga attctgtgac tactgaggac acagccacat attactgtgc aagaggtcct    300
ccctggtact tcgatgtctg ggcacaggg accacggtca ccgtctcctc agcc           354

```
<210> SEQ ID NO 64
<211> LENGTH: 118
<212> TYPE: PRT
<213> ORGANISM: Artificial sequence
<220> FEATURE:
<223> OTHER INFORMATION: HSV010-20 heavy chain

<400> SEQUENCE: 64

Asp Val Gln Leu Gln Glu Ser Gly Pro Gly Met Val Arg Pro Ser Gln
1               5                   10                  15

Ser Leu Ser Leu Thr Cys Thr Val Thr Gly Tyr Ser Ile Thr Ser Gly
            20                  25                  30

Tyr Asp Trp His Trp Ile Arg His Phe Pro Gly Asn Lys Leu Glu Trp
        35                  40                  45

Met Gly Tyr Ile Ser Tyr Ser Gly Leu Thr Asn Tyr Asn Pro Ser Leu
    50                  55                  60

Arg Ser Arg Phe Ser Ile Thr His Asp Thr Ser Lys Asn His Phe Phe
65                  70                  75                  80

Leu Lys Leu Asn Ser Val Thr Thr Glu Asp Thr Ala Thr Tyr Tyr Cys
                85                  90                  95

Ala Arg Gly Pro Pro Trp Tyr Phe Asp Val Trp Gly Thr Gly Thr Thr
            100                 105                 110

Val Thr Val Ser Ser Ala
        115

<210> SEQ ID NO 65
<211> LENGTH: 324
<212> TYPE: DNA
<213> ORGANISM: Artificial sequence
<220> FEATURE:
<223> OTHER INFORMATION: HSV010-20 light chain

<400> SEQUENCE: 65
gacattgtga tgacccagtc tcaaaaattc atgtccacat cagtaggagg cagggtcagc      60
atcacctgca aggccagtca gattgttcgt gctactgtag cctggtatca acagaaacca    120
gggcagtctc ctaaaccact aatttacttg catccaacc ggcacactgg agtccctgat     180
cgcttcacag gcagtggatc tgggacagat ttcactctca ccattagcaa tgtgcaatct    240
gaagacctgg cagattattt ctgtctgcaa tattggaatt atccgtacac gttcggaggg    300
gggaccaagc tggaaataaa acgg                                           324

<210> SEQ ID NO 66
<211> LENGTH: 108
<212> TYPE: PRT
<213> ORGANISM: Artificial sequence
<220> FEATURE:
<223> OTHER INFORMATION: HSV010-20 light chain

<400> SEQUENCE: 66

Asp Ile Val Met Thr Gln Ser Gln Lys Phe Met Ser Thr Ser Val Gly
1               5                   10                  15

Gly Arg Val Ser Ile Thr Cys Lys Ala Ser Gln Ile Val Arg Ala Thr
            20                  25                  30

Val Ala Trp Tyr Gln Gln Lys Pro Gly Gln Ser Pro Lys Pro Leu Ile
        35                  40                  45

Tyr Leu Ala Ser Asn Arg His Thr Gly Val Pro Asp Arg Phe Thr Gly
    50                  55                  60

Ser Gly Ser Gly Thr Asp Phe Thr Leu Thr Ile Ser Asn Val Gln Ser
65                  70                  75                  80
```

```
Glu Asp Leu Ala Asp Tyr Phe Cys Leu Gln Tyr Trp Asn Tyr Pro Tyr
                85                  90                  95

Thr Phe Gly Gly Gly Thr Lys Leu Glu Ile Lys Arg
            100                 105
```

<210> SEQ ID NO 67
<211> LENGTH: 351
<212> TYPE: DNA
<213> ORGANISM: Artificial sequence
<220> FEATURE:
<223> OTHER INFORMATION: HSV010-8 heavy chain

<400> SEQUENCE: 67

```
caggtgcagc tgaaggagtc aggacctggc ctggtggcgc cctcacagag cctgtcgatc    60
acatgcactg tctcagggtt ctcattaaac aactatgatg taagctgggt tcgccagcct   120
ccaggaaagg gtctggagtg gctgggagta atatggggtg acgggagcac aaattatcat   180
tcagctctca tatccagact gagcatcagc aaggataact ccaagagcca agttttctta   240
aaactgaaca gtctgcaaac tgatgacaca gccacgtact actgtgccaa agaagactat   300
ggtatttttc cttactgggg ccaagggact ctggtcactg tctctgcagc c            351
```

<210> SEQ ID NO 68
<211> LENGTH: 117
<212> TYPE: PRT
<213> ORGANISM: Artificial sequence
<220> FEATURE:
<223> OTHER INFORMATION: HSV010-8 heavy chain

<400> SEQUENCE: 68

```
Gln Val Gln Leu Lys Glu Ser Gly Pro Gly Leu Val Ala Pro Ser Gln
1               5                   10                  15

Ser Leu Ser Ile Thr Cys Thr Val Ser Gly Phe Ser Leu Asn Asn Tyr
            20                  25                  30

Asp Val Ser Trp Val Arg Gln Pro Pro Gly Lys Gly Leu Glu Trp Leu
        35                  40                  45

Gly Val Ile Trp Gly Asp Gly Ser Thr Asn Tyr His Ser Ala Leu Ile
    50                  55                  60

Ser Arg Leu Ser Ile Ser Lys Asp Asn Ser Lys Ser Gln Val Phe Leu
65                  70                  75                  80

Lys Leu Asn Ser Leu Gln Thr Asp Asp Thr Ala Thr Tyr Tyr Cys Ala
                85                  90                  95

Lys Glu Asp Tyr Gly Ile Phe Pro Tyr Trp Gly Gln Gly Thr Leu Val
            100                 105                 110

Thr Val Ser Ala Ala
        115
```

<210> SEQ ID NO 69
<211> LENGTH: 324
<212> TYPE: DNA
<213> ORGANISM: Artificial sequence
<220> FEATURE:
<223> OTHER INFORMATION: HSV010-8 light chain

<400> SEQUENCE: 69

```
gacatcaaga tgacccagtc tccatcttcc atgtatgcat ctctaggaga gagagtcact    60
atcacttgca aggcgagtca ggacattaat agctatttaa gctggttcca gcagaaacca   120
gggaaatctc ctaagaccct gatctatcgt gcaaacagat tggtagatgg ggtcccatca   180
```

```
aggttcagtg cagtggatc tgggcaagat tattctctca ccatcagcag cctggaatat    240
gaaaatatgg gaatttatta ttgtctacag tatgatgagt ttccgctcac gttcggtgct    300
gggaccaagc tggagctgaa acgg                                           324
```

```
<210> SEQ ID NO 70
<211> LENGTH: 108
<212> TYPE: PRT
<213> ORGANISM: Artificial sequence
<220> FEATURE:
<223> OTHER INFORMATION: HSV010-8 light chain

<400> SEQUENCE: 70
```

```
Asp Ile Lys Met Thr Gln Ser Pro Ser Ser Met Tyr Ala Ser Leu Gly
 1               5                  10                  15

Glu Arg Val Thr Ile Thr Cys Lys Ala Ser Gln Asp Ile Asn Ser Tyr
            20                  25                  30

Leu Ser Trp Phe Gln Gln Lys Pro Gly Lys Ser Pro Lys Thr Leu Ile
        35                  40                  45

Tyr Arg Ala Asn Arg Leu Val Asp Gly Val Pro Ser Arg Phe Ser Gly
    50                  55                  60

Ser Gly Ser Gly Gln Asp Tyr Ser Leu Thr Ile Ser Ser Leu Glu Tyr
65                  70                  75                  80

Glu Asn Met Gly Ile Tyr Tyr Cys Leu Gln Tyr Asp Glu Phe Pro Leu
                85                  90                  95

Thr Phe Gly Ala Gly Thr Lys Leu Glu Leu Lys Arg
            100                 105
```

```
<210> SEQ ID NO 71
<211> LENGTH: 363
<212> TYPE: DNA
<213> ORGANISM: Artificial sequence
<220> FEATURE:
<223> OTHER INFORMATION: HSV010-15 heavy chain

<400> SEQUENCE: 71
```

```
caggtccaac tgcagcagcc tggggctgag ctggtaaagc ctggggcttc agtgaagttg     60
tcctgcaagg cttctggcta cactttcacc agctactgga tacactgggt gcagcagagg    120
cctggacaag ccttgagtg gattggaatg attcatccta atagtggtat tactaactac    180
agtgagaagt tcaagagcaa ggccacactg actttagaca gtcctccag cacagcctac    240 atgcaactca tcagcctgac atctgaggac tctgcggtct attactgtgc aagagggtcg    300
agttcaggct ccgcctggtt tgcttactgg ggccaaggga ctctggtcac tgtctctgca    360
gcc                                                                  363
```

```
<210> SEQ ID NO 72
<211> LENGTH: 121
<212> TYPE: PRT
<213> ORGANISM: Artificial sequence
<220> FEATURE:
<223> OTHER INFORMATION: HSV010-15 heavy chain

<400> SEQUENCE: 72
```

```
Gln Val Gln Leu Gln Gln Pro Gly Ala Glu Leu Val Lys Pro Gly Ala
 1               5                  10                  15

Ser Val Lys Leu Ser Cys Lys Ala Ser Gly Tyr Thr Phe Thr Ser Tyr
            20                  25                  30

Trp Ile His Trp Val Gln Gln Arg Pro Gly Gln Gly Leu Glu Trp Ile
        35                  40                  45
```

```
Gly Met Ile His Pro Asn Ser Gly Ile Thr Asn Tyr Ser Glu Lys Phe
        50                  55                  60

Lys Ser Lys Ala Thr Leu Thr Leu Asp Lys Ser Ser Ser Thr Ala Tyr
 65                  70                  75                  80

Met Gln Leu Ile Ser Leu Thr Ser Glu Asp Ser Ala Val Tyr Tyr Cys
                85                  90                  95

Ala Arg Gly Ser Ser Gly Ser Ala Trp Phe Ala Tyr Trp Gly Gln
                100                 105                 110

Gly Thr Leu Val Thr Val Ser Ala Ala
            115                 120
```

<210> SEQ ID NO 73
<211> LENGTH: 324
<212> TYPE: DNA
<213> ORGANISM: Artificial sequence
<220> FEATURE:
<223> OTHER INFORMATION: HSV010-15 light chain

<400> SEQUENCE: 73

```
gacatccaga tgacacaatc ttcatcctac ttgtctgttt ctctaggagg cagagtcacc    60
attacttgca aggcaagtga ccacattaat aattggttac cttggtatca gcagaaacca   120
ggaaatgctc ctaggctctt aatttctggt gcaaccagtt tggaaactgg ggttccttca   180
agattcagtg gcagtggatc tggaaaggat tacactctca gcattaccag tcttcagact   240
gaagatgttg ctacttatta ctgtcaacag tattggagtt ctccgctcac gttcggtgct   300
gggaccaagc tggagctgaa acgg                                          324
```

<210> SEQ ID NO 74
<211> LENGTH: 108
<212> TYPE: PRT
<213> ORGANISM: Artificial sequence
<220> FEATURE:
<223> OTHER INFORMATION: HSV010-15 light chain

<400> SEQUENCE: 74

```
Asp Ile Gln Met Thr Gln Ser Ser Ser Tyr Leu Ser Val Ser Leu Gly
 1               5                  10                  15

Gly Arg Val Thr Ile Thr Cys Lys Ala Ser Asp His Ile Asn Asn Trp
                20                  25                  30

Leu Pro Trp Tyr Gln Gln Lys Pro Gly Asn Ala Pro Arg Leu Leu Ile
                35                  40                  45

Ser Gly Ala Thr Ser Leu Glu Thr Gly Val Pro Ser Arg Phe Ser Gly
        50                  55                  60

Ser Gly Ser Gly Lys Asp Tyr Thr Leu Ser Ile Thr Ser Leu Gln Thr
 65                  70                  75                  80

Glu Asp Val Ala Thr Tyr Tyr Cys Gln Gln Tyr Trp Ser Ser Pro Leu
                85                  90                  95

Thr Phe Gly Ala Gly Thr Lys Leu Glu Leu Lys Arg
                100                 105
```

<210> SEQ ID NO 75
<211> LENGTH: 351
<212> TYPE: DNA
<213> ORGANISM: Artificial sequence
<220> FEATURE:
<223> OTHER INFORMATION: HSV010-16 heavy chain

<400> SEQUENCE: 75

```
cagatccagt tggtacagtc tggacctgag ctgaagaagc tggagagac agtcaagatc     60 tcctgcaagg cttctgggta taccttcaca acctatggaa tgagctgggt gaaacaggct    120
ccaggaaagg atttaaagtg gatgggctgg ataaacacct actctggagt gtcaacatat    180
ggtgatgact tcaagggacg gtttgccttg tctttggaaa cctctgccag cactgcctat    240
ttacaaatca caacctcaa  aaatgaggac acggctacat atttctgtgc tcagttaaac    300
tatggtatgg actactgggg tcaaggaacc tcagtcaccg tctcctcagc c             351
```

<210> SEQ ID NO 76
<211> LENGTH: 117
<212> TYPE: PRT
<213> ORGANISM: Artificial sequence
<220> FEATURE:
<223> OTHER INFORMATION: HSV010-16 heavy chain

<400> SEQUENCE: 76

```
Gln Ile Gln Leu Val Gln Ser Gly Pro Glu Leu Lys Lys Pro Gly Glu
1               5                   10                  15

Thr Val Lys Ile Ser Cys Lys Ala Ser Gly Tyr Thr Phe Thr Thr Tyr
            20                  25                  30

Gly Met Ser Trp Val Lys Gln Ala Pro Gly Lys Asp Leu Lys Trp Met
        35                  40                  45

Gly Trp Ile Asn Thr Tyr Ser Gly Val Ser Thr Tyr Gly Asp Asp Phe
    50                  55                  60

Lys Gly Arg Phe Ala Leu Ser Leu Glu Thr Ser Ala Ser Thr Ala Tyr
65                  70                  75                  80

Leu Gln Ile Asn Asn Leu Lys Asn Glu Asp Thr Ala Thr Tyr Phe Cys
                85                  90                  95

Ala Gln Leu Asn Tyr Gly Met Asp Tyr Trp Gly Gln Gly Thr Ser Val
            100                 105                 110

Thr Val Ser Ser Ala
        115
```

<210> SEQ ID NO 77
<211> LENGTH: 324
<212> TYPE: DNA
<213> ORGANISM: Artificial sequence
<220> FEATURE:
<223> OTHER INFORMATION: HSV010-16 light chain

<400> SEQUENCE: 77

```
gacattgtga tgacccagtc tcacaaattc atgtccacat cagtaggaga cagggtcagc     60
atcacctgca aggccagtca ggatgtgagt acttctttag cctggtatca acagaaacca    120
ggacaatctc ctaaactact gatttattcg gcatcctacc ggtacactgg agtccctgat    180
cgcttcactg gcagtggatc tgggacggat ttcactttca ccatcagcag tgtgcaggct    240
gaagacctgg cagtttatta ctgtcaccaa cattatagta ttcctcggac gttcggtgga    300
ggcaccaagc tggaaatcaa acgg                                           324
```

<210> SEQ ID NO 78
<211> LENGTH: 108
<212> TYPE: PRT
<213> ORGANISM: Artificial sequence
<220> FEATURE:
<223> OTHER INFORMATION: HSV010-16 light chain

<400> SEQUENCE: 78

```
Asp Ile Val Met Thr Gln Ser His Lys Phe Met Ser Thr Ser Val Gly
```

```
                1               5                  10                  15
            Asp Arg Val Ser Ile Thr Cys Lys Ala Ser Gln Asp Val Ser Thr Ser
                            20                  25                  30
            Leu Ala Trp Tyr Gln Gln Lys Pro Gly Gln Ser Pro Lys Leu Leu Ile
                        35                  40                  45
            Tyr Ser Ala Ser Tyr Arg Tyr Thr Gly Val Pro Asp Arg Phe Thr Gly
                    50                  55                  60
            Ser Gly Ser Gly Thr Asp Phe Thr Phe Thr Ile Ser Ser Val Gln Ala
            65                  70                  75                  80
            Glu Asp Leu Ala Val Tyr Tyr Cys His Gln His Tyr Ser Ile Pro Arg
                            85                  90                  95
            Thr Phe Gly Gly Gly Thr Lys Leu Glu Ile Lys Arg
                        100                 105

<210> SEQ ID NO 79
<211> LENGTH: 8
<212> TYPE: PRT
<213> ORGANISM: Artificial sequence
<220> FEATURE:
<223> OTHER INFORMATION: heavy chain CDR1

<400> SEQUENCE: 79

Gly Phe Ser Leu Ser Arg His Asp
1               5

<210> SEQ ID NO 80
<211> LENGTH: 7
<212> TYPE: PRT
<213> ORGANISM: Artificial sequence
<220> FEATURE:
<223> OTHER INFORMATION: heavy chain CDR2

<400> SEQUENCE: 80

Ile Trp Gly Asp Gly Ser Thr
1               5

<210> SEQ ID NO 81
<211> LENGTH: 10
<212> TYPE: PRT
<213> ORGANISM: Artificial sequence
<220> FEATURE:
<223> OTHER INFORMATION: heavy chain CDR3

<400> SEQUENCE: 81

Ala Lys Glu Asp Tyr Gly Ile Phe Pro Tyr
1               5                  10

<210> SEQ ID NO 82
<211> LENGTH: 6
<212> TYPE: PRT
<213> ORGANISM: Artificial sequence
<220> FEATURE:
<223> OTHER INFORMATION: light chain CDR1

<400> SEQUENCE: 82

Gln Asp Ile Ser Ser Tyr
1               5

<210> SEQ ID NO 83
<211> LENGTH: 3
<212> TYPE: PRT
<213> ORGANISM: Artificial sequence
<220> FEATURE:
<223> OTHER INFORMATION: Light chain CDR2
```

<400> SEQUENCE: 83

Arg Ala Asn
1

<210> SEQ ID NO 84
<211> LENGTH: 9
<212> TYPE: PRT
<213> ORGANISM: Artificial sequence
<220> FEATURE:
<223> OTHER INFORMATION: Light chain CDR3

<400> SEQUENCE: 84

Leu Gln Tyr Asp Glu Phe Pro Leu Thr
1               5

<210> SEQ ID NO 85
<211> LENGTH: 8
<212> TYPE: PRT
<213> ORGANISM: Artificial sequence
<220> FEATURE:
<223> OTHER INFORMATION: heavy chain CDR1

<400> SEQUENCE: 85

Gly Phe Ser Leu Asn Asn Tyr Asp
1               5

<210> SEQ ID NO 86
<211> LENGTH: 6
<212> TYPE: PRT
<213> ORGANISM: Artificial sequence
<220> FEATURE:
<223> OTHER INFORMATION: light chain CDR1

<400> SEQUENCE: 86

Gln Asp Ile Asn Ser Tyr
1               5

<210> SEQ ID NO 87
<211> LENGTH: 8
<212> TYPE: PRT
<213> ORGANISM: Artificial sequence
<220> FEATURE:
<223> OTHER INFORMATION: heavy chain CDR1

<400> SEQUENCE: 87

Gly Tyr Thr Phe Thr Asn Tyr Asp
1               5

<210> SEQ ID NO 88
<211> LENGTH: 8
<212> TYPE: PRT
<213> ORGANISM: Artificial sequence
<220> FEATURE:
<223> OTHER INFORMATION: heavy chain CDR2

<400> SEQUENCE: 88

Ile Tyr Pro Arg Asp Gly Ser Thr
1               5

<210> SEQ ID NO 89
<211> LENGTH: 12
<212> TYPE: PRT
<213> ORGANISM: Artificial sequence
<220> FEATURE:
<223> OTHER INFORMATION: heavy chain CDR3

```
<400> SEQUENCE: 89

Ala Arg Gly Ile Phe Tyr Val Asn Tyr Asp Val Tyr
1               5                   10

<210> SEQ ID NO 90
<211> LENGTH: 6
<212> TYPE: PRT
<213> ORGANISM: Artificial sequence
<220> FEATURE:
<223> OTHER INFORMATION: light chain CDR1

<400> SEQUENCE: 90

Asp His Ile Asn Asn Trp
1               5

<210> SEQ ID NO 91
<211> LENGTH: 3
<212> TYPE: PRT
<213> ORGANISM: Artificial sequence
<220> FEATURE:
<223> OTHER INFORMATION: Light chain CDR2

<400> SEQUENCE: 91

Gly Ala Ala
1

<210> SEQ ID NO 92
<211> LENGTH: 9
<212> TYPE: PRT
<213> ORGANISM: Artificial sequence
<220> FEATURE:
<223> OTHER INFORMATION: Light chain CDR3

<400> SEQUENCE: 92

Gln Gln Tyr Trp Ser Ser Pro Leu Thr
1               5

<210> SEQ ID NO 93
<211> LENGTH: 8
<212> TYPE: PRT
<213> ORGANISM: Artificial sequence
<220> FEATURE:
<223> OTHER INFORMATION: heavy chain CDR1

<400> SEQUENCE: 93

Glu Tyr Glu Phe Pro Ser His Asp
1               5

<210> SEQ ID NO 94
<211> LENGTH: 8
<212> TYPE: PRT
<213> ORGANISM: Artificial sequence
<220> FEATURE:
<223> OTHER INFORMATION: heavy chain CDR2

<400> SEQUENCE: 94

Ile Asn Ser Asp Gly Gly Ser Thr
1               5

<210> SEQ ID NO 95
<211> LENGTH: 11
<212> TYPE: PRT
<213> ORGANISM: Artificial sequence
<220> FEATURE:
<223> OTHER INFORMATION: heavy chain CDR3

<400> SEQUENCE: 95
```

Ala Arg His Ser Ser Gly Tyr Val Leu Asp Tyr
1               5                   10

<210> SEQ ID NO 96
<211> LENGTH: 6
<212> TYPE: PRT
<213> ORGANISM: Artificial sequence
<220> FEATURE:
<223> OTHER INFORMATION: light chain CDR1

<400> SEQUENCE: 96

Asp His Ile Asn His Trp
1               5

<210> SEQ ID NO 97
<211> LENGTH: 3
<212> TYPE: PRT
<213> ORGANISM: Artificial sequence
<220> FEATURE:
<223> OTHER INFORMATION: Light chain CDR2

<400> SEQUENCE: 97

Gly Ala Thr
1

<210> SEQ ID NO 98
<211> LENGTH: 9
<212> TYPE: PRT
<213> ORGANISM: Artificial sequence
<220> FEATURE:
<223> OTHER INFORMATION: Light chain CDR3

<400> SEQUENCE: 98

Gln Gln Tyr Trp Ser Thr Pro Tyr Thr
1               5

<210> SEQ ID NO 99
<211> LENGTH: 8
<212> TYPE: PRT
<213> ORGANISM: Artificial sequence
<220> FEATURE:
<223> OTHER INFORMATION: heavy chain CDR1

<400> SEQUENCE: 99

Gly Tyr Thr Phe Thr Asn Tyr Trp
1               5

<210> SEQ ID NO 100
<211> LENGTH: 8
<212> TYPE: PRT
<213> ORGANISM: Artificial sequence
<220> FEATURE:
<223> OTHER INFORMATION: heavy chain CDR2

<400> SEQUENCE: 100

Ile His Pro Asn Ile Gly Ile Thr
1               5

<210> SEQ ID NO 101
<211> LENGTH: 13
<212> TYPE: PRT
<213> ORGANISM: Artificial sequence
<220> FEATURE:
<223> OTHER INFORMATION: heavy chain CDR3

<400> SEQUENCE: 101

```
Ala Arg Gly Ser Asp Ser Gly Ser Ala Trp Phe Ala Tyr
1               5                   10

<210> SEQ ID NO 102
<211> LENGTH: 9
<212> TYPE: PRT
<213> ORGANISM: Artificial sequence
<220> FEATURE:
<223> OTHER INFORMATION: heavy chain CDR3

<400> SEQUENCE: 102

Gln Gln Tyr Trp Ser Thr Pro Leu Thr
1               5

<210> SEQ ID NO 103
<211> LENGTH: 8
<212> TYPE: PRT
<213> ORGANISM: Artificial sequence
<220> FEATURE:
<223> OTHER INFORMATION: heavy chain CDR1

<400> SEQUENCE: 103

Gly Tyr Thr Phe Thr Ser Tyr Trp
1               5

<210> SEQ ID NO 104
<211> LENGTH: 8
<212> TYPE: PRT
<213> ORGANISM: Artificial sequence
<220> FEATURE:
<223> OTHER INFORMATION: heavy chain CDR2

<400> SEQUENCE: 104

Ile His Pro Asn Ser Gly Ile Thr
1               5

<210> SEQ ID NO 105
<211> LENGTH: 13
<212> TYPE: PRT
<213> ORGANISM: Artificial sequence
<220> FEATURE:
<223> OTHER INFORMATION: heavy chain CDR3

<400> SEQUENCE: 105

Ala Arg Gly Ser Asn Ser Gly Ser Ala Trp Phe Ala Tyr
1               5                   10

<210> SEQ ID NO 106
<211> LENGTH: 8
<212> TYPE: PRT
<213> ORGANISM: Artificial sequence
<220> FEATURE:
<223> OTHER INFORMATION: heavy chain CDR2

<400> SEQUENCE: 106

Ile His Pro Asn Ser Gly Ile Ala
1               5

<210> SEQ ID NO 107
<211> LENGTH: 8
<212> TYPE: PRT
<213> ORGANISM: Artificial sequence
<220> FEATURE:
<223> OTHER INFORMATION: heavy chain CDR1

<400> SEQUENCE: 107

Gly Tyr Thr Phe Thr Thr Tyr Gly
```

```
<210> SEQ ID NO 108
<211> LENGTH: 8
<212> TYPE: PRT
<213> ORGANISM: Artificial sequence
<220> FEATURE:
<223> OTHER INFORMATION: heavy chain CDR2

<400> SEQUENCE: 108

Ile Asn Thr Tyr Ser Gly Val Ser
1               5

<210> SEQ ID NO 109
<211> LENGTH: 9
<212> TYPE: PRT
<213> ORGANISM: Artificial sequence
<220> FEATURE:
<223> OTHER INFORMATION: heavy chain CDR3

<400> SEQUENCE: 109

Ala Gln Leu Asn Tyr Gly Met Asp Tyr
1               5

<210> SEQ ID NO 110
<211> LENGTH: 6
<212> TYPE: PRT
<213> ORGANISM: Artificial sequence
<220> FEATURE:
<223> OTHER INFORMATION: light chain CDR1

<400> SEQUENCE: 110

Gln Asp Val Ser Thr Ser
1               5

<210> SEQ ID NO 111
<211> LENGTH: 3
<212> TYPE: PRT
<213> ORGANISM: Artificial sequence
<220> FEATURE:
<223> OTHER INFORMATION: Light chain CDR2

<400> SEQUENCE: 111

Ser Ala Ser
1

<210> SEQ ID NO 112
<211> LENGTH: 9
<212> TYPE: PRT
<213> ORGANISM: Artificial sequence
<220> FEATURE:
<223> OTHER INFORMATION: Light chain CDR2

<400> SEQUENCE: 112

His Gln His Tyr Ser Ile Pro Arg Thr
1               5

<210> SEQ ID NO 113
<211> LENGTH: 9
<212> TYPE: PRT
<213> ORGANISM: Artificial sequence
<220> FEATURE:
<223> OTHER INFORMATION: heavy chain CDR3

<400> SEQUENCE: 113

Ala Gln Val Asn Tyr Ala Met Asp Tyr
1               5
```

```
<210> SEQ ID NO 114
<211> LENGTH: 6
<212> TYPE: PRT
<213> ORGANISM: Artificial sequence
<220> FEATURE:
<223> OTHER INFORMATION: light chain CDR1

<400> SEQUENCE: 114

Gln Asp Val Ser Thr Ala
1               5

<210> SEQ ID NO 115
<211> LENGTH: 9
<212> TYPE: PRT
<213> ORGANISM: Artificial sequence
<220> FEATURE:
<223> OTHER INFORMATION: light chain CDR3

<400> SEQUENCE: 115

Gln Gln His Tyr Ser Thr Pro Arg Thr
1               5

<210> SEQ ID NO 116
<211> LENGTH: 9
<212> TYPE: PRT
<213> ORGANISM: Artificial sequence
<220> FEATURE:
<223> OTHER INFORMATION: heavy chain CDR1

<400> SEQUENCE: 116

Gly Tyr Ser Ile Thr Ser Gly Tyr Asp
1               5

<210> SEQ ID NO 117
<211> LENGTH: 7
<212> TYPE: PRT
<213> ORGANISM: Artificial sequence
<220> FEATURE:
<223> OTHER INFORMATION: heavy chain CDR2

<400> SEQUENCE: 117

Ile Ser Tyr Ser Gly Leu Thr
1               5

<210> SEQ ID NO 118

<400> SEQUENCE: 118

000

<210> SEQ ID NO 119
<211> LENGTH: 6
<212> TYPE: PRT
<213> ORGANISM: Artificial sequence
<220> FEATURE:
<223> OTHER INFORMATION: light chain CDR1

<400> SEQUENCE: 119

Gln Ile Val Arg Ala Thr
1               5

<210> SEQ ID NO 120
<211> LENGTH: 3
<212> TYPE: PRT
<213> ORGANISM: Artificial sequence
<220> FEATURE:
```

<223> OTHER INFORMATION: Light chain CDR2

<400> SEQUENCE: 120

Leu Ala Ser
1

<210> SEQ ID NO 121
<211> LENGTH: 9
<212> TYPE: PRT
<213> ORGANISM: Artificial sequence
<220> FEATURE:
<223> OTHER INFORMATION: Light chain CDR3

<400> SEQUENCE: 121

Leu Gln Tyr Trp Asn Tyr Pro Tyr Thr
1               5

<210> SEQ ID NO 122
<211> LENGTH: 7
<212> TYPE: PRT
<213> ORGANISM: Artificial sequence
<220> FEATURE:
<223> OTHER INFORMATION: heavy chain CDR3

<400> SEQUENCE: 122

Cys Ala Arg Gly Thr Tyr Trp
1               5

<210> SEQ ID NO 123
<211> LENGTH: 11
<212> TYPE: PRT
<213> ORGANISM: Artificial sequence
<220> FEATURE:
<223> OTHER INFORMATION: Light chain CDR3

<400> SEQUENCE: 123

Cys Gln Gln Trp Ser Gly Tyr Pro Phe Thr Phe
1               5                   10

<210> SEQ ID NO 124
<211> LENGTH: 10
<212> TYPE: PRT
<213> ORGANISM: Artificial sequence
<220> FEATURE:
<223> OTHER INFORMATION: heavy chain CDR3

<400> SEQUENCE: 124

Cys Val Arg Leu Asp Ala Met Asp Tyr Trp
1               5                   10

<210> SEQ ID NO 125
<211> LENGTH: 11
<212> TYPE: PRT
<213> ORGANISM: Artificial sequence
<220> FEATURE:
<223> OTHER INFORMATION: light chain CDR3

<400> SEQUENCE: 125

Cys Ser Gln Ser Thr His Val Pro Tyr Thr Phe
1               5                   10

<210> SEQ ID NO 126
<211> LENGTH: 15
<212> TYPE: PRT
<213> ORGANISM: Artificial sequence
<220> FEATURE:
<223> OTHER INFORMATION: heavy chain CDR3

<400> SEQUENCE: 126

Cys Ala Thr Tyr Gly Ser Ser Arg Tyr Tyr Thr Met Asp Tyr Trp
1               5                   10                  15

<210> SEQ ID NO 127
<211> LENGTH: 11
<212> TYPE: PRT
<213> ORGANISM: Artificial sequence
<220> FEATURE:
<223> OTHER INFORMATION: light chain CDR3

<400> SEQUENCE: 127

Cys Gln Gln Trp Ser Ser Tyr Pro Pro Thr Phe
1               5                   10

<210> SEQ ID NO 128
<211> LENGTH: 16
<212> TYPE: PRT
<213> ORGANISM: Artificial sequence
<220> FEATURE:
<223> OTHER INFORMATION: heavy chain CDR3

<400> SEQUENCE: 128

Cys Ala Arg Glu Gly Asp Ser Asn Tyr Asp Trp Tyr Phe Asp Val Trp
1               5                   10                  15

<210> SEQ ID NO 129
<211> LENGTH: 10
<212> TYPE: PRT
<213> ORGANISM: Artificial sequence
<220> FEATURE:
<223> OTHER INFORMATION: light chain CDR3

<400> SEQUENCE: 129

Cys Gln His Phe Trp Ser Pro Val Thr Phe
1               5                   10

<210> SEQ ID NO 130
<211> LENGTH: 17
<212> TYPE: PRT
<213> ORGANISM: Artificial sequence
<220> FEATURE:
<223> OTHER INFORMATION: heavy chain CDR3

<400> SEQUENCE: 130

Cys Thr Arg Ala Tyr Tyr Ser Asn Tyr Val Gly Leu Gly Phe Pro Tyr
1               5                   10                  15

Trp

<210> SEQ ID NO 131
<211> LENGTH: 11
<212> TYPE: PRT
<213> ORGANISM: Artificial sequence
<220> FEATURE:
<223> OTHER INFORMATION: light chain CDR3

<400> SEQUENCE: 131

Cys Met Gln His Leu Glu Tyr Pro Tyr Thr Phe
1               5                   10

<210> SEQ ID NO 132
<211> LENGTH: 13
<212> TYPE: PRT
<213> ORGANISM: Artificial sequence
<220> FEATURE:

```
<223> OTHER INFORMATION: heavy chain CDR3

<400> SEQUENCE: 132

Cys Ala Arg Gly Gly Tyr Tyr Tyr Thr Met Asp Tyr Trp
1               5                   10

<210> SEQ ID NO 133
<211> LENGTH: 11
<212> TYPE: PRT
<213> ORGANISM: Artificial sequence
<220> FEATURE:
<223> OTHER INFORMATION: light chain CDR3

<400> SEQUENCE: 133

Cys Gln Gln Ser Asn Glu Asp Pro Arg Thr Phe
1               5                   10

<210> SEQ ID NO 134
<211> LENGTH: 13
<212> TYPE: PRT
<213> ORGANISM: Artificial sequence
<220> FEATURE:
<223> OTHER INFORMATION: heavy chain CDR3

<400> SEQUENCE: 134

Cys Ala Arg Ser Ser Asn Tyr Gly Phe Phe Asp Val Trp
1               5                   10

<210> SEQ ID NO 135
<211> LENGTH: 11
<212> TYPE: PRT
<213> ORGANISM: Artificial sequence
<220> FEATURE:
<223> OTHER INFORMATION: light chain CDR3

<400> SEQUENCE: 135

Cys Gln Gln Tyr Tyr Arg Tyr Pro Arg Thr Phe
1               5                   10

<210> SEQ ID NO 136
<211> LENGTH: 13
<212> TYPE: PRT
<213> ORGANISM: Artificial sequence
<220> FEATURE:
<223> OTHER INFORMATION: heavy chain CDR3

<400> SEQUENCE: 136

Cys Ala Arg Asp Arg Thr Gly Tyr Gly Met Asp Tyr Trp
1               5                   10

<210> SEQ ID NO 137
<211> LENGTH: 10
<212> TYPE: PRT
<213> ORGANISM: Artificial sequence
<220> FEATURE:
<223> OTHER INFORMATION: light chain CDR3

<400> SEQUENCE: 137

Cys Leu Gln Tyr Asp Glu Phe Arg Thr Phe
1               5                   10

<210> SEQ ID NO 138
<211> LENGTH: 12
<212> TYPE: PRT
<213> ORGANISM: Artificial sequence
<220> FEATURE:
<223> OTHER INFORMATION: heavy chain CDR3
```

<400> SEQUENCE: 138

Cys Thr Tyr Asp Tyr Asp Gly Gly Phe Asp Tyr Trp
1               5                   10

<210> SEQ ID NO 139
<211> LENGTH: 11
<212> TYPE: PRT
<213> ORGANISM: Artificial sequence
<220> FEATURE:
<223> OTHER INFORMATION: light chain CDR3

<400> SEQUENCE: 139

Cys Leu Gln Tyr Asp Glu Phe Pro Tyr Thr Phe
1               5                   10

<210> SEQ ID NO 140
<211> LENGTH: 12
<212> TYPE: PRT
<213> ORGANISM: Artificial sequence
<220> FEATURE:
<223> OTHER INFORMATION: heavy chain CDR3

<400> SEQUENCE: 140

Cys Ala Ser Asp Gln Gly Gly Ala Met Asp His Trp
1               5                   10

<210> SEQ ID NO 141
<211> LENGTH: 11
<212> TYPE: PRT
<213> ORGANISM: Artificial sequence
<220> FEATURE:
<223> OTHER INFORMATION: light chain CDR3

<400> SEQUENCE: 141

Cys Leu Gln Thr Asp Asn Phe Pro Leu Thr Phe
1               5                   10

<210> SEQ ID NO 142
<211> LENGTH: 15
<212> TYPE: PRT
<213> ORGANISM: Artificial sequence
<220> FEATURE:
<223> OTHER INFORMATION: heavy chain CDR3

<400> SEQUENCE: 142

Cys Thr Arg Ser Phe Gln Ala Thr Ser Phe Ala Met Asp Tyr Trp
1               5                   10                  15

<210> SEQ ID NO 143
<211> LENGTH: 15
<212> TYPE: PRT
<213> ORGANISM: Artificial sequence
<220> FEATURE:
<223> OTHER INFORMATION: heavy chain CDR3

<400> SEQUENCE: 143

Cys Ala Arg Ser Phe Gln Ala Thr Ser Phe Ala Met Asp Tyr Trp
1               5                   10                  15

<210> SEQ ID NO 144
<211> LENGTH: 13
<212> TYPE: PRT
<213> ORGANISM: Artificial sequence
<220> FEATURE:
<223> OTHER INFORMATION: heavy chain CDR3

```
<400> SEQUENCE: 144

Cys Ala Ser Gly Asp Asp Tyr Gly Arg Met Asp Tyr Trp
1               5                   10

<210> SEQ ID NO 145
<211> LENGTH: 11
<212> TYPE: PRT
<213> ORGANISM: Artificial sequence
<220> FEATURE:
<223> OTHER INFORMATION: light chain CDR3

<400> SEQUENCE: 145

Cys Gln Gln Tyr Asn Ser Tyr Pro Leu Thr Phe
1               5                   10

<210> SEQ ID NO 146
<211> LENGTH: 15
<212> TYPE: PRT
<213> ORGANISM: Artificial sequence
<220> FEATURE:
<223> OTHER INFORMATION: heavy chain CDR3

<400> SEQUENCE: 146

Cys Ala Ser Pro Ile Tyr Tyr Gly Ile Ser Trp Phe Ala Tyr Trp
1               5                   10                  15

<210> SEQ ID NO 147
<211> LENGTH: 11
<212> TYPE: PRT
<213> ORGANISM: Artificial sequence
<220> FEATURE:
<223> OTHER INFORMATION: light chain CDR3

<400> SEQUENCE: 147

Cys Gln Gln Gly Gln Ser Tyr Pro Tyr Thr Phe
1               5                   10

<210> SEQ ID NO 148
<211> LENGTH: 13
<212> TYPE: PRT
<213> ORGANISM: Artificial sequence
<220> FEATURE:
<223> OTHER INFORMATION: heavy chain CDR3

<400> SEQUENCE: 148

Cys Ala Arg Ile Trp Pro Asp Trp Tyr Phe Asp Val Trp
1               5                   10

<210> SEQ ID NO 149
<211> LENGTH: 11
<212> TYPE: PRT
<213> ORGANISM: Artificial sequence
<220> FEATURE:
<223> OTHER INFORMATION: light chain CDR3

<400> SEQUENCE: 149

Cys Leu Gln Ser Asp Asn Met Pro Phe Thr Phe
1               5                   10

<210> SEQ ID NO 150
<211> LENGTH: 15
<212> TYPE: PRT
<213> ORGANISM: Artificial sequence
<220> FEATURE:
<223> OTHER INFORMATION: heavy chain CDR3

<400> SEQUENCE: 150
```

```
Cys Ala Thr Tyr Gly Ser Ser Arg Tyr Tyr Thr Met Asp Tyr Trp
1               5                   10                  15

<210> SEQ ID NO 151
<211> LENGTH: 11
<212> TYPE: PRT
<213> ORGANISM: Artificial sequence
<220> FEATURE:
<223> OTHER INFORMATION: light chain CDR3

<400> SEQUENCE: 151

Cys Gln Gln Ser Lys Glu Val Pro Leu Thr Phe
1               5                   10

<210> SEQ ID NO 152
<211> LENGTH: 10
<212> TYPE: PRT
<213> ORGANISM: Artificial sequence
<220> FEATURE:
<223> OTHER INFORMATION: heavy chain CDR3

<400> SEQUENCE: 152

Cys Ala Arg Leu Asp Ala Met Asp Tyr Trp
1               5                   10

<210> SEQ ID NO 153
<211> LENGTH: 10
<212> TYPE: PRT
<213> ORGANISM: Artificial sequence
<220> FEATURE:
<223> OTHER INFORMATION: light chain CDR3

<400> SEQUENCE: 153

Cys Leu Gln Tyr Asp Asn Leu Trp Thr Phe
1               5                   10

<210> SEQ ID NO 154
<211> LENGTH: 10
<212> TYPE: PRT
<213> ORGANISM: Artificial sequence
<220> FEATURE:
<223> OTHER INFORMATION: heavy chain CDR3

<400> SEQUENCE: 154

Cys Thr Arg Arg Ala Thr Gly Asp Tyr Trp
1               5                   10

<210> SEQ ID NO 155
<211> LENGTH: 11
<212> TYPE: PRT
<213> ORGANISM: Artificial sequence
<220> FEATURE:
<223> OTHER INFORMATION: light chain CDR3

<400> SEQUENCE: 155

Cys Ala Gln Asn Leu Glu Leu Pro Arg Thr Phe
1               5                   10

<210> SEQ ID NO 156
<211> LENGTH: 18
<212> TYPE: PRT
<213> ORGANISM: Artificial sequence
<220> FEATURE:
<223> OTHER INFORMATION: heavy chain CDR3

<400> SEQUENCE: 156
```

```
Cys Ala Arg Cys Gly Asn Tyr Tyr Gly Ser Ser Tyr Trp Tyr Phe Asp
1               5                   10                  15
Val Trp

<210> SEQ ID NO 157
<211> LENGTH: 7
<212> TYPE: PRT
<213> ORGANISM: Artificial sequence
<220> FEATURE:
<223> OTHER INFORMATION: heavy chain CDR3

<400> SEQUENCE: 157

Cys Ala Arg Gly Gly Tyr Trp
1               5

<210> SEQ ID NO 158
<211> LENGTH: 11
<212> TYPE: PRT
<213> ORGANISM: Artificial sequence
<220> FEATURE:
<223> OTHER INFORMATION: light chain CDR3

<400> SEQUENCE: 158

Cys Gln Gln Trp Asn Ile Tyr Pro Phe Thr Phe
1               5                   10

<210> SEQ ID NO 159
<211> LENGTH: 14
<212> TYPE: PRT
<213> ORGANISM: Artificial sequence
<220> FEATURE:
<223> OTHER INFORMATION: heavy chain CDR3

<400> SEQUENCE: 159

Cys Ala Arg Trp Leu Leu Arg Gly Gly Tyr Phe Asp Tyr Trp
1               5                   10

<210> SEQ ID NO 160
<211> LENGTH: 11
<212> TYPE: PRT
<213> ORGANISM: Artificial sequence
<220> FEATURE:
<223> OTHER INFORMATION: light chain CDR3

<400> SEQUENCE: 160

Cys Gln Gln His Tyr Ser Ile Pro Phe Thr Phe
1               5                   10

<210> SEQ ID NO 161
<211> LENGTH: 11
<212> TYPE: PRT
<213> ORGANISM: Artificial sequence
<220> FEATURE:
<223> OTHER INFORMATION: light chain CDR3

<400> SEQUENCE: 161

Cys Gln Gln Trp Ser Ser Phe Pro Phe Thr Phe
1               5                   10

<210> SEQ ID NO 162
<211> LENGTH: 11
<212> TYPE: PRT
<213> ORGANISM: Artificial sequence
<220> FEATURE:
<223> OTHER INFORMATION: light chain CDR3

<400> SEQUENCE: 162
```

```
Cys His Gln Gly Gln Ser Tyr Pro Tyr Thr Phe
1               5                   10

<210> SEQ ID NO 163
<211> LENGTH: 9
<212> TYPE: PRT
<213> ORGANISM: Artificial sequence
<220> FEATURE:
<223> OTHER INFORMATION: heavy chain CDR3

<400> SEQUENCE: 163

Cys Ala Arg Gly Val Thr Thr Leu Trp
1               5
```

MONOCLONAL ANTIBODIES FOR PREVENTION AND TREATMENT OF HERPES SIMPLEX VIRAL INFECTIONS

CROSS-REFERENCE TO RELATED APPLICATIONS

This is a National Stage application of PCT/US2020/023600, filed on Mar. 19, 2020, which claims the benefit of U.S. Provisional Application No. 62/820,495, filed on Mar. 19, 2019, the contents of each of which are incorporated by reference herein in their entirety.

STATEMENT OF GOVERNMENT SUPPORT

This invention was made with government support under grant number AI117321 awarded by the National Institutes of Health. The government has certain rights in the invention.

BACKGROUND

Herpesvirus infections are a major health issue in human populations. There are currently small molecule anti-viral treatments that have some activity against an active infection, but no commercially available vaccines against HSV-1 or HSV-2 infections. In addition, there are no effective monoclonal antibodies for HSV treatment.

SUMMARY

An antibody or antigen-binding fragment is provided, comprising:
a heavy chain variable region comprising

```
                                    (SEQ ID NO: 1)
        GYSFTTYD,
                                    (SEQ ID NO: 2)
        IYPREGST,
        and
                                    (SEQ ID NO: 3)
        ATYGSSRYYTMDY;
``` and/or
a light chain variable region comprising

```
                                    (SEQ ID NO: 4)
        ESVDNFGISF,
                                    (SEQ ID NO: 5)
        AAS,
        and
                                    (SEQ ID NO: 6)
        QQSKEVPLT.
```

An antibody or antigen-binding fragment is provided, comprising:
a heavy chain variable region comprising

```
                                    (SEQ ID NO: 7)
        GYSITNGNH,
                                    (SEQ ID NO: 8)
        IRSSGSS,
        and
                                    (SEQ ID NO: 9)
        ARGGGLRHYFDY;
``` and/or
a light chain variable region comprising

```
                                    (SEQ ID NO: 10)
        GNIHNY,
                                    (SEQ ID NO: 11)
        HAE,
        and
                                    (SEQ ID NO: 12)
        QHFWSTPYT.
```

An antibody or antigen-binding fragment is provided, comprising:
a heavy chain variable region comprising

```
                                    (SEQ ID NO: 13)
        GFTFTDYY,
                                    (SEQ ID NO: 14)
        IRNKANGYTT,
        and
                                    (SEQ ID NO: 15)
        ACGNYVGYAMDY;
``` and/or
a light chain variable region comprising

```
                                    (SEQ ID NO: 16)
        QSLLNSRTRKNY,
                                    (SEQ ID NO: 17)
        WAS,
        and
                                    (SEQ ID NO: 18)
        KQSYNLYT.
```

An antibody or antigen-binding fragment is provided comprising:
a heavy chain variable region comprising

```
                                    (SEQ ID NO: 79)
        GFSLSRHD,
                                    (SEQ ID NO: 80)
        IWGDGST,
        and
                                    (SEQ ID NO: 81)
        AKEDYGIFPY;
``` and/or
a light chain variable region comprising

```
                                    (SEQ ID NO: 82)
        QDISSY,
                                    (SEQ ID NO: 83)
        RAN,
        and
                                    (SEQ ID NO: 84)
        LQYDEFPLT.
```

An antibody or antigen-binding fragment is provided comprising:

a heavy chain variable region comprising

GYTFTNYD, (SEQ ID NO: 87)

IYPRDGST, and (SEQ ID NO: 88)

ARGIFYVNYDVY; (SEQ ID NO: 89)

and/or a light chain variable region comprising

DHINNW, (SEQ ID NO: 90)

GAA, and (SEQ ID NO: 91)

QQYWSSPLT. (SEQ ID NO: 92)

An antibody or antigen-binding fragment is provided comprising:

a heavy chain variable region comprising

EYEFPSHD, (SEQ ID NO: 93)

INSDGGST, and (SEQ ID NO: 94)

ARHSSGYVLDY; (SEQ ID NO: 95)

and/or a light chain variable region comprising

DHINHW, (SEQ ID NO: 96)

GAT, and (SEQ ID NO: 97)

QQYWSTPYT. (SEQ ID NO: 98)

An antibody or antigen-binding fragment is provided comprising:

a heavy chain variable region comprising

EYEFPSHD, (SEQ ID NO: 85)

INSDGGST, and (SEQ ID NO: 80)

ARHSSGYVLDY; (SEQ ID NO: 81)

and/or a light chain variable region comprising

DHINHW, (SEQ ID NO: 86)

GAT, and (SEQ ID NO: 83)

QQYWSTPYT. (SEQ ID NO: 84)

A pharmaceutical composition comprising the antibody or antigen-binding fragment described herein and a pharmaceutically acceptable carrier or excipient.

A nucleic acid encoding a heavy chain variable region of an antibody, wherein the heavy chain variable region has an amino acid sequence comprising:

GYSFTTYD, (SEQ ID NO: 1)

IYPREGST, and (SEQ ID NO: 2)

ATYGSSRYYTMDY; or (SEQ ID NO: 3)

GYSITNGNH; (SEQ ID NO: 7)

IRSSGSS, and (SEQ ID NO: 8)

ARGGGLRHYFDY; or (SEQ ID NO: 9)

GFTFTDYY, (SEQ ID NO: 13)

IRNKANGYTT, and (SEQ ID NO: 14)

ACGNYVGYAMDY; or (SEQ ID NO: 15)

GFSLSRHD, (SEQ ID NO: 79)

IWGDGST, and (SEQ ID NO: 80)

AKEDYGIFPY; or (SEQ ID NO: 81)

GFSLNNYD, (SEQ ID NO: 85)

IWGDGST, and (SEQ ID NO: 80)

AKEDYGIFPY; or (SEQ ID NO: 81)

GYTFTNYD, (SEQ ID NO: 87)

|  |  |
|---|---|
| IYPRDGST,<br>and | (SEQ ID NO: 88) |
| ARGIFYVNYDVY;<br>or | (SEQ ID NO: 89) |
| EYEFPSHD, | (SEQ ID NO: 93) |
| INSDGGST,<br>and | (SEQ ID NO: 94) |
| ARHSSGYVLDY. | (SEQ ID NO: 95) |

A nucleic acid encoding a light chain variable region of an antibody, wherein the light chain variable region has an amino acid sequence comprising:

|  |  |
|---|---|
| ESVDNFGISF; | (SEQ ID NO: 4) |
| AAS;<br>and | (SEQ ID NO: 5) |
| QQSKEVPLT,<br>or | (SEQ ID NO: 6) |
| GNIHNY; | (SEQ ID NO: 10) |
| HAE;<br>and | (SEQ ID NO: 11) |
| QHFWSTPYT,<br>or | (SEQ ID NO: 12) |
| QSLLNSRTRKNY; | (SEQ ID NO: 16) |
| WAS;<br>and | (SEQ ID NO: 17) |
| KQSYNLYT;<br>or | (SEQ ID NO: 18) |
| QDISSY, | (SEQ ID NO: 82) |
| RAN,<br>and | (SEQ ID NO: 83) |
| LQYDEFPLT;<br>or | (SEQ ID NO: 84) |
| QDINSY, | (SEQ ID NO: 86) |
| RAN,<br>and | (SEQ ID NO: 83) |
| LQYDEFPLT;<br>or | (SEQ ID NO: 84) |
| DHINNW, | (SEQ ID NO: 90) |
| GAA,<br>and | (SEQ ID NO: 91) |
| QQYWSSPLT;<br>or | (SEQ ID NO: 92) |
| DHINHW, | (SEQ ID NO: 96) |
| GAT,<br>and | (SEQ ID NO: 97) |
| QQYWSTPYT. | (SEQ ID NO: 98) |

A nucleic acid encoding light chain complementarity determining regions (LCDR) LCDR1, LCDR2, and LCDR3 of a light chain of an antibody as described herein.

A nucleic acid encoding heavy chain complementarity determining regions (HCDR) HCDR1, HCDR2, and HCDR3 of a heavy chain of an antibody as described herein.

A host cell comprising one or more of the nucleic acids described herein.

An antibody or antigen-binding fragment as described herein, linked or conjugated to a therapeutic agent.

A method of inhibiting a herpes simplex virus-2 (HSV-2) activity in a subject, the comprising administering the antibody or antigen-binding fragment described herein in an amount effective to inhibit HSV-2 activity in the subject.

A method of activating antibody-dependent cellular cytotoxicity (ADCC) of a cell infected with herpes simplex virus-2 (HSV-2) comprising: contacting the cell with an isolated antibody or antigen-binding fragment described herein in an amount which effects ADCC of the cell.

Use of an effective amount of the antibody or antigen-binding fragment described herein, or the pharmaceutical composition described herein, for treating or preventing a disease or condition that is associated with an herpes simplex virus-2 (I-SV-2) infection in a subject.

BRIEF DESCRIPTION OF THE DRAWINGS

Those of skill in the art will understand that the drawings, described below, are for illustrative purposes only. The drawings are not intended to limit the scope of the present teachings in any way.

FIGS. 9A and 9B are graphs of median fluorescence intensity (MFI) versus IgG concentration (ng/ml), showing the binding of various recombinant antibodies to gB-1 as measured by Luminex multiplex assay.

DETAILED DESCRIPTION

Figure 1:
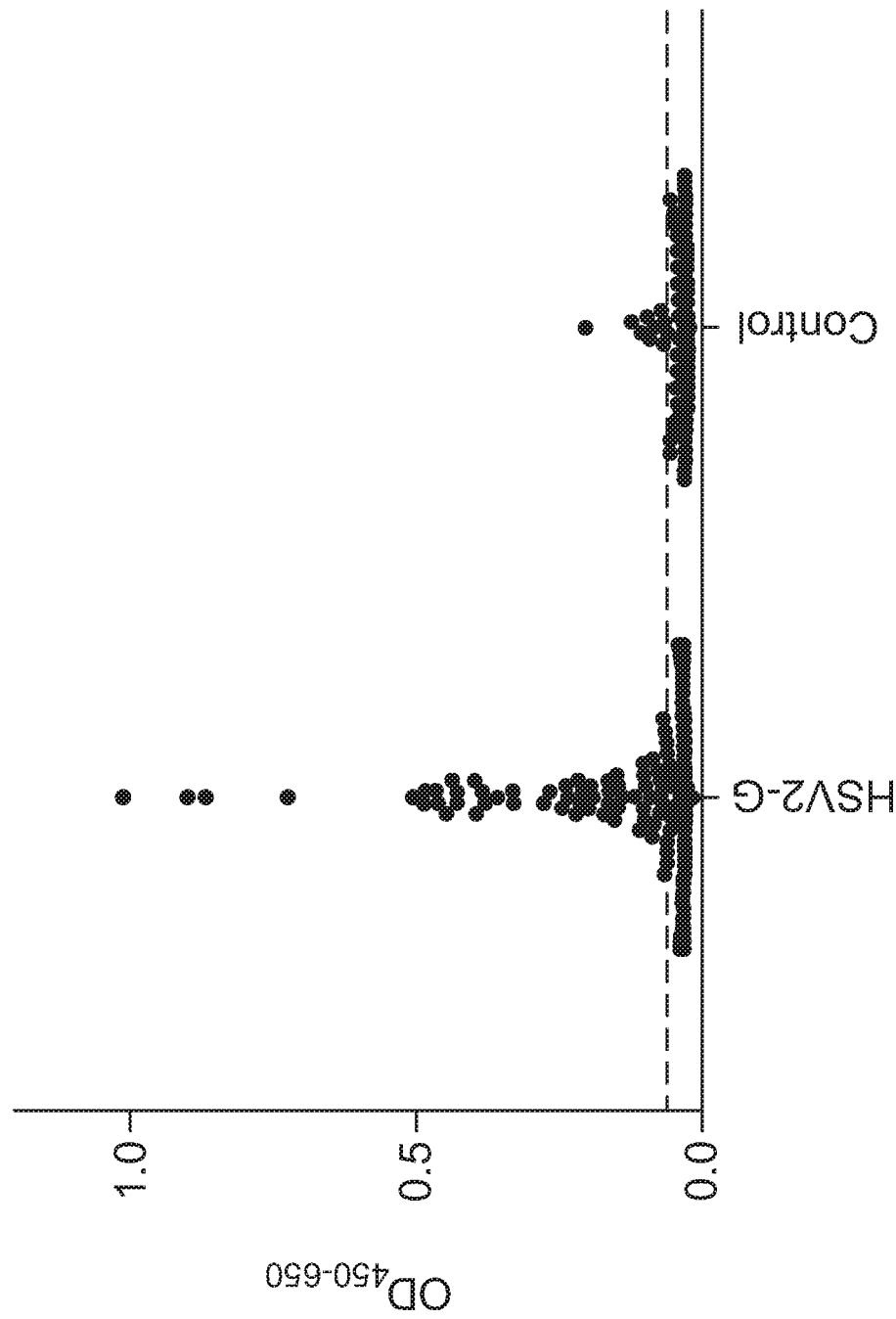
FIG. 1: ELISA results showing binding of culture supernatant to HSV-2 G infected cell lysates and uninfected Vero cell lysates. Germinal center (GC) B cells from inguinal lymph nodes of mice vaccinated with ΔgD-2 were sorted directly into 96-well plates (1 cell/well). These GC B cells were then cultured in the presence of NB-21.2D9 feeder cells. After culture, presence of IgG was first determined by ELISA, and then the reactivity of culture supernatant IgG against HSV-2 G infected cell lysates (HSV-2 G) and uninfected Vero lysates (Control) were tested by ELISA.

Prophylactic treatment with an anti-respiratory syncytial virus (RSV) F neutralizing monoclonal antibody (mAb), palivizumab, has proven effective in preventing serious complications of RSV infection in high-risk infants and young children and is now licensed and regularly used for this purpose. A commercially available anti-HSV-2 or anti-HSV-1 antibody treatment would be very useful but has not previously existed. Such a product would be especially useful in immunocompromised patients or premature patients who have an undeveloped immune response.

Disclosed herein are antibodies, antigen-binding fragments, and nucleic acids encoding the antibodies and antigen-binding fragments. The antibody or antigen-binding fragment bind to a herpes simplex virus-2 (HSV-2) antigen. The antibody or antigen-binding fragment comprises a heavy chain variable region having an amino acid sequence comprising three heavy chain complementarity determining regions (HCDR), a light chain variable region having an amino acid sequence comprising three light chain complementarity determining regions (LCDR), or a combination thereof. The antibody or antigen-binding fragment comprises a heavy chain variable region having an amino acid sequence comprising heavy chain HCDR1, HCDR2, and HCDR3; a light chain variable region having an amino acid sequence comprising light chain LCDR1, LCDR2, and LCDR3; or a combination thereof.

An antibody or antigen-binding fragment is provided comprising:
a heavy chain variable region comprising

GYSFTTYD, (SEQ ID NO: 1)

IYPREGST, (SEQ ID NO: 2)
and

ATYGSSRYYTMDY; (SEQ ID NO: 3)

and/or
a light chain variable region comprising

ESVDNFGISF, (SEQ ID NO: 4)

AAS, (SEQ ID NO: 5)
and

QQSKEVPLT. (SEQ ID NO: 6)

An antibody or antigen-binding fragment is provided comprising:
a heavy chain variable region comprising

GYSITNGNH, (SEQ ID NO: 7)

IRSSGSS, (SEQ ID NO: 8)
and

ARGGGLRHYFDY; (SEQ ID NO: 9)

and/or
a light chain variable region comprising

GNIHNY, (SEQ ID NO: 10)

HAE, (SEQ ID NO: 11)
and

QHFWSTPYT. (SEQ ID NO: 12)

An antibody or antigen-binding fragment thereof is provided comprising:
a heavy chain variable region comprising

GFTFTDYY, (SEQ ID NO: 13)

IRNKANGYTT, (SEQ ID NO: 14)
and

ACGNYVGYAMDY, (SEQ ID NO: 15)

and/or
a light chain variable region comprising

QSLLNSRTRKNY, (SEQ ID NO: 16)

WAS, (SEQ ID NO: 17)

and

KQSYNLYT. (SEQ ID NO: 18)

An antibody or antigen-binding fragment is provided comprising:
a heavy chain variable region comprising

GFSLSRHD, (SEQ ID NO: 79)

IWGDGST, (SEQ ID NO: 80)
and

AKEDYGIFPY; (SEQ ID NO: 81)

and/or
a light chain variable region comprising

QDISSY (SEQ ID NO: 82)

RAN, (SEQ ID NO: 83)
and

LQYDEFPLT, (SEQ ID NO: 84)

An antibody or antigen-binding fragment is provided comprising:
a heavy chain variable region comprising

GFSLNNYD, (SEQ ID NO: 85)

IWGDGST, (SEQ ID NO: 80)
and

AKEDYGIFPY; (SEQ ID NO: 81)

and/or
a light chain variable region comprising

QDINSY, (SEQ ID NO: 86)

RAN, (SEQ ID NO: 83)
and

LQYDEFPLT. (SEQ ID NO: 84)

An antibody or antigen-binding fragment is provided comprising:
a heavy chain variable region comprising

GYTFTNYD, (SEQ ID NO: 87)

IYPRDGST, (SEQ ID NO: 88)
and

ARGIFYVNYDVY; (SEQ ID NO: 89)

and/or
a light chain variable region comprising

DHINNW, (SEQ ID NO: 90)

GAA, (SEQ ID NO: 91)
and

QQYWSSPLT. (SEQ ID NO: 92)

An antibody or antigen-binding fragment is provided comprising:
a heavy chain variable region comprising

EYEFPSHD (SEQ ID NO: 93)

INSDGGST, (SEQ ID NO: 94)
and

ARHSSGYVLDY; (SEQ ID NO: 95)

and/or
a light chain variable region comprising

DHINHW, (SEQ ID NO: 96)

GAT (SEQ ID NO: 97)
and

QQYWSTPYT. (SEQ ID NO: 98)

An antibody or antigen-binding fragment is provided comprising:
a heavy chain variable region comprising

GYTFTNYW, (SEQ ID NO: 99)

IHPNIGIT (SEQ ID NO: 100)
and

ARGSDSGSAWFAY; (SEQ ID NO: 101)

and/or
a light chain variable region comprising

DHINNW, (SEQ ID NO: 90)

GAT, (SEQ ID NO: 97)
and

QQYWSTPLT. (SEQ ID NO: 102)

An antibody or antigen-binding fragment is provided comprising:

a heavy chain variable region comprising

GYTFTSYW, (SEQ ID NO: 103)

IHPNSGIT, (SEQ ID NO: 104)
and

ARGSNSGSAWFAY; (SEQ ID NO: 105)

and/or a light chain variable region comprising

DHINNW, (SEQ ID NO: 90)

GAT, (SEQ ID NO: 97)
and

QQYWSTPLT. (SEQ ID NO: 102)

An antibody or antigen-binding fragment is provided comprising:

a heavy chain variable region comprising

GYTFTSYW, (SEQ ID NO: 103)

IHPNSGIT, (SEQ ID NO: 104)
and

ARGSNSGSAWFAY; (SEQ ID NO: 105)

and/or a light chain variable region comprising

DHINNW, (SEQ ID NO: 90)

GAA, (SEQ ID NO: 91)
and

QQYWSSPLT. (SEQ ID NO: 92)

An antibody or antigen-binding fragment is provided comprising:

a heavy chain variable region comprising

GYTFTTYG (SEQ ID NO: 107)

INTYSGVS, (SEQ ID NO: 108)
and

AQLNYGMDY; (SEQ ID NO: 109)

and/or a light chain variable region comprising

QDVSTS, (SEQ ID NO: 110)

SAS (SEQ ID NO: 111)
and

HQHYSIPRT. (SEQ ID NO: 112)

An antibody or antigen-binding fragment is provided comprising:

a heavy chain variable region comprising

GYTFTTYG, (SEQ ID NO: 107)

INTYSGVS, (SEQ ID NO: 108)
and

AQVNYAMDY; (SEQ ID NO: 113)

and/or a light chain variable region comprising

QDVSTA, (SEQ ID NO: 114)

SAS (SEQ ID NO: 111)
and

QQHYSTPRT. (SEQ ID NO: 115)

An antibody or antigen-binding fragment is provided comprising:

a heavy chain variable region comprising

GYSITSGYD, (SEQ ID NO: 116)

ISYSGLT, (SEQ ID NO: 117)
and

ARGPPWYFDV; (SEQ ID NO: 118)

a light chain variable region comprising

QIVRAT, (SEQ ID NO: 119)

LAS (SEQ ID NO: 120)
and

LQYWNYPYT. (SEQ ID NO: 121)

In embodiments, the antibody or antigen-binding fragment thereof is an IgG antibody. In embodiments, the antibody or antigen-binding fragment thereof is an IgG antibody having an IgG2c isotype.

In embodiments, the antibody or fragment thereof is a humanized antibody.

In embodiments, the antibody is provided. In embodiments, the antigen-binding fragment is provided. In embodiments, the antigen is a Herpes simplex virus-2 (HSV-2) antigen. For example, the HSV-2 antigen is glycoprotein B (gB).

In embodiments, the antibody or fragment thereof comprises an Fc region which binds a Fc gamma receptor RIII (FcγRIII). In embodiments, the antibody or fragment thereof comprises an Fc region which activates a human FcγRIII when bound thereto. In embodiments, the human FcγRIII receptor is FcγRIIIa.

In embodiments, the antibody or fragment thereof binds a Fc gamma receptor RIV (FcγRIV).

In embodiments, the antibody or fragment thereof binds an HSV-2 antigen.

In embodiments, the framework regions of the light chain and/or the heavy chain are human framework regions, or have 85% or greater identity thereto. In embodiments, the framework regions of the light chain and/or the heavy chain are human framework regions.

In embodiments, the heavy chain V(D)J rearrangement is derived from germline VH of IGHV1-85, D of IGHD1-1 and JH of IGHJ4. In embodiments, the heavy chain V(D)J rearrangement has 95% or more identity to a germline VH of IGHV1-85, D of IGHD1-1 and JH of IGHJ4. In embodiments, the light chain is derived from germline VL of IGKV3-2 and JL of IGKJ5. In embodiments, the light chain has 95% or more identity to a germline VL of IGKV3-2 and JL of IGKJ5.

In embodiments, the heavy chain V(D)J rearrangement is derived from germline VH of IGHV3-4, D of IGHD2, and JH of IGHJ4. In embodiments, the heavy chain V(D)J rearrangement has 95% or more identity to a germline VH of IGHV3-4, D of IGHD2, and JH of IGHJ4. In embodiments, the light chain is derived from germline VL of IGKV12-41 and JL of IGKJ2. In embodiments, the light chain has 95% or more identity to a germline VL of IGKV12-41 and JL of IGKJ2.

In embodiments, the heavy chain V(D)J rearrangement is derived from germline VH of IGHV7-3, D of IGHD2-1, and JH of IGHJ4. In embodiments, the heavy chain V(D)J rearrangement has 95% or more identity to a germline VH of IGHV7-3, D of IGHD2-1, and JH of IGHJ4. In embodiments, the light chain is derived from germline VL of IGKV8-21 and JL of IGKJ2. In embodiments, the light chain has 95% or more identity to a germline VL of IGKV8-21 and JL of IGKJ2.

In embodiments, the heavy chain V(D)J rearrangement is derived from germline VH of IGHV2-3, D of IGHD2-1, and JH of IGHJ3. In embodiments, the heavy chain V(D)J rearrangement has 95% or more identity to a germline VH of IGHV2-3, D of IGHD2-1, and JH of IGHJ3. In embodiments, the light chain is derived from germline VL of IGKV14-111 and JL of IGKJ5. In embodiments, the light chain has 95% or more identity to a germline VL of VL of IGKV14-111 and JL of IGKJ5.

In embodiments, the heavy chain V(D)J rearrangement is derived from germline VH of IGHV1-85, D of IGHD2-1, and JH of IGHJ3. In embodiments, the heavy chain V(D)J rearrangement has 95% or more identity to a germline VH of IGHV1-85, D of IGHD2-1, and JH of IGHJ3. In embodiments, the light chain is derived from germline VL of IGKV13-85 and JL of IGKJ5. In embodiments, the light chain has 95% or more identity to a germline VL of VL of IGKV13-85 and JL of IGKJ5.

In embodiments, the heavy chain V(D)J rearrangement is derived from germline VH of IGHV5-2, D of IGHD3-2, and JH of IGHJ4. In embodiments, the heavy chain V(D)J rearrangement has 95% or more identity to a germline VH of IGHV5-2, D of IGHD3-2, and JH of IGHJ4. In embodiments, the light chain is derived from germline VL of IGKV13-85 and JL of IGKJ2. In embodiments, the light chain has 95% or more identity to a germline VL of VL of IGKV13-85 and JL of IGKJ2.

In embodiments, the heavy chain V(D)J rearrangement is derived from germline VH of IGHV1-64, D of IGHD3-2, and JH of IGHJ3. In embodiments, the heavy chain V(D)J rearrangement has 95% or more identity to a germline VH of IGHV1-64, D of IGHD3-2, and JH of IGHJ3. In embodiments, the light chain is derived from germline VL of IGKV13-85 and JL of IGKJ5. In embodiments, the light chain has 95% or more identity to a germline VL of VL of IGKV13-85 and JL of IGKJ5.

In embodiments, the heavy chain V(D)J rearrangement is derived from germline VH of IGHV9-3, D of IGHD2-12, and JH of IGHJ4. In embodiments, the heavy chain V(D)J rearrangement has 95% or more identity to a germline VH of IGHV9-3, D of IGHD2-12, and JH of IGHJ4. In embodiments, the light chain is derived from germline VL of IGKV6-17 and JL of IGKJ1. In embodiments, the light chain has 95% or more identity to a germline VL of VL of IGKV6-17 and JL of IGKJ1.

In embodiments, the heavy chain V(D)J rearrangement is derived from germline VH of IGHV3-1, D of IGHD6-3, and JH of IGHJ1. In embodiments, the heavy chain V(D)J rearrangement has 95% or more identity to a germline VH of IGHV3-1, D of IGHD6-3, and JH of IGHJ1. In embodiments, the light chain is derived from germline VL of IGKV6-14 and JL of IGKJ2. In embodiments, the light chain has 95% or more identity to a germline VL of VL of IGKV6-14 and JL of IGKJ2.

Also provided is a pharmaceutical composition comprising an effective amount of the antibody or antigen-binding fragment described herein and a pharmaceutically acceptable carrier or excipient. In embodiments, the pharmaceutical composition further comprises an anti-viral small molecule drug. The anti-viral small molecule comprises famcyclovir, penciclovir, valacyclovir, or a combination thereof. In embodiments, the small molecule anti-viral drug is acyclovir.

The following are exemplary nucleotide sequences and amino acid sequences of anti-HSV antibodies. The corresponding heavy chain or light chain CDRs (e.g., HCDR1, HCDR2, HCDR3, LCDR1, LCDR2, LCDR3) are underlined in consecutive order. A summary of the nucleotide sequences and amino acid sequences, including the corresponding HCDR1, HCDR2, HCDR3, LCDR1, LCDR2, and LCDR3 of the exemplary anti-HSV antibodies, is provided in Table 4.

BMPC-23_IgH

Nucleotide:
(SEQ ID NO: 19)
caggttcagctgcagcagtctggacctgagctggtgaagcctggggcttc agtgaagttgtcctgcaaggcttctggctacagtttcacaacctacgata taaactgggtgaaggagaggcctggacagggacttgagtggattgggtgg atttatcctagagagggtagtacgaattacaatgagaagttcagggggcaa ggccacattgactgcagacacatcctccagtacagcgtacatggagctcc -continued acagcctgacatctgaggactctgcggtctatttctgtgcaacctacggt
agtagtcgctactatactatggactactggggtcaaggaacctcagtcac
cgtctcctcagcc Amino acid:
(SEQ ID NO: 20)
QVQLQQSGPELVKPGASVKLSCKASGYSFTTYDINWVKERPGQGLEWIGW
IYPREGSTNYNEKFRGKATLTADTSSSTAYMELHSLTSEDSAVYFCATYG
SSRYYTMDYWGQGTSVTVSSA BMPC-23_IgL Nucleotide
(SEQ ID NO: 21)
gacattgtgctgacccaatctccaacttctttggctgtgtctctagggca
gagggccaccatctcctgcagagccagcgaaagtgttgataattttggca
ttagttttatgaactggttccagcagaaaccaggacagccacccaaactc
ctcatctacgctgcatccaacctaggatccggggtccctgccaggtttag
tggcagtgggtctgggacagacttcagcctcaacatccatcctatggagg
atgatgatactgcaatgtatttctgtcagcaaagtaaggaggttccgctc
acgttcggtgctgggaccaagctggagctgaaacgg Amino Acid:
(SEQ ID NO: 22)
DIVLTQSPTSLAVSLGQRATISCRASESVDNFGISFMNWFQQKPGQPPKL
LIYAASNLGSGVPARFSGSGSGTDFSLNIHPMEDDDTAMYFCQQSKEVPL
TFGAGTKLELKR 22D10_IgH Nucleotide
(SEQ ID NO: 23)
gatgtacagcttcaggagtcaggacctgccctggt
gaagccttctcagacagtgtcctcacctgcactg
tcactggctactctatcactaatggtaatcattgg
tggaactggatccggcaggtttcaggaagcaaact
ggagtggttagggtacataaggtccagtggtagct
ctgacagcaatccatctctcaaaagtcgaatctcc
atcactagagacacttccaagaaccagttattcct
gcacttgaactctatgactactgaagatatagcca
catattactgtgcaagagggggggattacggcac
tactttgactactggggccaaggcaccactctcac
agtctcctcagcc Amino acid:
(SEQ ID NO: 24)
DVQLQESGPALVKPSQTVSLTCTVTGYSITNGNHW
WNWIRQVSGSKLEWLGYIRSSGSSDSNPSLKSRIS
ITRDTSKNQLFLHLNSMTTEDIATYYCARGGGLRH
YFDYWGQGTTLTVSSA 22D10_IgL Nucleotide
(SEQ ID NO: 25)
gacatccagatgactcagtctccagcctccctatc
tgcatctgtgggagatactgtcaccatcacatgtc
gagcaagtgggaatattcacaattatttagcatgg
tatcaccagaaacagggaaaatctcctcaactcct
ggtctatcatgcagaaacccttaacagatggtgtgc
catcaaggttcagtggcagtggatcaggaacacaa
tattctctcaagatcaacagcctgcagcctgaaga
tttgggagttattactgtcaacatttttggagta
ctccgtacacattcggaggggggaccaagctggaa
ataaaacgg Amino acid:
(SEQ ID NO: 26)
DIQMTQSPASLSASVGDTVTITCRASGNIHNYLAW
YHQKQGKSPQLLVYHAETLTDGVPSRFSGSGSGTQ
YSLKINSLQPEDFGSYYCQHFWSTPYTFGGGTKLE
IKR 33B8_IgH Nucleotide
(SEQ ID NO: 27)
gaggtgaagctggtggagtctggaggaggcttggt
acagcctggggggttctctgagtctctcctgtgcaa
cttctggattcaccttcactgattactacatgaac
tgggtccgccagcctccagggaaggcacttgagtg
gttgggttttattagaaacaaagctaatggttaca
caacagagtacagtgcatctgtgaagggtcggttc
accatctccagagataattcccaaagcatcctcta
tcttcaaatgaattccctgagagctgaggacagtg
ccacttattactgtgcttgtggtaactacgtaggc
tatgctatggactactggggtcaaggaacctcagt
caccgtctcctcagcc Amino acid:
(SEQ ID NO: 28)
EVKLVESGGGLVQPGGSLSLSCATSGFTFTDYYMN
WVRQPPGKALEWLGFIRNKANGYTTEYSASVKGRF
TISRDNSQSILYLQMNSLRAEDSATYYCACGNYVG
YAMDYWGQGTSVTVSSA 33B8_IgL DNA Nucleotide
(SEQ ID NO: 29)
gacattgtgatgtcacagtctccatcctccctggc
tgtgtcagcaggagagaaggtcactatgagctgca
aatccagtcagagtctgctcaacagtagaacccga -continued
aagaactacttggcttggtaccagcagaaaccagg gcagtctcctaaactgctgatctactgggcatcca ctagggaatctgggtccctgatcgcttcacaggc agtggatctgggacagatttcactctcaccatcag cagtgtgcaggctgaagacctggcagtttattact gcaagcaatcttataatctgtacacgttcggaggg gggaccaagctggaaataaaacgg Amino acid:
(SEQ ID NO: 30)
DIVMSQSPSSLAVSAGEKVTMSCKSSQSLLNSRTR
KNYLAWYQQKPGQSPKWYWASTRESGVPDRFTGSG
SGTDFTLTISSVQAEDLAVYYCKQSYNLYTFGGGT
KLEIKR HSV010-4_IgH Nucleotide
(SEQ ID NO: 31)
caggtgcagctgaaggagtcaggacctggcctggt ggcgccctcacagagcctgtccatcacatgcactg tctcagggttctcattaagcagacatgatgtaagc tgggttcgccagcctccaggaaagggtctggagtg gctgggagtaatatgggggtgacgggagcacaaatt atcattcagctctcatatccagactgagcatcagc aaagataactccaagagccaagttttcttaaaact gaacagtctgcaaaatgatgacacagccgtact actgtgccaaagaagactatggtattttttccttac tggggccaagggactctggtcactgtctctgcagc c Amino Acid
(SEQ ID NO: 32)
QVQLKESGPGLVAPSQSLSITCTVSGFSLSRHDVS
WVRQPPGKGLEWLGVIWGDGSTNYHSALISRLSIS
KDNSKSQVFLKLNSLQNDDTATYYCAKEDYGIFPY
WGQGTLVTVSAA HSV010-4_IgL Nucleotide
(SEQ ID NO: 33)
gacatcaagatgacccagtctccatcttccatgta tgcatctctaggagagaaagtcactatcacttgca aggcgagtcaggacattagtagctatttaagctgg ttccagcagaaaccagggaaatctcctaagaccct gatctatcgtgcaaacagattggtagatggggtcc catcaaggttcagtggcagtggatctgggcaagat tattctctctccatcagcagcctggactatgaaga -continued
tatgggaatttattattgctacagtatgatgagt ttccgctcacgttcggtgctgggaccaagctggag ctgaaacgg Amino Acid
(SEQ ID NO: 34)
DIKMTQSPSSMYASLGEKVTITCKASQDISSYLSW
FQQKPGKSPKTLIYRANRLVDGVPSRFSGSGSGQD
YSLSISSLDYEDMGIYYCLQYDEFPLTFGAGTKLE
LKR HSV010-7_IgH Nucleotide
(SEQ ID NO: 35)
caggttcagctgcagcagtctggacctgagctggt gaagcctggggcttcagtgaagttgtcctgcaagg cttctggctacaccttcacaaactacgatataaac tgggtgaagcagaggcctggacagggacttgagtg gattggatggatttatcctagagatggtagcacta aatacaatgagaaattcaagggcaaggccacattg actattgacacatcctccagcacagcgtacatgga gctccacagcctgacatctgaggactctgcggtct atttctgtgcaagagggatcttctatgttaactac gacgtttactggggccaagggactctggtcactgt ctctgcagcc Amino Acid
(SEQ ID NO: 36)
QVQLQQSGPELVKPGASVKLSCKASGYTFTNYDIN
WVKQRPGQGLEWIGWIYPRDGSTKYNEKFKGKATL
TIDTSSSTAYMELHSLTSEDSAVYFCARGIFYVNY
DVYWGQGTLVTVSAA HSV010-7_IgL Nucleotide
(SEQ ID NO: 37)
gacatccagatgacacaatcttcatccttcttgtc tgtatctctaggaggcagagtcaccattacttgca aggcaagtgaccacattaataattggttagcctgg tatcagcagaaaccaggacatgctcctaggctctt aatatctggtgcagccagtttggaaactggggttc cttcaagattcagtggcagtggatctggaaaggat tacactctcaccattaccagtcttcagactgaaga tgttgctacttattactgtcaacagtattggagta gtccgctcacgttcggtggtgggaccaagctggag ctgaaacgg Amino Acid
(SEQ ID NO: 38)
DIQMTQSSSFLSVSLGGRVTITCKASDHINNWLAW
YQQKPGHAPRLLISGAASLETGVPSRFSGSGSKD
YTLTITSLQTEDVATYYCQQYWSSPLTFGGGTKLE
LKR HSV010-34_IgH Nucleotide
(SEQ ID NO: 39)
gaggtgcagctggtggagtctgggggaggcttagt
gcagcctggagagtccctgaaactctcctgtgaat
ccaatgaatacgaattcccacccatgacatgtctt
gggtccgcaagactccggagaagaggctggagttg
gtcgcagccattaatagtgatggtggtagcaccta
ctatccagacaccatggagagacgattcatcatct
ccagagacaataccaagaagaccctgtacctgcaa
atgagcagtctgaggtctgaggacacagccagtat
tactgtgcaagacatagctcaggctatgattggac
tactggggtcaaggaacctcagtcaccgtctcctc
agcc Amino Acid
(SEQ ID NO: 40)
EVQLVESGGGLVQPGESLKLSCESNEYEFPSHDMS
WVRKTPEKRLELVAAINSDGGSTYYPDTMERRFII
SRDNTKKTLYLQMSSLRSEDTALYYCARHSSGYVL
DYWGQGTSVTVSSA HSV010-34_IgL Nucleotide
(SEQ ID NO: 41)
gacatccagatgacacaatcttcatcctacttgtc
tgtatctctaggaggcagagtcaccattacttgca
aggcaagtgaccacattaatcattggttagcctgg
tatcagcagaaaccaggaaatgctcctaggctctt
aatatctggtgcaaccagtttggaaactggggttc
cttcaagattcagtggcagtggatctggaaaggat
tacactctcagcattgccagtcttcagactgaaga
tgttgctacttattactgtcaacagtattggagta
ctccgtacacgttcggaggggggaccaagctggaa
ataaaacgg Amino Acid
(SEQ ID NO: 42)
DIQMTQSSSYLSVSLGGRVTITCKASDHINHWLAW
YQQKPGNAPRLLISGATSLETGVPSRFSGSGSKD
YTLSIASLQTEDVATYYCQQYWSTPYTFGGGTKLE
IKR HSV010-6_IgH Nucleotide
(SEQ ID NO: 43)
caggtccaactgcagcagcctggggctgagctggt
aaagcctggggcttcagtgaagttgtcctgcaagg
atctggctacacttttaccaactactggatacact
gggtgaagcagaggcctggacaaggccttgagtgg
attggaatgattcatcctaatattggtattactca
ctacagtgagaggttcaagagcaaggccacactga
ctgtagacaaatcctccaccacagcctacatgcaa
ctcagcagcctgacatctgaggactctgcggtcta
ttactgtgcaagagggtcggactcaggctccgcct
ggtttgcttactggggccaagggactctggtcact
gtctctgcagcc Amino Acid
(SEQ ID NO: 44)
QVQLQQPGAELVKPGASVKLSCKASGYTFTNYWIH
WVKQRPGQGLEWIGMIHPNIGITHYSERFKSKATL
TVDKSSTTAYMQLSSLTSEDSAVYYCARGSDSGSA
WFAYWGQGTLVTVSAA HSV010-6_IgL Nucleotide
(SEQ ID NO: 45)
Gacatccagatgacacaatcttcatcctacttgtc
tgtttctctaggaggcagagtcaccattacttgca
aggcaagtgaccacattaataattggttagcctgg
tatctgcagaaaccaggaaatgctcctagactctt
aatgtctggtgcaaccagtttggaaactggggttc
cttcaagattcagtggcagtggatctggaaaggat
tacactctcagcattaccagtcttcagactgaaga
tgttgctacttattactgtcaacagtattggagta
ctccgctcacgttcggtgctgggaccaagctggag
ctgaaacgg Amino Acid
(SEQ ID NO: 46)
DIQMTQSSSYLSVSLGGRVTITCKASDHINNWLAW
YLQKPGNAPRLLMSGATSLETGVPSRFSGSGSKD
YTLSITSLQTEDVATYYCQQYWSTPLTFGAGTKLE
LKR HSV010-9_IgH Nucleotide
(SEQ ID NO: 47)
caggtccaactgcagcagcctggggctgagttggt
aaagcctggggcttcagtgaagttgtcctgcaagt cttctggctacactttcaccagctactggatgcac tgggtgaagcagaggcctggacaaggccttgagtg gattggaatgattcatcctaatagtggtattactc actacaatgagaagttcaagaccaaggccacactg actgtagacaaatcctccagcacagcctacatgca actcagcagcctgacatctgaggactctgcggtct cttactgtgcaagagggtcgaactcaggctccgcc tggtttgcttactggggccaagggactctggtcac tgtctctgcagcc Amino Acid (SEQ ID NO: 48)

QVQLQQPGAELVKPGASVKLSCKSSGYTFTSYWMH

WVKQRPGQGLEWIGMIHPNSGITHYNEKFKTKATL

TVDKSSSTAYMQLSSLTSEDSAVSYCARGSNSGSA

WFAYWGQGTLVTVSAA

HSV010-9_IgL

Nucleotide (SEQ ID NO: 49)

Gacatccagatgacacaatcttcatcctacttgtc tgtatctctaggaggcagagtcaccattacttgca aggcaagtgaccacattaataattggttagcctgg tatcagcagaaaccaggaaatgctcctaggctctt aatatctggtgcaaccagtttggaaactggggttc cttcaagattcagtggcagtggatctggaaaggat tacactctcagcattaccagtcttcagactgaaga tgttgctacttattactgtcaacagtattggagta ctccgctcacgttcggtgctgggaccaagctggag ctgaaacgg Amino Acid (SEQ ID NO: 50)

DIQMTQSSSYLSVSLGGRVTITCKASDHINNWLAW

YQQKPGNAPRLLISGATSLETGVPSRFSGSGSGKD

YTLSITSLQTEDVATYYCQQYWSTPLTFGAGTKLE

LKR

HSV010-13_IgH

Nucleotide (SEQ ID NO: 51)

caggtccaactgcagcagcctggggctgagctggt aaagcctggggcttcagtgaagttgtcctgcaagg atctggctacactttcaccagctactggatacact gggtgaagcaggggcctggacaaggccttgagtgg attggaatgattcatcctaatagtggtattactca ctacaatgagaagttcaagaccaaggccacactga ctgtagacaaatcctccagcacagcctacatgcaa ctcagcagcctgacatctgaggactctgcggtctg ttactgtgcaagagggtcgagctcaggctccgcct ggtttgcttactggggccaagggactctggtcact gtctctgcagcc Amino Acid (SEQ ID NO: 52)

QVQLQQPGAELVKPGASVKLSCKASGYTFTSYWIH

WVKQGPGQGLEWIGMIHPNSGITHYNEKFKTKATL

TVDKSSSTAYMQLSSLTSEDSAVCYCARGSSSGSA

WFAYWGQGTLVTVSAA

HSV010-13_IgL

Nucleotide (SEQ ID NO: 53)

gacatccagatgacacaatcttcatcctacttgtctgaatctctagga ggcagagtcaccattacttgcaaggcaagtgaccacattaataattgg ttagcctggtatcagcagaaaccaggaaatgctcccaggctcttaata tctggtgcaaccagtttggaaactggggttccttcaagattcagtggc agtggatctggaaaggattacactctcagcattaccagtcttcagact gaagatgttgctacttattactgtcaacagtattggagtagtccgctc acgttcggtgctgggaccaagctggagctgaaacgg Amino Acid (SEQ ID NO: 54)

DIQMTQSSSYLSESLGGRVTITCKASDHINNWLAWYQQKPGNAPRLLI

SGATSLETGVPSRFSGSGSGKDYTLSITSLQTEDVATYYCQQYWSSPL

TFGAGTKLELKR

HSV010-14_IgH

Nucleotide (SEQ ID NO: 55)

caggtccaactgcagcagcctggggctgagctggtaaagcctggggctt cagtgaagttgtcctgcaaggatctggctacactttcaccagctactgg atacactgggtgaagcagaggcctggccaaggccttgagtggattggaa tgattcatcctaatagtggtattgctcactacagtgagaagttcaagag cacggccacactgactgtagacaaatcctccagcacagcctacatgcaa ctcagcagcctgacatctgaggactcttcggtctattactgtgcaagag ggtcgagctcaggctccgcctggtttgcttattggggccaagggactct ggtcactgtctctgcagcc Amino Acid (SEQ ID NO: 56)

QVQLQQPGAELVKPGASVKLSCKASGYTFTSYWIHWVKQRPGQGLEWIG

MIHPNSGIAHYSEKFKSTATLTVDKSSSTAYMQLSSLTSEDSSVYYCAR

GSSSGSAWFAYWGQGTLVTVSAA

HSV010-14_IgL

Nucleotide
(SEQ ID NO: 57)
gacatccagatgacacaatcttcatcctacttgtctgtttctctaggag
gcagagtcaccattacttgcaaggcaggt<u>gaccacattaataattggtt</u>
agcctggtatcagcagaaaccaggaaatgctcctaggctcttaatatct
<u>ggtgcaaccagtttggaaactggggtt</u>ccttcaagattcagtggcagtg
gatctggaaggattacactctcagcattaccagtcttcagactgaaga
tgttgctacttattactgt<u>caacagtattggagtactccgctcacgttc</u>
ggtgctgggaccaagctggagctgaaacgg Amino Acid
(SEQ ID NO: 58)
DIQMTQSSSYLSVSLGGRVTITCKAG<u>DHINNW</u>LAWYQQKPGNAPRLLIS
<u>GATSLETG</u>VPSRFSGSGSGKDYTLSITSLQTEDVATYYC<u>QQYWSTPLTF</u>
GAGTKLELKR HSV010-28_IgH Nucleotide
(SEQ ID NO: 59)
cagatccagttggtacagtctggacctgagctgaagaagcctggagaga
cagtcaagatctcctgcaaggcttct<u>gggtataccttcacaacctatgg</u>
<u>aat</u>gagctgggtgaaacaggctccaggaaagggtttaaagtggatgggc
tgg<u>ataaacacctactctggagtgtca</u>acatatgctgatgacttcaagg
gacggtttgccttctctttggaaacctctgccagcactgcctatttgca
gatcaacaacctcaaaaatgaggacacggctacatatttctgt<u>gctcag</u>
<u>gtaaactatgctatggactac</u>tggggtcaaggaacctcagtcaccgtct
cctcagcc Amino Acid
(SEQ ID NO: 60)
QIQLVQSGPELKKPGETVKISCKAS<u>GYTFTTYGMSW</u>VKQAPGKGLKWMG
W<u>INTYSGVSTYADDFKGR</u>FAFSLETSASTAYLQINNLKNEDTATYFC<u>AQ</u>
<u>VNYAMDY</u>WGQGTSVTVSSA HSV010-28_IgL Nucleotide
(SEQ ID NO: 61)
gacattgtgatgacccagtctcacaaattatgtccacatcagtaggaga
ctgggtcaccatcacctgcaaggccagt<u>caggatgtgagtactgctgta</u>
<u>gcc</u>tggtttcagcagaaaccaggacaatctcctaaagtactgatttact
cggcatcctaccggtacactggagtccctgatcgcttcactggcagtgg
atctgggacggatttcacttttcaccatcagcagtgtgcaggctgaagac
ctggcagtttattactgt<u>cagcaacattatagtactcctcggacg</u>ttcg
gtggaggcaccaagctggaaatcaaacgg Amino Acid
(SEQ ID NO: 62)
DIVMTQSHKFLSTSVGDWVTITCKAS<u>QDVSTAVAW</u>FQQKPGQSPKVLIY
<u>SASYRYTG</u>VPDRFTGSGSGTDFTFTISSVQAEDLAVYYC<u>QQHYSTPRTF</u>
GGGTKLEIKR HSV010-20_IgH Nucleotide
(SEQ ID NO: 63)
gatgtgcagcttcaggagtcaggacctggcatggtgagaccttctcagt
cactttccctcacctgcactgtcact<u>ggctactccatcaccagtggtta</u>
<u>tgac</u>tggcactggatccgacattttccaggaaacaaactggagtggatg
ggcta<u>cataagctacagtggtctcact</u>aactacaacccatccctcagaa
gtcgattctccatcactcatgacacatcaagaaccattcttcctgaa
gttgaattctgtgactactgaggacacagccacatattactgt<u>gcaaga</u>
<u>ggtcctccctggtacttcgatgtc</u>tggggcacagggaccacggtcaccg
tctcctcagcc Amino Acid
(SEQ ID NO: 64)
DVQLQESGPGMVRPSQSLSLTCTVT<u>GYSITSGYDWHW</u>IRHFPGNKLEWM
GY<u>ISYSGLTNYNPSLRSR</u>FSITHDTSKNHFFLKLNSVTTEDTATYYC<u>AR</u>
<u>GPPWYFDV</u>WGTGTTVTVSSA HSV010-20_IgL Nucleotide
(SEQ ID NO: 65)
gacattgtgatgacccagtctcaaaaattcatgtccacatcagtaggag
gcagggtcagcatcacctgcaaggccagt<u>cagattgttcgtgctactgt</u>
<u>agcc</u>tggtatcaacagaaaccagggcagtctcctaaaccactaatttac
<u>ttggcatccaaccggcacactggagtc</u>cctgatcgcttcacaggcagtg
gatctgggacagatttcactctcaccattagcaatgtgcaatctgaaga
cctggcagattatttctgt<u>ctgcaatattggaattatccgtacacg</u>ttc
ggaggggggaccaagctggaaataaaacgg Amino Acid
(SEQ ID NO: 66)
DIVMTQSQKFMSTSVGGRVSITCKAS<u>QIVRATVAW</u>YQQKPGQSPKPLIY
<u>LASNRHTG</u>VPDRFTGSGSGTDFTLTISNVQSEDLADYFC<u>LQYWNYPYTF</u>
GGGTKLEIKR HSV010-8_IgH Nucleotide
(SEQ ID NO: 67)
caggtgcagctgaaggagtcaggacctggcctggtggcgccctcacaga
gcctgtcgatcacatgcactgtctcag<u>ggtttcattaaacaactatga</u>
<u>tgt</u>aagctgggttcgccagcctccaggaaagggtctggagtggctggga
gt<u>aatatggggtgacgggagcacaa</u>attatcattcagctctcatatcca
gactgagcatcagcaaggataactccaagagccaagttttcttaaaact
gaacagtctgcaaactgatgacacagccacgtactactgt<u>gccaagaa</u>
<u>gactatggtattttt</u>ccttactggggccaagggactctggtcactgtct
ctgcagcc -continued Amino Acid
(SEQ ID NO: 68)
QVQLKESGPGLVAPSQSLSITCTVSGFSLNNYDVSWVRQPPGKGLEWLG

VIWGDGSTNYHSALISRLSISKDNSKSQVFLKLNSLQTDDTATYYCAKE

DYGIFPYWGQGTLVTVSAA

HSV010-8_IgL

Nucleotide
(SEQ ID NO: 69)
gacatcaagatgacccagtctccatcttccatgtatgcatctctaggag agagagtcactatcacttgcaaggcgagtcaggacattaatagctattt aagctggttccagcagaaaccagggaaatctcctaagaccctgatctat cgtgcaaacagattggtagatggggtcccatcaaggttcagtggcagtg gatctgggcaagattattctctcaccatcagcagcctggaatatgaaaa tatgggaatttattattgtctacagtatgatgagtttccgctcacgttc ggtgctgggaccaagctggagctgaaacgg Amino Acid
(SEQ ID NO: 70)
DIKMTQSPSSMYASLGERVTITCKASQDINSYLSWFQQKPGKSPKTLIY

RANRLVDGVPSRFSGSGSGQDYSLTISSLEYENMGIYYCLQYDEFPLTF

GAGTKLELKR

HSV010-15_IgH

Nucleotide
(SEQ ID NO: 71)
caggtccaactgcagcagcctggggctgagctggtaaagcctggggctt cagtgaagttgtcctgcaaggcttctggctacactttcaccagctactg gatacactgggtgcagcagaggcctggacaaggccttgagtggattgga atgattcatcctaatagtggtattactaactacagtgagaagttcaaga gcaaggccacactgactttagacaagtcctccagcacagcctacatgca actcatcagcctgacatctgaggactctgcggtctattactgtgcaaga gggtcgagttcaggctccgcctggttttgcttactggggccaagggactc tggtcactgtctctgcagcc Amino Acid
(SEQ ID NO: 72)
QVQLQQPGAELVKPGASVKLSCKASGYTFTSYWIHWVQQRPGQGLEWIG

MIHPNSGITNYSEKFKSKATLTLDKSSSTAYMQLISLTSEDSAVYYCAR

GSSSGSAWFAYWGQGTLVTVSAA

HSV010-15_IgL

Nucleotide
(SEQ ID NO: 3)
gacatccagatgacacaatcttcatcctacttgtctgtttctctaggag gcagagtcaccattacttgcaaggcaagtgaccacattaataattggtt accttggtatcagcagaaaccaggaaatgctcctaggctcttaatttct ggtgcaaccagtttggaaactgggttccttcaagattcagtggcagtg gatctggaaaggattacactctcagcattaccagtcttcagactgaaga -continued tgttgctacttattactgtcaacagtattggagttctccgctcacgttc ggtgctgggaccaagctggagctgaaacgg Amino Acid
(SEQ ID NO: 74)
DIQMTQSSSYLSVSLGGRVTITCKASDHINNWLPWYQQKPGNAPRLLIS

GATSLETGVPSRFSGSGSGKDYTLSITSLQTEDVATYYCQQYWSSPLTF

GAGTKLELKR

HSV010-16_IgH

Nucleotide
(SEQ ID NO: 75)
cagatccagttggtacagtctggacctgagctgaagaagcctggagaga cagtcaagatctcctgcaaggcttctgggtataccttcacaacctatgg aatgagctgggtgaaacaggctccaggaaaggatttaaagtggatgggc tggataaacacctactctggagtgtcaacatatggtgatgacttcaagg gacggtttgccttgtctttggaaacctctgccagcactgcctatttaca aatcaacaacctcaaaaatgaggacacggctacatatttctgtgctcag ttaaactatggtatggactactggggtcaaggaacctcagtcaccgtct cctcagcc Amino Acid
(SEQ ID NO: 76)
QIQLVQSGPELKKPGETVKISCKASGYTFTTYGMSWVKQAPGKDLKWMG

WINTYSGVSTYGDDFKGRFALSLETSASTAYLQINNLKNEDTATYFCAQ

LNYGMDYWGQGTSVTVSSA

HSV010-16_IgL

Nucleotide
(SEQ ID NO: 77)
gacattgtgatgacccagtctcacaaattcatgtccacatcagtagga gacagggtcagcatcacctgcaaggccagtcaggatgtgagtacttct ttagcctggtatcaacagaaaccaggacaatctcctaaactactgatt tattcggcatcctaccggtacactggagtccctgatcgcttcactggc agtggatctgggacggatttcactttcaccatcagcagtgtgcaggct gaagacctggcagtttattactgtcaccaacattatagtattcctcgg acgttcggtggaggcaccaagctggaaatcaaacgg Amino Acid
(SEQ ID NO: 78)
DIVMTQSHKFMSTSVGDRVSITCKASQDVSTSLAWYQQKPGQSPKLLI

YSASYRYTGVPDRFTGSGSGTDFTFTISSVQAEDLAVYYCHQHYSIPR

TFGGGTKLEIKR

In embodiments, an antibody is provided having the heavy chain HCDR1, HCDR2, and HCDR3 of one of the heavy chain amino acid sequences listed above and a light chain LCDR1, LCDR2, and LCDR3 of any one of the light chain amino acid sequences listed above. In embodiments, both the heavy chain HCDR1, HCDR2, and HCDR3 and the light chain LCDR1, LCDR2, and LCDR3 are the same as the heavy chain HCDRs and light chains LCDRs of BMPC-23. In embodiments, both the heavy chain HCDR1, HCDR2, and HCDR3 and the light chain LCDR1, LCDR2, and LCDR3 are the same as the heavy chain HCDRs and light chains LCDRs of 33B8. In embodiments, both the heavy chain HCDR1, HCDR2 and HCDR3 and the light chain LCDR1, LCDR2, and LCDR3 are the same as the heavy chain HCDRs and light chains LCDRs of 22D10. In embodiments, both the heavy chain HCDR1, HCDR2, and HCDR3 and the light chain LCDR1, LCDR2, and LCDR3 are the same as the heavy chain HCDRs and light chains LCDRs of HSV010-4. In embodiments, both the heavy chain HCDR1, HCDR2, and HCDR3 and the light chain LCDR1, LCDR2, and LCDR3 are the same as the heavy chain HCDRs and light chains LCDRs of HSV010-8. In embodiments, both the heavy chain HCDR1, HCDR2, and HCDR3 and the light chain LCDR1, LCDR2, and LCDR3 are the same as the heavy chain HCDRs and light chains LCDRs of HSV010-7. In embodiments, both the heavy chain HCDR1, HCDR2, and HCDR3 and the light chain LCDR1, LCDR2, and LCDR3 are the same as the heavy chain HCDRs and light chains LCDRs of HSV010-34. In embodiments, both the heavy chain HCDR1, HCDR2, and HCDR3 and the light chain LCDR1, LCDR2, and LCDR3 are the same as the heavy chain HCDRs and light chains LCDRs of HSV010-6. In embodiments, both the heavy chain HCDR1, HCDR2, and HCDR3 and the light chain LCDR1, LCDR2, and LCDR3 are the same as the heavy chain HCDRs and light chains LCDRs of HSC010-9. In embodiments, both the heavy chain HCDR1, HCDR2, and HCDR3 and the light chain LCDR1, LCDR2, and LCDR3 are the same as the heavy chain HCDRs and light chains LCDRs of HSV010-13. In embodiments, both the heavy chain HCDR1, HCDR2, and HCDR3 and the light chain LCDR1, LCDR2, and LCDR3 are the same as the heavy chain HCDRs and light chains LCDRs of HSV010-14. In embodiments, both the heavy chain HCDR1, HCDR2, and HCDR3 and the light chain LCDR1, LCDR2, and LCDR3 are the same as the heavy chain HCDRs and light chains LCDRs of HSV010-15. In embodiments, both the heavy chain HCDR1, HCDR2, and HCDR3 and the light chain LCDR1, LCDR2, and LCDR3 are the same as the heavy chain HCDRs and light chains LCDRs of HSV010-16. In embodiments, both the heavy chain HCDR1, HCDR2, and HCDR3 and the light chain LCDR1, LCDR2, and LCDR3 are the same as the heavy chain HCDRs and light chains LCDRs of HSV010-28. In embodiments, both the heavy chain HCDR1, HCDR2, and HCDR3 and the light chain LCDR1, LCDR2, and LCDR3 are the same as the heavy chain HCDRs and light chains LCDRs of HSV010-20.

Provided is a nucleic acid encoding an antibody or an antigen-binding fragment thereof. Provided also is an isolated nucleic acid molecule encoding the antibody or antigen-binding fragment.

In embodiments, provided is a nucleic acid encoding a light chain of an antibody. In particular, the nucleic acid encodes a light chain variable region of an antibody. The light chain is a lambda chain or a kappa chain. In embodiments, the nucleic acid also encodes a human framework region. The nucleic acid may be an isolated nucleic acid molecule.

In embodiments, the nucleic acid encodes a light chain variable region of an antibody having a nucleic acid sequence which comprises: SEQ ID NO:21, SEQ ID NO:25, SEQ ID NO:29, SEQ ID NO:33, SEQ ID NO:69, SEQ ID NO:37, SEQ ID NO:41, SEQ ID NO:45, SEQ ID NO:49, SEQ ID NO:53, SEQ ID NO:57, SEQ ID NO:73, SEQ ID NO:77, SEQ ID NO:61, or SEQ ID NO:66. In embodiments, the nucleic acid encodes a light chain variable region of an antibody, wherein the light chain has a nucleic acid sequence having 95% or more identity to SEQ ID NO:21, SEQ ID NO:25, SEQ ID NO:29, SEQ ID NO:33, SEQ ID NO:69, SEQ ID NO:37, SEQ ID NO:41, SEQ ID NO:45, SEQ ID NO:49, SEQ ID NO:53, SEQ ID NO:57, SEQ ID NO:73, SEQ ID NO:77, SEQ ID NO:61, or SEQ ID NO:66.

In embodiments, the nucleic acid encodes a light chain variable region of an antibody having an amino acid sequence which comprises (LCDR1, LCDR2, and LCDR3 listed in respective order):

```
                                   (SEQ ID NO: 4)
      ESVDNFGISF;

(SEQ ID NO: 5)
      AAS;
      and (SEQ ID NO: 6)
      QQSKEVPLT,
      or (SEQ ID NO: 10)
      GNIHNY;

(SEQ ID NO: 11)
      HAE;
      and (SEQ ID NO: 12)
      QHFWSTPYT,
      or (SEQ ID NO: 16)
      QSLLNSRTRKNY;

(SEQ ID NO: 17)
      WAS;
      and (SEQ ID NO: 18)
      KQSYNLYT,
      or (SEQ ID NO: 82)
      QDISSY;

(SEQ ID NO: 83)
      RAN;
      and (SEQ ID NO: 84)
      LQYDEFPLT,
      or (SEQ ID NO: 86)
      QDINSY;

(SEQ ID NO: 83)
      RAN;
      and (SEQ ID NO: 84)
      LQYDEFPLT,
      or (SEQ ID NO: 90)
      DHINNW;

(SEQ ID NO: 91)
      GAA;
      and (SEQ ID NO: 92)
      QQYWSSPLT,
      or (SEQ ID NO: 96)
      DHINHW,
```

```
                              (SEQ ID NO: 97)
GAT, (SEQ ID NO: 98)
QQYWSTPYT,
or (SEQ ID NO: 90)
DHINNW;

(SEQ ID NO: 97)
GAT;
and (SEQ ID NO: 102)
QQYWSTPLT,
or (SEQ ID NO: 90)
DHINNW;

(SEQ ID NO: 97)
GAT;
and (SEQ ID NO: 92)
QQYWSSPLT,
or (SEQ ID NO: 110)
QDVSTS;

(SEQ ID NO: 111)
SAS;
and (SEQ ID NO: 112)
HQHYSIPRT,
or (SEQ ID NO: 114)
QDVSTA;

(SEQ ID NO: 111)
SAS;
and (SEQ ID NO: 115)
QQHYSTPRT,
or (SEQ ID NO: 119)
QIVRAT;

(SEQ ID NO: 120)
LAS;
and (SEQ ID NO: 122)
LQYWNYPYT.
```

In embodiments, the nucleic acid also encodes a human framework region. In embodiments, the light chain is a lambda chain or a kappa chain.

Provided is a nucleic acid encoding a heavy chain of an antibody. In particular, the nucleic acid encodes a light chain variable region of an antibody. In embodiments, the nucleic acid also encodes a human framework region. The nucleic acid may be an isolated nucleic acid molecule.

In embodiments, the nucleic acid encodes a heavy chain variable region of an antibody, wherein the heavy chain has a nucleic acid sequence which comprises: SEQ ID NO:19, SEQ ID NO:23, SEQ ID NO:27, SEQ ID NO:31, SEQ ID NO:67, SEQ ID NO:35, SEQ ID NO:39, SEQ ID NO:43, SEQ ID NO:47, SEQ ID NO:51, SEQ ID NO:55, SEQ ID NO:71, SEQ ID NO:75, SEQ ID NO:59, or SEQ ID NO:63.

In embodiments, the nucleic acid encodes a heavy chain variable region of an antibody, wherein the heavy chain has a nucleic acid sequence having 95% or more identity to SEQ ID NO:19, SEQ ID NO:23, SEQ ID NO:27, SEQ ID NO:31, SEQ ID NO:67, SEQ ID NO:35, SEQ ID NO:39, SEQ ID NO:43, SEQ ID NO:47, SEQ ID NO:51, SEQ ID NO:55, SEQ ID NO:71, SEQ ID NO:75, SEQ ID NO:59, or SEQ ID NO:63.

In embodiments, the nucleic acid encodes a heavy chain variable region of an antibody having an amino acid sequence which comprises (HCDR1, HCDR2, and HCDR3 listed in respective order):

```
                              (SEQ ID NO: 1)
GYSFTTYD;

(SEQ ID NO: 2)
IYPREGST;
and (SEQ ID NO: 3)
ATYGSSRYYTMDY,
or (SEQ ID NO: 7)
GYSITNGNH, (SEQ ID NO: 8)
IRSSGSS;
and (SEQ ID NO: 9)
ARGGGLRHYFDY
or (SEQ ID NO: 13)
GFTFTDYY;

(SEQ ID NO: 14)
IRNKANGYTT;
and (SEQ ID NO: 15)
ACGNYVGYAMDY,
or (SEQ ID NO: 79)
GFSLSRHD;

(SEQ ID NO: 80)
IWGDGST;
and (SEQ ID NO: 81)
AKEDYGIFPY,
or (SEQ ID NO: 85)
GFSLNNYD;

(SEQ ID NO: 80)
IWGDGST;
and (SEQ ID NO: 81)
AKEDYGIFPY,
or (SEQ ID NO: 87)
GYTFTNYD;

(SEQ ID NO: 88)
IYPRDGST;
and (SEQ ID NO: 89)
ARGIFYVNYDVY
or
```

```
                                            (SEQ ID NO: 93)
EYEFPSHD;

(SEQ ID NO: 94)
INSDGGST;
and (SEQ ID NO: 95)
ARHSSGYVLDY,
or (SEQ ID NO: 99)
GYTFTNYW;

(SEQ ID NO: 100)
IHPNIGIT;
and (SEQ ID NO: 101)
ARGSDSGSAWFAY,
or (SEQ ID NO: 103)
GYTFTSYW;

(SEQ ID NO: 104)
IHPNSGIT;
and (SEQ ID NO: 105)
ARGSNSGSAWFAY,
or (SEQ ID NO: 107)
GYTFTTYG;

(SEQ ID NO: 108)
INTYSGVS;
and (SEQ ID NO: 109)
AQLNYGMDY,
or (SEQ ID NO: 107)
GYTFTTYG;

(SEQ ID NO: 108)
INTYSGVS;
and (SEQ ID NO: 113)
AQVNYAMDY,
or (SEQ ID NO: 116)
GYSITSGYD;

(SEQ ID NO: 117)
ISYSGLT;
and (SEQ ID NO: 118)
ARGPPWYFDV.
```

In embodiments, the nucleic acid encodes a heavy chain variable region of an antibody having a nucleic acid sequence of SEQ ID NO:19 and a light chain variable region of an antibody having a nucleic acid sequence of SEQ ID NO:21. In embodiments, the nucleic acid encodes a heavy chain variable region of an antibody having a nucleic acid sequence of SEQ ID NO:23 and a light chain variable region of an antibody having a nucleic acid sequence of SEQ ID NO:25. In embodiments, the nucleic acid encodes a heavy chain variable region of an antibody having a nucleic acid sequence of SEQ ID NO:27 and a light chain variable region of an antibody having a nucleic acid sequence of SEQ ID NO:29. In embodiments, the nucleic acid encodes a heavy chain variable region of an antibody having a nucleic acid sequence of SEQ ID NO:31 and a light chain variable region of an antibody having a nucleic acid sequence of SEQ ID NO:33. In embodiments, the nucleic acid encodes a heavy chain variable region of an antibody having a nucleic acid sequence of SEQ ID NO:67 and a light chain variable region of an antibody having a nucleic acid sequence of SEQ ID NO:69. In embodiments, the nucleic acid encodes a heavy chain variable region of an antibody having a nucleic acid sequence of SEQ ID NO:35 and a light chain variable region of an antibody having a nucleic acid sequence of SEQ ID NO:37. In embodiments, the nucleic acid encodes a heavy chain variable region of an antibody having a nucleic acid sequence of SEQ ID NO:39 and a light chain variable region of an antibody having a nucleic acid sequence of SEQ ID NO:41. In embodiments, the nucleic acid encodes a heavy chain variable region of an antibody having a nucleic acid sequence of SEQ ID NO:43 and a light chain variable region of an antibody having a nucleic acid sequence of SEQ ID NO:45. In embodiments, the nucleic acid encodes a heavy chain variable region of an antibody having a nucleic acid sequence of SEQ ID NO:47 and a light chain variable region of an antibody having a nucleic acid sequence of SEQ ID NO:49. In embodiments, the nucleic acid encodes a heavy chain variable region of an antibody having a nucleic acid sequence of SEQ ID NO:51 and a light chain variable region of an antibody having a nucleic acid sequence of SEQ ID NO:53. In embodiments, the nucleic acid encodes a heavy chain variable region of an antibody having a nucleic acid sequence of SEQ ID NO:55 and a light chain variable region of an antibody having a nucleic acid sequence of SEQ ID NO:57. In embodiments, the nucleic acid encodes a heavy chain variable region of an antibody having a nucleic acid sequence of SEQ ID NO:71 and a light chain variable region of an antibody having a nucleic acid sequence of SEQ ID NO:73. In embodiments, the nucleic acid encodes a heavy chain variable region of an antibody having a nucleic acid sequence of SEQ ID NO:75 and a light chain variable region of an antibody having a nucleic acid sequence of SEQ ID NO:77. In embodiments, the nucleic acid encodes a heavy chain variable region of an antibody having a nucleic acid sequence of SEQ ID NO:59 and a light chain variable region of an antibody having a nucleic acid sequence of SEQ ID NO:61. In embodiments, the nucleic acid encodes a heavy chain variable region of an antibody having a nucleic acid sequence of SEQ ID NO:63 and a light chain variable region of an antibody having a nucleic acid sequence of SEQ ID NO:65.

In embodiments, the nucleic acid also encodes a human Fc region. In embodiments, the nucleic acid also encodes a human Fc region which binds to FcγRIII. In embodiments, the antibody or antigen-binding fragment comprises an Fc region which activates a human FcγRIII when bound thereto. In embodiments, the human FcγRIII receptor is FcγRIIIa. In embodiments, the heavy chain is a gamma chain.

In embodiments, a nucleic acid of the disclosure encodes a polypeptide which is less than 500 amino acids in length, which is less than 250 amino acids in length, or which is less than 120 amino acids in length. In embodiments, a nucleic acid of the disclosure encodes a polypeptide which is 70 to 100 amino acids in length.

In embodiments of the nucleic acids, the nucleic acid is a DNA. In embodiments, the nucleic acid is a cDNA. In embodiments, the nucleic acid is an RNA.

Nucleic acids disclosed herein are suitable for recombinant production of the antibodies or antigen-binding fragments disclosed herein. Thus, the invention also relates to vectors and host cells containing a nucleic acid sequence encoding the antibody or antigen-binding fragment.

A vector encoding a nucleic acid molecule described herein is provided. A host cell comprising one or more of the nucleic acids described herein, or the vector described herein, is also provided.

The antibody or antigen-binding fragment may be linked, or conjugated, to a heterologous molecule. The heterologous molecule may be a therapeutic agent such as a cytotoxic drug, a radioactive isotope, an immunomodulator, a second antibody, an anti-viral small molecule, or a combination thereof. In embodiments, the antibody or antigen-binding fragment, may be linked, or conjugated, to a therapeutic agent.

A method of inhibiting HSV-2 activity in a subject comprises administering an antibody or antigen-binding fragment in an amount effective to inhibit HSV-2 activity in the subject. The antibody or antigen-binding fragment can inhibit HSV-2 activity in a subject by clearing the virus from the subject, preventing dissemination of the HSV-2 in the subject, preventing the establishment of latency in the subject, and/or preventing infection of the subject with HSV-2.

In embodiments, the subject is infected with HSV-2. In embodiments, the subject is not yet infected with HSV-2. In embodiments, the subject is immunocompromised. In embodiments the immunocompromised patient has cancer, has undergone a transplant or is on an immunosuppressive medication. In embodiments, the subject is pregnant. In embodiments, the subject is a neonate.

In embodiments, the subject is receiving or has received an anti-viral therapy. The anti-viral therapy comprises administration of an anti-viral small molecule to the subject. The anti-viral small molecule comprises famcyclovir, penciclovir, valacyclovir, or a combination thereof. In embodiments, the anti-viral therapy comprises administration of the acyclovir to the subject.

A method of activating antibody-dependent cell cytotoxicity (ADCC) of a cell infected with HSV-2 comprises contacting the cell with an isolated antibody or antigen-binding fragment in an amount which effects ADCC of the cell.

In embodiments, the cell is in a subject is infected with HSV-2.

An antibody or antigen-binding fragment described herein, or a pharmaceutical composition comprising the antibody or antigen-binding fragment, for use in the treatment or prevention of a disease or condition that is associated with herpes simplex virus-2 (HSV-2) infection in a subject, is provided.

Use of an effective amount of an antibody or antigen-binding fragment described herein for the manufacture of a medicament for treating or preventing a disease or condition that is associated with an HSV-2 infection in a subject.

The antibody or antibodies described herein may be an isolated antibody or antibodies. Similarly, the antigen-binding fragment(s) described herein may be an isolated antigen-binding fragment(s).

In embodiments, the antibody or antigen-binding fragment thereof is chimeric or humanized. In embodiments, the antibody or antigen-binding fragment thereof has a human sequence Fc region.

In embodiments, the antibody or antigen-binding fragment comprises a monoclonal antibody, an scFv, a Fab fragment, a Fab' fragment, a F(ab')2 fragment, or a combination thereof.

In embodiments, the isolated antibody, the isolated antigen-binding fragment, the antibody, or the antigen-binding fragment comprises a monoclonal antibody, an scFv, an Fab fragment, an Fab' fragment, an F(ab')2 fragment, or a combination thereof. It is noted that while an scFv is not strictly a fragment of an antibody, rather it is a fusion protein, as used herein an antigen-binding fragment of an antibody includes an scFv unless otherwise indicated.

In embodiments, the methods are for the treatment and prevention of a neurological HSV-2 infection symptom in a subject.

In embodiments, the methods are for the treatment and prevention of an epithelial HSV-2 infection symptom.

In embodiments, the antibody or antigen-binding fragment thereof, comprises a VH framework comprising the framework sequence of a human germline as named in Table 2 or Table 4 and/or (ii) a VL framework comprising the framework sequence of human germline as named in Table 2 or Table 4. In embodiments, the antibody or antigen-binding fragment thereof, comprises a VH framework comprising 95% or more identity to a framework sequence of a human germline as named in Table 2 or Table 4 and/or (ii) a VL framework comprising 95% or more identity to a framework sequence of human germline as named in Table 2 or Table 4.

In embodiments, the antibody or fragment thereof, binds an HSV-2 surface antigen with a binding affinity ($K_D$) of from about $1\times10^{-9}$ molar (M) to about $1\times10^{-12}$ M.

A method of producing an antibody or antigen-binding fragment thereof as described herein is provided, comprising culturing a host cell, under conditions wherein the antibody or antigen-binding fragment thereof is produced by the host cell. The term "host cell" refers to a cell into which exogenous nucleic acid encoding the antibody or antigen-binding fragment has been introduced, including the progeny of such cells. Host cells include "transformants", "transformed cells", "transfectants", "transfected cells", and "transduced cells", which include the primary transformed/transfected/transduced cell and progeny derived therfrom without regard to the number of passages. Progeny may not be completely identical in nucleic acid content to a parent cell, but may contain mutations. Mutant progeny that have the same function or biological activity as screened or selected for in the originally transformed cell are also included.

The host cell may be a mammalian host cell. Examples of mammalian host cells for expressing the antibody or antigen binding fragment thereof provided herein include Chinese Hamster Ovary (CHO cells) such as CHO-K1, CHO-S, CHO-K1SV, NSO myeloma cells, COS cells, HEK293 cells, HKB11 cells, BHK21 cells, CAP cells, EB66 cells, SP2 cells, and Expi293F cells. In embodiments, the host cell is a Chinese hamster ovary (CHO) cell. In embodiments, the host cell is an Expi293F cell.

As used herein, the term "antibody" refers to an intact (whole) antibody, i.e. with complete Fe and Fv regions. Intact antibodies are glycoproteins comprising at least two heavy (H) chains and two light (L) chains interconnected by disulfide bonds. Each heavy chain is comprised of a heavy chain variable region (VH) and a heavy chain constant region. The heavy chain constant region is comprised of three domains, CH1, CH2 and CH3. Each light chain is comprised of a light chain variable region ($V_L$) and a light chain constant region. The light chain constant region is comprised of one domain, CL. The $V_H$ and $V_L$, regions are further subdivided into regions of hypervariability, termed complementarity determining regions (CDR), interspersed with regions that are more conserved, termed framework regions (FR). Each VH and $V_L$ is composed of three CDRs and four FRs, arranged from amino-terminus to carboxyterminus in the following order: FR1, CDR1, FR2, CDR2, FR3, CDR3, FR4. The variable regions of the heavy and light chains contain a binding domain or binding portion that interacts with an antigen.

As used herein, the terms "antigen-binding fragment" or "antigen-binding portion" refer to any portion of an antibody, or portions of an antibody linked together, which is less than the whole antibody but which retains the ability to specifically bind to an antigen. The antigen-binding fragment competes with the intact antibody of which it is a fragment for specific binding. In this case, the antigen is an HSV-2 antigen. The antigen may also be an HSV-1 antigen. An "antibody" or a "fragment" thereof can comprise an immunoglobulin of any class, e.g., IgG, IgM, IgA, IgD and IgE. An exemplary class is IgG and an exemplary isotype is IgG2c.

Examples encompassed within the terms "antigen-binding fragment" or "antigen-binding portion" of an antibody include a Fab fragment (a monovalent fragment consisting of the $V_L$ $V_H$, $C_L$, and $C_{H1}$ domains), a F(ab')$_2$ fragment (a bivalent fragment comprising two Fab fragments linked by a disulfide bridge at the hinge region), a Fab' fragment (monovalent fragment produced by reduction of F(ab')$_2$ fragment, and which have a free sulfhydryl group), a fragment consisting of the $V_L$ and $V_H$ domains of a single arm of an antibody, a Fv fragment (a fragment consisting of the $V_L$ and $V_H$ domains of a single arm of an antibody), a single chain fragment (scFv, a variable domain light chain (VL) and a variable domain heavy chain (VH) linked via a peptide linker), a dAb fragment (consists of a $V_H$ domain); an isolated complementarity determining region (CDR), a nanobody (a heavy chain variable region containing a single variable domain and two constant domains), mutants thereof, naturally occurring variants, fusion proteins comprising an antibody portion with an antigen recognition site of the required specificity, humanized antibodies, chimeric antibodies, and any other modified configuration of the immunoglobulin molecule that comprises an antigen recognition site of the required specificity.

Antigen-binding fragments can be prepared, for example, by cleaving an intact antibody or by recombinant means. See generally, Fundamental Immunology, Ch. 7 (Paul, W., ed., 2nd ed. Raven Press, N.Y. (1989), hereby incorporated by reference in its entirety). Antigen-binding fragments may be produced by recombinant DNA techniques or by enzymatic or chemical cleavage of intact antibodies or by molecular biology techniques. In some embodiments, a fragment is an Fab, Fab', F(ab')2, Fd, Fv, complementarity determining region (CDR) fragment, or single-chain antibody (scFv). In the case of the scFv fragment, the $V_L$ and VH are coded by separate genes and are joined together, through recombinant means, by a synthetic linker that enables them to be made as a single protein chain in which the VL and VH regions pair to form monovalent molecules. In embodiments, the scFv comprises a variable domain framework sequence having a sequence identical to a human variable domain FR1, FR2, FR3 or FR4. In embodiments, the scFv comprises a synthetic linker, which is a peptide from 5 to 30 amino acid residues long. For example, the scFv comprises a linker peptide comprising one or more of glycine, serine, and threonine residues. In embodiments the linker of the scFv is 10-25 amino acids in length. In embodiments the peptide linker comprises glycine, serine and/or threonine residues. (For example, see Bird et al., Science, 242: 423-426 (1988) and Huston et al., Proc. Natl. Acad. Sci. USA, 85:5879-5883 (1988), each of which are hereby incorporated by reference in their entirety).

The antigen-binding fragment can be a polypeptide that contains at least a portion of an antibody that is sufficient to confer HSV-2 antigen-specific binding on the polypeptide, including a diabody. From N-terminus to C-terminus, both the mature light and heavy chain variable domains comprise the regions FR1, CDR1, FR2, CDR2, FR3, CDR3 and FR4. The assignment of amino acids to each domain is in accordance with the definitions of Kabat, Sequences of Proteins of Immunological Interest (National Institutes of Health, Bethesda, Md. (1987 and 1991)), Chothia & Lesk, J. Mol. Biol. 196:901-917 (1987), or Chothia et al. (Nature 342: 878-883 (1989)), each of which are hereby incorporated by reference in their entirety. As used herein, the term "polypeptide" encompasses native or artificial proteins, protein fragments, and/or polypeptide analogs of a protein sequence. A polypeptide may be monomeric or polymeric. As used herein, an Fd fragment means an antibody fragment that consists of the VH and CH1 domains; an Fv fragment consists of the V1 and VH domains of a single arm of an antibody; and a dAb fragment (Ward et al., Nature 341:544-546 (1989) hereby incorporated by reference in its entirety) consists of a VH domain. In some embodiments, fragments are at least 5, 6, 8 or 10 amino acids long. In other embodiments, the antigen-binding fragment is at least 14, at least 20, at least 50, or at least 70, 80, 90, 100, 150 or 200 amino acids long.

The term "monoclonal antibody" or "mAb" as used herein refers to an antibody member of a population of substantially homogeneous antibodies, i.e., the individual antibodies comprising the population are identical except for possible mutations, e.g., naturally occurring mutations, that may be present in minor amounts. Thus, the modifier "monoclonal" indicates the character of the antibody as not being a mixture of discrete antibodies. In contrast to polyclonal antibody preparations, which typically include different antibodies directed against different antigenic determinants (epitopes), each monoclonal antibody of a monoclonal antibody preparation is directed against a single determinant on an antigen. In addition to their specificity, monoclonal antibody preparations are advantageous in that they are typically uncontaminated by other immunoglobulins. Thus an identified monoclonal antibody can be produced by non-hybridoma techniques, e.g. by appropriate recombinant means, once the sequence thereof is identified.

In embodiments of the inventions described herein, the antibody is isolated. As used herein, the term "isolated antibody" refers to an antibody that by virtue of its origin or source of derivation has at least one (e.g., one, two, three, or four) of the following: (1) is not associated with naturally associated components that accompany it in its native state, (2) is free of other proteins from the same species, (3) is expressed by a cell from a different species, or (4) does not occur in nature absent the hand of man.

In embodiments the antibody is humanized. As used herein, a "humanized antibody" refers to forms of antibodies that contain sequences from both human and non-human (e.g., murine, rat) antibodies. Humanized forms of non-human (e.g., murine) antibodies are chimeric antibodies that contain minimal sequence derived from non-human immunoglobulin. In one embodiment, a humanized antibody is an antibody having the sequence of a human immunoglobulin (recipient antibody) but the residues from a murine hypervariable region (HVR) (or CDR). In embodiments, framework (FR) residues of the murine mAb are replaced with corresponding human immunoglobulin variable domain framework (FR) residues. These humanized antibodies may be modified further to refine antibody performance. The humanized antibodies may comprise residues that are not found in the recipient antibody or in the donor antibody. Alternatively, the humanized antibodies do not comprise residues that are not found in the recipient antibody or in the donor antibody. In general, a humanized antibody will comprise substantially all of at least one, and typically two, variable domains, in which all, or substantially all, of the hypervariable loops correspond to those of a non-human immunoglobulin, and all, or substantially all, of the FRs are those of a human immunoglobulin sequence. The humanized antibody optionally will also comprise at least a portion of an immunoglobulin constant region (Fc), typically that of a human immunoglobulin. See, e.g., Jones et al., Nature 321:522-525 (1986); Riechmann et al., Nature 332:323-329 (1988); Presta, Curr. Op. Struct. Biol. 2:593-596 (1992); Vaswani and Hamilton, Ann. Allergy, Asthma & Immunol. 1:105-115 (1998); Harris, Biochem. Soc. Transactions 23:1035-1038 (1995); Hurle and Gross, Curr. Op. Biotech. 5:428-433 (1994); and U.S. Pat. Nos. 6,982,321 and 7,087,409, the contents of each of which are hereby incorporated by reference in their entirety. In one embodiment the humanized antibodies comprise residues that are not found in the recipient antibody or in the donor antibody, and the Fc regions of the humanized antibodies are modified as described in WO 99/58572, the content of which is hereby incorporated by reference in its entirety.

Techniques to humanize a monoclonal antibody are well known and are described in, for example, U.S. Pat. Nos. 4,816,567; 5,807,715; 5,866,692; 6,331,415; 5,530,101; 5,693,761; 5,693,762; 5,585,089; and 6,180,370, the content of each of which is hereby incorporated by reference in its entirety. A number of "humanized" antibody molecules comprising an antigen-binding site derived from a non-human immunoglobulin have been described, including antibodies having rodent or modified rodent V regions and their associated complementarity determining regions (CDRs) fused to human constant domains. See, for example, Winter et al. Nature 349: 293-299 (1991), Lobuglio et al. Proc. Nat. Acad. Sci. USA 86: 4220-4224 (1989), Shaw et al. J. Immunol. 138: 4534-4538 (1987), and Brown et al. Cancer Res. 47: 3577-3583 (1987), the content of each of which is hereby incorporated by reference in its entirety. Other references describe rodent hypervariable regions or CDRs grafted into a human supporting framework region (FR) prior to fusion with an appropriate human antibody constant domain. See, for example, Riechmann et al. Nature 332: 323-327 (1988), Verhoeyen et al. Science 239: 1534-1536 (1988), and Jones et al. Nature 321: 522-525 (1986), the content of each of which is hereby incorporated by reference in its entirety. Another reference describes rodent CDRs supported by recombinantly veneered rodent framework regions—European Patent Publication No. 0519596 (incorporated by reference in its entirety). These "humanized" molecules are designed to minimize unwanted immunological response toward rodent anti-human antibody molecules which limits the duration and effectiveness of therapeutic applications of those moieties in human recipients. The antibody constant region can be engineered such that it is immunologically inert (e.g., does not trigger complement lysis). See, e.g. PCT Publication No. WO99/58572; UK Patent Application No. 9809951.8. Other methods of humanizing antibodies that may also be utilized are disclosed by Daugherty et al., Nucl. Acids Res. 19: 2471-2476 (1991) and in U.S. Pat. Nos. 6,180,377; 6,054,297; 5,997,867; 5,866,692; 6,210,671; and 6,350,861; and in PCT Publication No. WO 01/27160 (each incorporated by reference in their entirety).

In embodiments, the antibodies or fragments herein can be produced recombinantly, for example antibodies expressed using a recombinant expression vector transfected into a host cell, antibodies isolated from a recombinant, combinatorial human antibody library, antibodies isolated from an animal (e.g., a mouse) that is transgenic for human immunoglobulin genes.

The "variable region" or "variable domain" of an antibody refers to the amino-terminal domains of the heavy or light chain of the antibody. The variable domain of the heavy chain may be referred to as "VH." The variable domain of the light chain may be referred to as "VL." These domains are generally the most variable parts of an antibody and contain the antigen-binding sites. The term "variable" refers to the fact that certain portions of the variable domains differ extensively in sequence among antibodies and are used in the binding and specificity of each particular antibody for its particular antigen. However, the variability is not evenly distributed throughout the variable domains of antibodies. It is concentrated in three segments called hypervariable regions (HVRs) (or CDRs) both in the light-chain and the heavy-chain variable domains. The more highly conserved portions of variable domains are called the framework regions (FR). The variable domains of native heavy and light chains each comprise four FR regions, largely adopting a beta-sheet configuration, connected by three CDRs, which form loops connecting, and in some cases forming part of, the beta-sheet structure. The CDRs in each chain are held together in close proximity by the FR regions and, with the CDRs from the other chain, contribute to the formation of the antigen-binding site of antibodies (see Kabat et al., Sequences of Proteins of Immunological Interest, Fifth Edition, National Institute of Health, Bethesda, Md. (1991)). The constant domains are not involved directly in the binding of an antibody to an antigen, but exhibit various effector functions, such as participation of the antibody in antibody-dependent cellular toxicity.

The "light chains" of an antibody (immunoglobulin) from any vertebrate species can be assigned to one of two clearly distinct types, called kappa (κ) and lambda (λ), based on the amino acid sequences of their constant domains.

"Framework" or "FR" residues are those variable domain residues other than the HVR residues as herein defined.

In embodiments, the antibody herein has a human Fc region. The term "Fe region" herein is used to define a C-terminal region of an immunoglobulin heavy chain, including native sequence Fc regions and variant Fc regions. Although the boundaries of the Fc region of an immunoglobulin heavy chain might vary, the human IgG heavy chain Fc region is usually defined to stretch from an amino acid residue at position Cys226, or from Pro230, to the carboxyl-terminus thereof. The C-terminal lysine of the Fc region may be removed, for example, during production or purification of the antibody, or by recombinantly engineering the nucleic acid encoding a heavy chain of the antibody. Accordingly, an intact antibody as used herein may be an antibody with or without the otherwise C-terminal lysine.

Compositions or pharmaceutical compositions comprising the antibodies, scFvs or fragments of antibodies disclosed herein are preferably comprise stabilizers to prevent loss of activity or structural integrity of the protein due to the effects of denaturation, oxidation or aggregation over a period of time during storage and transportation prior to use. The compositions or pharmaceutical compositions can comprise one or more of any combination of salts, surfactants, pH and tonicity agents such as sugars can contribute to overcoming aggregation problems. Where a composition or pharmaceutical composition of the present invention is used as an injection, it is desirable to have a pH value in an approximately neutral pH range, it is also advantageous to minimize surfactant levels to avoid bubbles in the formulation which are detrimental for injection into subjects. In embodiments, the composition or pharmaceutical composition is in liquid form and stably supports high concentrations of bioactive antibody in solution and is suitable for inhalational or parenteral administration. In embodiments, the composition or pharmaceutical composition is formulated for administration to a mammalian subject, and specifically, a human subject. In embodiments, the composition or pharmaceutical composition is formulated for intravenous, intramuscular, intraperitoneal, intradermal and/or subcutaneous injection. In embodiments, the composition or pharmaceutical composition can be in liquid form and has minimized risk of bubble formation and anaphylactoid side effects. In embodiments, the composition or pharmaceutical composition is isotonic. In an embodiment, the composition or pharmaceutical composition has a pH or 6.8 to 7.4.

In embodiments the scFvs or fragments of antibodies disclosed herein are lyophilized and/or freeze dried and are reconstituted for use.

Examples of pharmaceutically acceptable carriers include, but are not limited to, phosphate buffered saline solution, sterile water (including water for injection USP), emulsions such as oil/water emulsion, and various types of wetting agents. Exemplary diluents for aerosol or parenteral administration are phosphate buffered saline or normal (0.9%) saline, for example 0.9% sodium chloride solution, USP. Compositions comprising such carriers are formulated by well-known conventional methods (see, for example, Remington's Pharmaceutical Sciences, 18th edition, A. Gennaro, ed., Mack Publishing Co., Easton, Pa., 1990; and Remington, The Science and Practice of Pharmacy 20th Ed. Mack Publishing, 2000, the content of each of which is hereby incorporated in its entirety). In non-limiting examples, the can comprise one or more of dibasic sodium phosphate, potassium chloride, monobasic potassium phosphate, polysorbate 80 (e.g. 2-[2-[3,5-bis(2-hydroxyethoxy)oxolan-2-yl]-2-(2-hydroxyethoxy)ethoxy]ethyl (E)-octadec-9-enoate), disodium edetate dehydrate, sucrose, monobasic sodium phosphate monohydrate, and dibasic sodium phosphate dihydrate.

The antibodies, or fragments of antibodies, or compositions, or pharmaceutical compositions described herein can also be lyophilized or provided in any suitable forms including, but not limited to, injectable solutions or inhalable solutions, gel forms and tablet forms.

Substitution variants of the antibodies are encompassed by the present invention. Substitution variants have at least one amino acid residue in the antibody molecule removed and a different residue inserted in its place. The sites of greatest interest for substitutional mutagenesis include the hypervariable regions, but framework alterations are also contemplated. Conservative substitutions are shown in Table 1 under the heading of "conservative substitutions." If such substitutions result in a change in biological activity, then more substantial changes, denominated "exemplary substitutions" in Table 1, or as further described below in reference to amino acid classes, may be introduced and the products screened.

TABLE 1

Amino Acid Substitutions

| Original Residue | Conservative Substitutions | Exemplary Substitutions |
|---|---|---|
| Ala (A) | Val | Val; Leu; Ile |
| Arg (R) | Lys | Lys; Gln; Asn |
| Asn (N) | Gln | Gln; His; Asp, Lys; Arg |
| Asp (D) | Glu | Glu; Asn |
| Cys (C) | Ser | Ser; Ala |
| Gln (Q) | Asn | Asn; Glu |
| Glu (E) | Asp | Asp; Gln |
| Gly (G) | Ala | Ala |
| His (H) | Arg | Asn; Gln; Lys; Arg |
| Ile (I) | Leu | Leu; Val; Met; Ala; Phe; Norleucine |
| Leu (L) | Ile | Norleucine; Ile; Val; Met; Ala; Phe |
| Lys (K) | Arg | Arg; Gln; Asn |
| Met (M) | Leu | Leu; Phe; Ile |
| Phe (F) | Tyr | Leu; Val; Ile; Ala; Tyr |
| Pro (P) | Ala | Ala |
| Ser (S) | Thr | Thr |
| Thr (T) | Ser | Ser |
| Trp (W) | Tyr | Tyr; Phe |
| Tyr (Y) | Phe | Trp; Phe; Thr; Ser |
| Val (V) | Leu | Ile; Leu; Met; Phe; Ala; Norleucine |

Substantial modifications in the biological properties of the antibody are accomplished by selecting substitutions that differ significantly in their effect on maintaining (a) the structure of the polypeptide backbone in the area of the substitution, for example, as a β-sheet or helical conformation, (b) the charge or hydrophobicity of the molecule at the target site, or (c) the bulk of the side chain. Naturally occurring residues are divided into groups based on common side-chain properties:

(1) Non-polar: Norleucine, Met, Ala, Val, Leu, Ile;
(2) Polar without charge: Cys, Ser, Thr, Asn, Gln;
(3) Acidic (negatively charged): Asp, Glu;
(4) Basic (positively charged): Lys, Arg;
(5) Residues that influence chain orientation: Gly, Pro; and
(6) Aromatic: Trp, Tyr, Phe, His.

Non-conservative substitutions are made by exchanging a member of one of these classes for another class.

One type of substitution, for example, that may be made is to change one or more cysteines in the antibody, which may be chemically reactive, to another residue, such as, without limitation, alanine or serine. For example, there can be a substitution of a non-canonical cysteine. The substitution can be made in a CDR or framework region of a variable domain or in the constant region of an antibody. In some embodiments, the cysteine is canonical. Any cysteine residue not involved in maintaining the proper conformation of the antibody also may be substituted, generally with serine, to improve the oxidative stability of the molecule and prevent aberrant cross-linking. Conversely, cysteine bond(s) may be added to the antibody to improve its stability, particularly where the antibody is an antibody fragment such as an Fv fragment.

The antibodies may also be modified, e.g. in the variable domains of the heavy and/or light chains, e.g., to alter a binding property of the antibody. Changes in the variable region can alter binding affinity and/or specificity. In some embodiments, no more than one to five conservative amino acid substitutions are made within a CDR domain. In other embodiments, no more than one to three conservative amino acid substitutions are made within a CDR domain.

An antibody described herein can be recombinantly produced. An antibody produced in the eukaryotic expression system comprises glycosylation at a residue on the Fc portion corresponding to Asn297.

In embodiments the composition or pharmaceutical composition comprising the antibody, or antigen-binding fragment thereof, described herein is substantially pure with regard to the antibody, or antigen-binding fragment thereof. A composition or pharmaceutical composition comprising the antibody, or antigen-binding fragment thereof, described herein is "substantially pure" with regard to the antibody or fragment when at least 60% to 75% of a sample of the composition or pharmaceutical composition exhibits a single species of the antibody, or antigen-binding fragment thereof. A substantially pure composition or pharmaceutical composition comprising the antibody, or antigen-binding fragment thereof, described herein can comprise, in the portion thereof which is the antibody, or antigen-binding fragment, 60%, 70%, 80% or 90% of the antibody, or antigen-binding fragment, of the single species, more usually about 95%, and preferably over 99%. Purity or homogeneity may be tested by a number of means well known in the art, such as polyacrylamide gel electrophoresis or HPLC.

In embodiments of the methods, the subject is a mammal.

In embodiments, the mammal is a human.

All combinations of the various elements described herein are within the scope of the invention unless otherwise indicated herein or otherwise clearly contradicted by context.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. The terms "comprising", "including" and "having" are intended to be inclusive and mean that there may be additional elements other than the listed elements.

Pharmaceutically acceptable: The term "pharmaceutically acceptable" as used herein means approved by a regulatory agency of the Federal or a state government or listed in the U.S. Pharmacopoeia, other generally recognized pharmacopoeia in addition to other formulations that are safe for use in animals, and more particularly in humans and/or non-human mammals. Pharmaceutically acceptable carrier: The term "pharmaceutically acceptable carrier" as used herein refers to an excipient, diluent, preservative, solubilizer, emulsifier, adjuvant, and/or vehicle with which the present antibody or fragment is administered. Such carriers may be sterile liquids, such as water and oils, including those of petroleum, animal, vegetable or synthetic origin, such as peanut oil, soybean oil, mineral oil, sesame oil and the like, polyethylene glycols, glycerine, propylene glycol or other synthetic solvents. Antibacterial agents such as benzyl alcohol or methyl parabens; antioxidants such as ascorbic acid or sodium bisulfite; chelating agents such as ethylenediaminetetraacetic acid; and agents for the adjustment of tonicity such as sodium chloride or dextrose may also be a carrier. Methods for producing compositions in combination with carriers are known to those of skill in the art. In some embodiments, the language "pharmaceutically acceptable carrier" is intended to include any and all solvents, dispersion media, coatings, isotonic and absorption delaying agents, and the like, compatible with pharmaceutical administration. The use of such media and agents for pharmaceutically active substances is well known in the art. See, e.g., Remington, The Science and Practice of Pharmacy. 20" ed., (Lippincott, Williams & Wilkins 2003). Except insofar as any conventional media or agent is incompatible with the active compound, such use in the compositions is contemplated.

It is understood that aspects and embodiments of the invention described herein include "consisting" and/or "consisting essentially of" aspects and embodiments.

Throughout this disclosure, various aspects of this invention may be presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Other objects, advantages and features of the present invention will become apparent from the following specification taken in conjunction with the accompanying drawings.

While the disclosure has been described with reference to various embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

This invention may be better understood from the Experimental Details, which follow.

EXPERIMENTAL DETAILS

A candidate HSV-2 single-cycle viral vaccine deleted in the immunodominant envelope glycoprotein D (designated ΔgD-2) induces high-titer antibodies that are able to actively and passively protect mice from HSV disease in murine models. These antibodies are weakly neutralizing, but potently activate the murine Fe gamma receptor IV (FcγRIV) to activate antibody dependent cell mediated cytotoxicity (ADCC). The present disclosure has analyzed, cloned, sequenced and tested monoclonal antibodies (mAbs) isolated from the germinal center B cells of immunized mice and identified several that passively protect mice against viral disease. Certain mAbs were sufficiently active to be used for prophylaxis and treatment of patients with HSV (e.g. in humanized form) or at risk for disseminated disease (e.g. neonates, immunocompromised hosts).

Mice were prime-boost immunized with ΔgD-2 and the spleens, draining lymph nodes or bone marrow were isolated. Germinal center (GC) B cells were then cultured on NB-21.2D9 cells (Nojima cultures). After culture, supernatants were screened for the presence of HSV-lysate binding IgG by ELISA. The V(D)J rearrangements amplified from selected GC B-cell cultures for the B-cell antigen receptor (BCR) repertoire analysis in GC B cell clones among individual mice were sequenced. Then, reconstituted antibodies from selected single GC B cell cultures and from single, bone marrow plasmacytes were evaluated for ability to activate the mFcγRIV in vitro and to protect mice in a passive transfer model.

Briefly, mice were vaccinated with ΔgD-2 and then 16 days after vaccination, the draining, inguinal lymph nodes were harvested. GC B cells were isolated from these tissues and were cultured in Nojima cultures. Although overall cloning efficiency of GC B cells from these (shipped) tissues was lower than those from freshly isolated tissues (6% vs. 20%), 50 GC clones were obtained that were specific to HSV-2 G strain (HSV-2 G or HSV2-G) lysate. An ELISA was performed against HSV-2 G lysates and uninfected Vero lysates (control), and the results are shown in FIG. 1. GC B cells from inguinal lymph nodes of mice vaccinated with ΔgD-2 were sorted directly into 96-well plates (1 cell/well). These GC B cells were then cultured in the presence of NB-21.2D9 feeder cells. After culture, presence of IgG was first determined by ELISA, and then the reactivity of culture supernatant IgG against HSV-2 G lysates (HSV-2 G) and uninfected Vero lysates were tested by ELISA.

Figure 2:
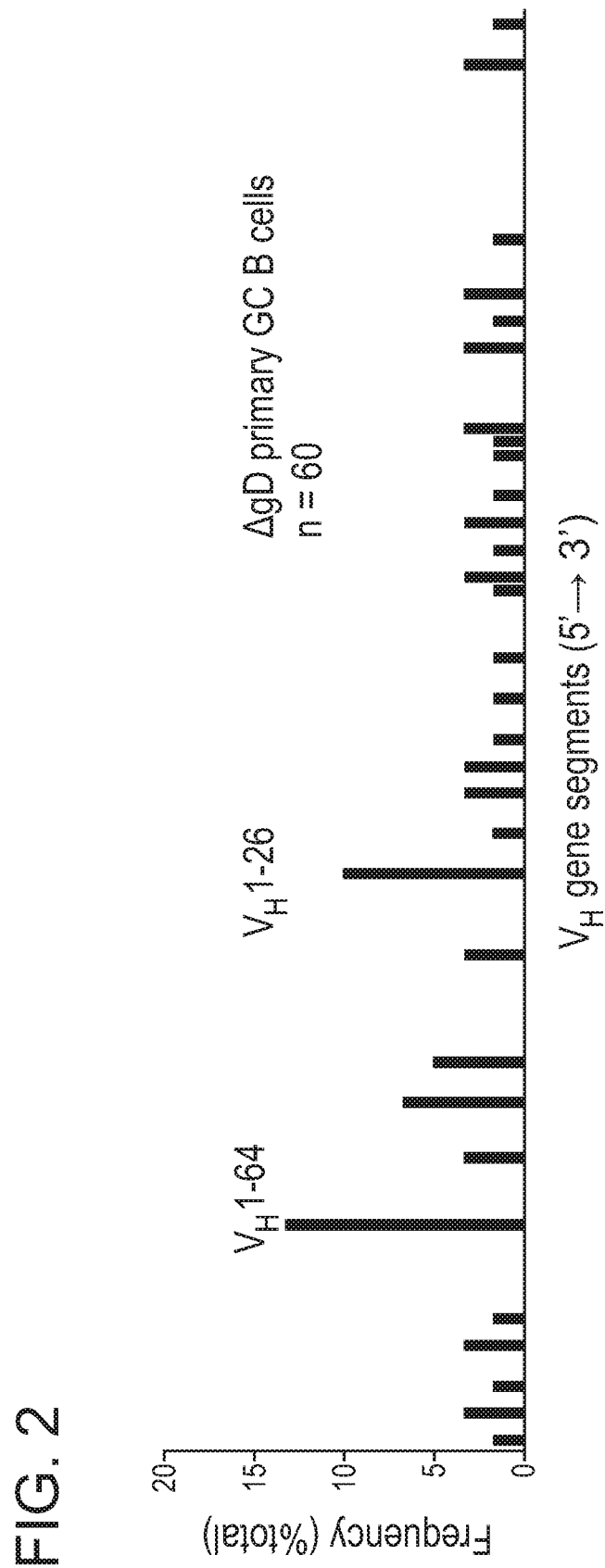
FIG. 2: Distribution of VH gene segments obtained from d16-d17 GC B cells.

The molecular genetics of the GC B cells were analyzed (FIG. 2). V(D)J rearrangements were amplified from cDNA of the HSV-2 G lysate-reactive, IgG+ cultures and then cloned and sequenced. The rearranged V, D, and J gene segments were determined using IMGT V-QUEST (see world wide web at imgt.org/). A diverse set of VH gene segments were used by HSV2-specific GC B cells. VH1-64 and VH1-26 appeared more frequently (~10%) than other gene segments.

Figure 3A:
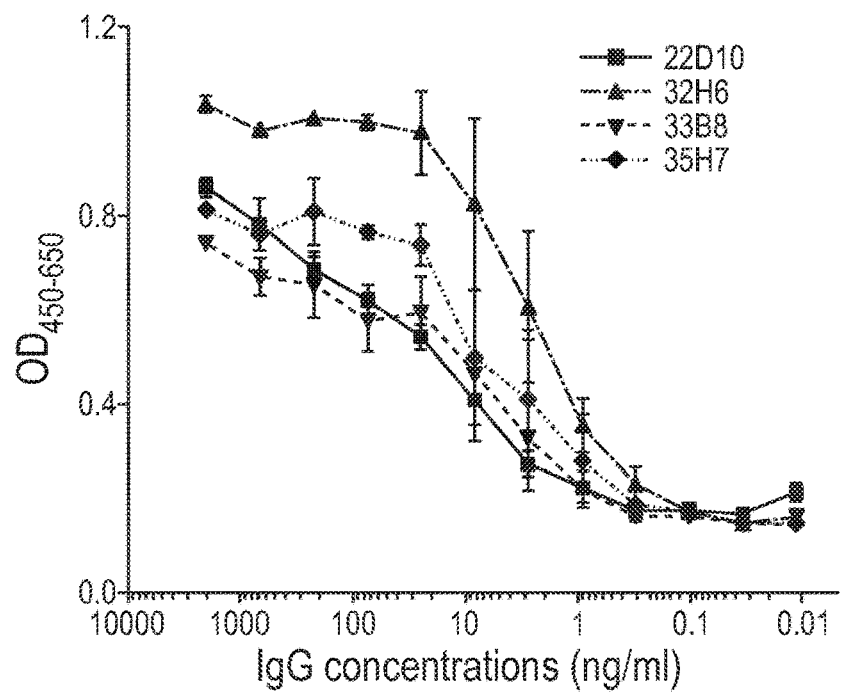
FIGS. 3A-3B: Retention of HSV-2 G lysate-binding by recombinant antibodies (22D10, 32H6, 33B8, and 35H7). Binding of recombinant antibodies to HSV-2 G lysates was tested by ELISA. Both heavy and light chain V(D)J rearrangements were amplified from selected single B-cell culture wells (22D10, 32H6, 33B8, and 35H7) by standard RT-PCR. These cloned V(D)J rearrangements were introduced into expression vectors. Recombinant antibodies were obtained by co-transfection of these expression vectors into Expi293F cells. ≥4 mg of purified IgGs was obtained (not shown). These antibodies did not bind to control, uninfected Vero lysate.
Figure 3B:
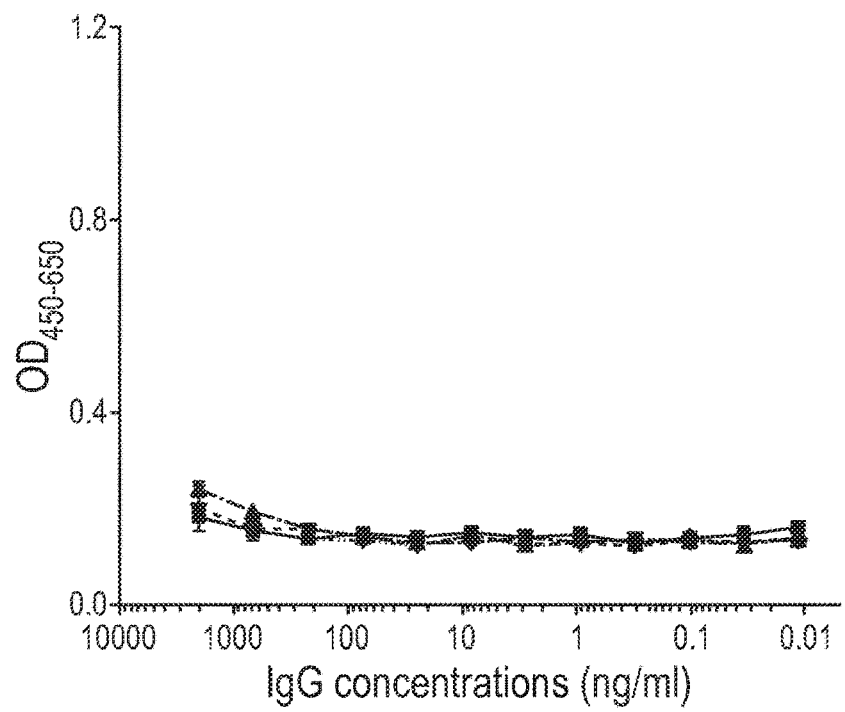

Based on the obtained V(D)J sequences from each B-cell culture, paired heavy and light chains were re-expressed (as recombinant mouse IgG1 and IgG2c antibodies) in Expi293F cells (Kuraoka et al. *Immunity* 2016; DiLillo et al. *Nature Medicine* 2013). Then, 4 independent, HSV-2 G lysate reactive, IgG+ single B-cell cultures were selected from day 16 GC B cells. As expected, all recombinant antibodies reacted specifically with HSV-2 G lysates (FIG. 3). Clone 32H6 bound most avidly to the lysates, followed by 35H7, 22D10, and 33B8. FIG. 3 shows retention of HSV-2 G lysate-binding by recombinant antibodies. Binding of recombinant antibodies to HSV-2 G lysates was tested by ELISA. Both heavy and light chain V(D)J rearrangements were amplified from selected single B-cell culture wells (22D10, 32H6, 33B8, and 35H7) by standard RT-PCR. These cloned V(D)J rearrangements were introduced into expression vectors. Recombinant antibodies were obtained by co-transfection of these expression vectors into Expi293F cells. ≥4 mg of purified IgGs was obtained (not shown). These antibodies did not bind to control, uninfected Vero lysate. These recombinant antibodies (≥4 mg each) were tested for identification of reacting antigen(s), in an in vitro FcγRIV activation assay (Promega FcγRIV ADCC Reporter Bioassay)(FIG. 4), and in vivo protection assay.

ΔgD-2 prime-boost vaccinations establish long-lasting, HSV-reactive (and protective) serum IgG responses in mice as evidenced by results showing that 8 months post-boost, mice were still protected from HSV challenge. These results suggest that the vaccinations successfully establish long-lived plasmacytes. It was hypothesized that HSV-reactive plasmacytes could be isolated that produce protective IgGs from bone marrow of mice that had received the prime-boost vaccination. Compared with naïve mice, ΔgD-2 vaccinated mice contained 4-fold higher frequency of surface IgM-CD138hiB220lo/-FSChi plasmacytes in the bone marrow in experiments where bone marrow plasmacytes were isolated from ΔgD-2 vaccinated mice.

To analyze molecular genetics of the bone marrow plasmacytes, V(D)J rearrangements were amplified from cDNA of single, sIgM⁻CD138$^{hi}$B220$^{lo/-}$FSChi plasmacytes, and then cloned and sequenced the amplicand products. The rearranged V, D, and J gene segments were determined using IMGT V-QUEST (available on world wide web at imgt.org/). From 96 individual cells we recovered 21 pairs of heavy and light chains and 4 heavy chain only clones (Table 1). The 25 heavy chain sequences consisted of four IgG3 (16%), nine IgG1 (36%), seven IgG2b (28%), four IgG2c (16%), and one IgA (4%) isotypes. Twenty individual clones (80%) carried at least one nucleotide substitution in $V_H$ gene segment (average 4.4 $V_H$ mutations). A summary of V(D)J rearrangements recovered from bone marrow plasmacytes of AgD:HSV vaccinated mice is provided in Table 2 below. As shown in Table 2, the CDR3 show conserved residues (C, W for HDCR and C, F for LCDR). With the exception of BMPC-7, the IgG2b or IgG2c clones (gray rows in Table 2) carried $V_H$ and $V_L$ mutations, suggesting that these plasmacyte clones are generated through GC responses.

TABLE 2

| ID | VH | D | JH | VH mut | HCDR3 | IgG isotype | VL | JL | VL mut | LCDR3 | Note |
|---|---|---|---|---|---|---|---|---|---|---|---|
| BMPC-3 | IGHV1-80 | IGHD4- | IGHJ3 | 6 | CARGTYW SEQ ID No: 122 | IgG3 | IGKV4-55 | IGKJ4 | 3 | DQQWSGYPFTF SEQ ID No: 123 | |
| BMPC-49 | IGHV5-12 | — | IGJJ4 | 3 | CVRLDAMDYW SEQ ID No: 124 | IgG3 | IGKV1-110 | IGKJ2 | 3 | CSQSTHVPYTF SEQ ID No: 125 | |
| BMPC-67 | IGHV1-53 | IGHD2-5 | IGHJ4 | 3 | CARRGYYSNYGAMD YW SEQ ID No: 126 | IgG3 | IGKV4-55 | IGKJ4 | 2 | CQQWSSYPPTF SEQ ID No: 127 | |
| BMPC-96 | IGHV3-6 | IGHD2-5 | IGHJ1 | 3 | CAREGDSNYDWYFD VW SEQ ID No: 128 | IgG3 | IGKV12-41 | IGKJ1 | 3 | CQHFWSPVTF SEQ ID No: 129 | |

TABLE 2-continued

| ID | VH | D | JH | VH mut | HCDR3 | IgG isotype | VL | JL | VL mut | LCDR3 | Note |
|---|---|---|---|---|---|---|---|---|---|---|---|
| BMPC-27 | IGHV1-15 | IGHD2-5 | IGHJ3 | 1 | CTRAYYSNYVGLGFPYW<br>SEQ ID No: 130 | IgG1 | IGKV2-137 | IGKJ2 | 3 | CMQHLEYPYTF<br>SEQ ID No: 131 | |
| BMPC-55 | IGHV1-47 | IGHD1-1 | IGHJ3 | 1 | CARGGYYYTMDYW<br>SEQ ID No: 132 | IgG1 | IGKV3-5 | IGKJ1 | 0 | CQQSNEDPRTF<br>SEQ ID No: 133 | |
| BMPC-65 | IGHV1-47 | IGHD1-1 | IGHJ3 | 16 | CARSSNYGFFDV2<br>SEQ ID No: 134 | IgG1 | IGKV8-30 | IGKJ1 | 4 | CQQYYRYPRTF<br>SEQ ID No: 135 | |
| BMPC-66 | IGHV1-50 | IGHD3-2 | IGHJ4 | 11 | CARDRTGYFMDYW<br>SEQ ID No: 136 | IgG1 | IGKV14-111 | IGKJ1 | 9 | VLQYDEFRTF<br>SEQ ID No: 137 | |
| BMPC-73 | IGHV1-4-4 | IGHD2-4 | IGHJ2 | 0 | CTYDYDGGFDYW<br>SEQ ID No: 138 | IgG1 | IGKV14-111 | IGKJ2 | 0 | CLQYDEFPYTF<br>SEQ ID No: 139 | |
| BMPC-21 | IGHV2-6 or 2-6-8 | IGHD2-5 | IGHJ3 | 6 | CASDQGGAMDHW<br>SEQ ID No: 140 | IgG1 | IGKV17-121 | IGKJ2 | 3 | CLQTDNFPLTF<br>SEQ ID No: 141 | |
| BMPC-63 | IGHV1-9 | IGHD3-2 | IGHJ4 | 7 | CTRSFQATSFAMDYW<br>SEQ ID No: 142 | IgG1 | | | | | 63,85 clonally related |
| BMPC-85 | IGHV1-9 | IGHD3-2 | IGHJ4 | 7 | CARSFQATSFAMDYW<br>SEQ ID No: 143 | IgG1 | | | | | 63,85 clonally related |
| BMPC-24 | IGHV1-47 | IGHD3-3 | IGHJ4 | 2 | CARGGYYYTMDYW<br>SEQ ID No: 132 | IgG1 | | | | | |
| BMPC-7 | IGHV1-75 | IGHD1-1 | IGHJ4 | 0 | CASGDDYGRMDYW<br>SEQ ID No: 144 | IgG2b | IGKV6-15 | IGKJ2 | 0 | CQQYNSYLPTF<br>SEQ ID No: 145 | |
| BMPC-8 | IGHV1-53 | IGHD2-1 | IGHJ3 | 4 | CASPIYYGISWFAYW<br>SEQ ID No: 146 | IgG2b | IGKV15-103 | IGKJ2 | 1 | CQQGQSYPYTF<br>SEQ ID No: 147 | 8,58 clonally related |
| BMPC-9 | IGHV1-22 | IGHD3-1 | IGHJ1 | 4 | CARIWPDWYFDVW<br>SEQ ID No: 148 | IgG2b | IGKV17-127 | IGKJ4 | 4 | CLQSDNMPFTF<br>SEQ ID No: 149 | |
| BMPC-23 | IGHV1-85 | IGHD1-1 | IGHJ4 | 11 | CATYGSSRYYTMDYW<br>SEQ ID No: 150 | IgG2b | IGKV3-2 | IGKJ5 | 5 | CQQSKEVPLTF<br>SEQ ID No: 151 | |
| BMPC-26 | IGHV1-12 | — | IGHJ4 | 2 | CARLDAMDYW<br>SEQ ID No: 152 | IgG2b | IGKV19-93 | IGKJ1 | 3 | CLQYDNLWTF<br>SEQ ID No: 153 | |
| BMPC-61 | IGHV1-15 | IGHD3-1 | IGHJ2 | 10 | CTRRATGDYW<br>SEQ ID No: 154 | IgG2b | IGKV2-109 | IGKJ1 | 2 | CAQNLELPRTF<br>SEQ ID No: 155 | |
| BMPC-37 | IGHV1-75 | IGHD1-1 | IGHJ1 | 0 | CARCGNYYGSSYWYFDVW<br>SEQ ID No: 156 | IgG2b | | | | | |
| BMPC-1 | IGHV1-80 | — | IGHJ4 | 9 | CARGGYW<br>SEQ ID No: 157 | IgG2c | IGKV4-55 | IGKJ4 | 7 | CQQWNIYPFTF<br>SEQ ID No: 158 | 1,57 clonally related |
| BMPC-12 | IGHV1-5 | IGHD2-3 | IGHJ2 | 3 | CARWLLRGGYFDYW<br>SEQ ID No: 159 | IgG2c | IGKV6-17 | IGKJ5 | 6 | CQQHYSIPFTF<br>SEQ ID No: 160 | |
| BMPC-57 | IGHV1-80 | — | IGHJ4 | 0 | CARGGYW<br>SEQ ID No: 157 | IgG2c | IGKV4-55 | IGKJ4 | 3 | CQQWSSFPFTF<br>SEQ ID No: 161 | 1,57 clonally related |
| BMPC-58 | IGHV1-53 | IGHD2-1 | IGHJ3 | 0 | CASPIYYGISWFAYW<br>SEQ ID No: 146 | IgG2c | IGKV15-103 | IGKJ2 | 1 | CHQGQSYPYTF<br>SEQ ID No: 162 | 8,58 clonally related |
| BMPC-82 | IGHV1-72 | IGHD2-3 | IGHJ2 | 0 | CARGVTTLW<br>SEQ ID No: 163 | IgA | IGKV19-93 | IGKJ1 | 0 | CLQYDNLWTF<br>SEQ ID No: 153 | |

Figure 4:
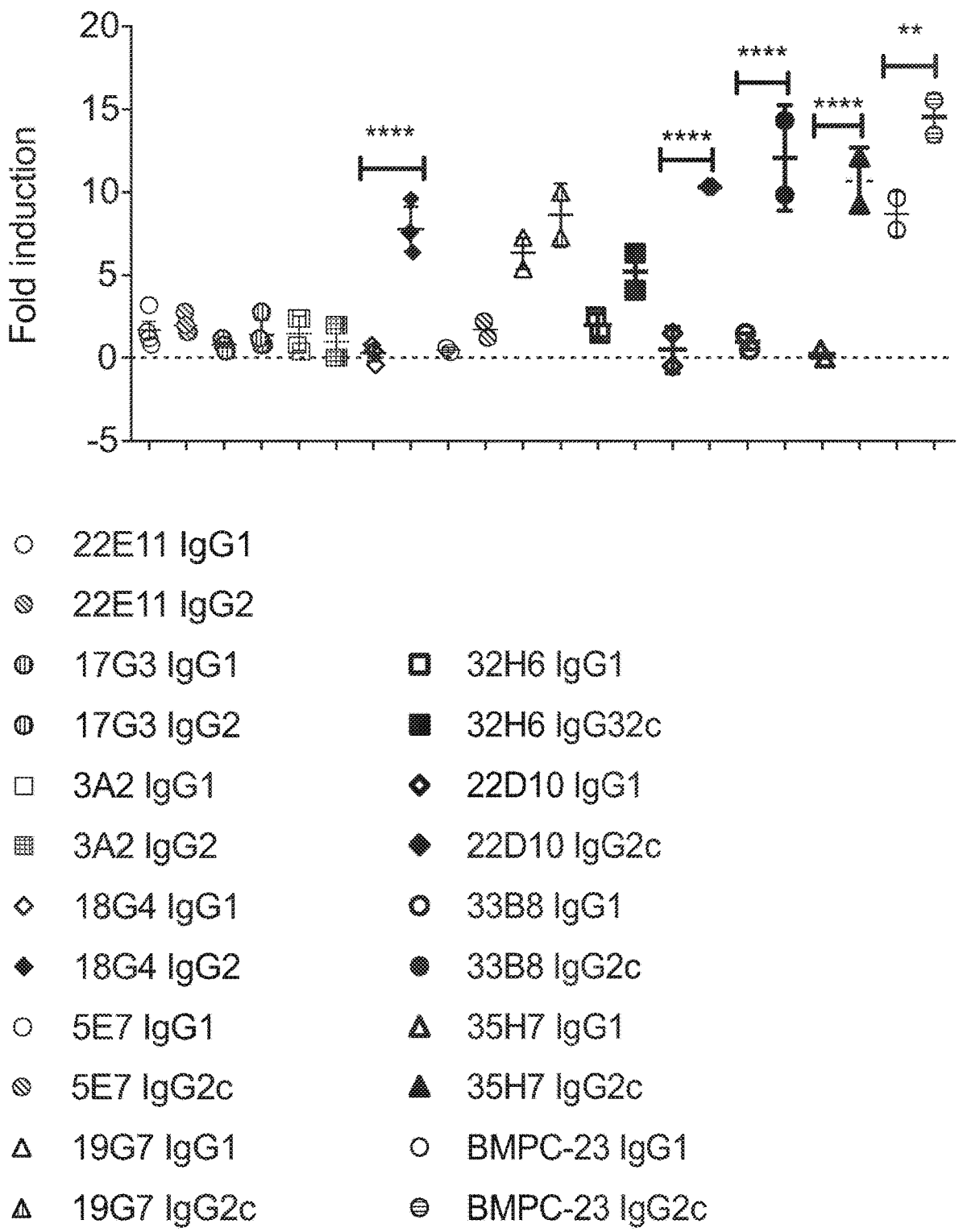
FIG. 4: FcγRIV activation by the IgG1 and IgG2c isotypes of individual mAbs. FcγRIV activation was assayed using the Promega FcγRIV ADCC Reporter Bioassay at a concentration of 1 mg/mL. Statistical analysis is by ANOVA, P<0.01, **P<0.0001.
Figure 5A:
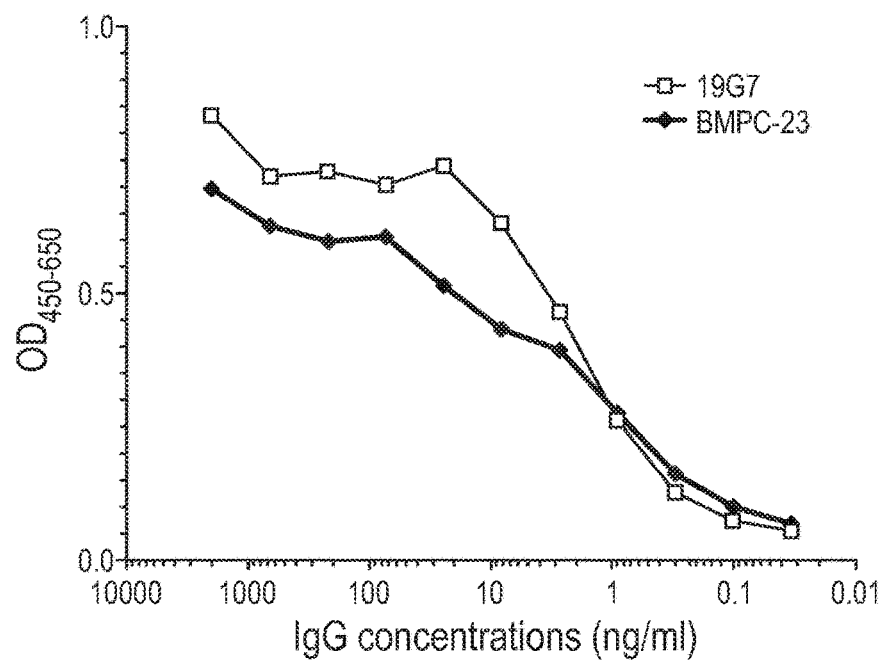
FIGS. 5A-5B show HSV-2 G lysate-binding by recombinant antibodies (BMPC-23 and 19G7) cloned from single, bone marrow plasmacyte and GC B cell, respectively. Binding of recombinant antibodies to HSV-2-G infected cell lysates and uninfected cell lysates was tested by ELISA.
Figure 5B:
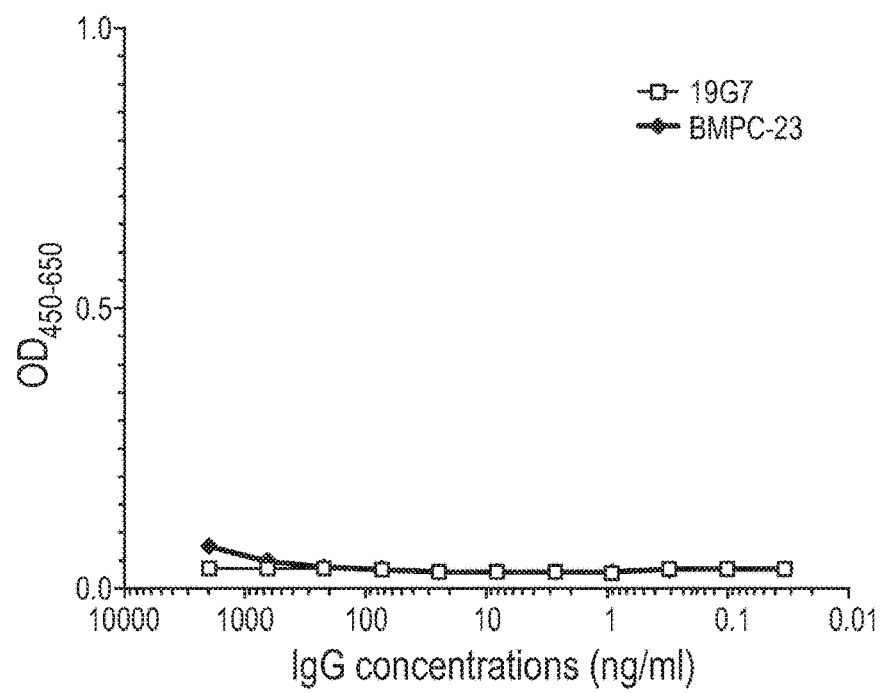

Protection by serum antibodies elicited by ΔgD-2 vaccinations depends on FcγRIV activation. IgG2c antibodies that preferentially bind activating FcγRs were focused on. Based on the obtained V(D)J sequences from each plasmacyte, paired heavy and light chains were re-expressed (as recombinant mouse IgG1 and IgG2c antibodies) in Expi293F cells as described above. Nine clones were selected that carry IgG2b and IgG2c constant regions (BMPC-1, BMPC-12, BMPC-7, BMPC-8, BMPC-9, BMPC-23, BMPC-26, BMPC-57, and BMPC-61). Among these nine antibodies, BMPC-23, but not others, reacted with HSV-2 G lysate (FIGS. 5A and 5B, and data not shown). Binding of BMPC-23 is comparable to that of 19G7, another HSV-2 G lysate reactive IgG cloned from GC B cells of ΔgD-2 vaccinated mouse. The IgG1 and IgG2c isotype of BMPC-23 were analyzed in an in vitro FcγRIV activation assay (FIG. 4), and in vivo protection assay (see description below, FIGS. 6A to 6C). As shown in FIG. 4, BMPC-23 IgG2c showed the highest level of FcγR activation.

Figure 6A:
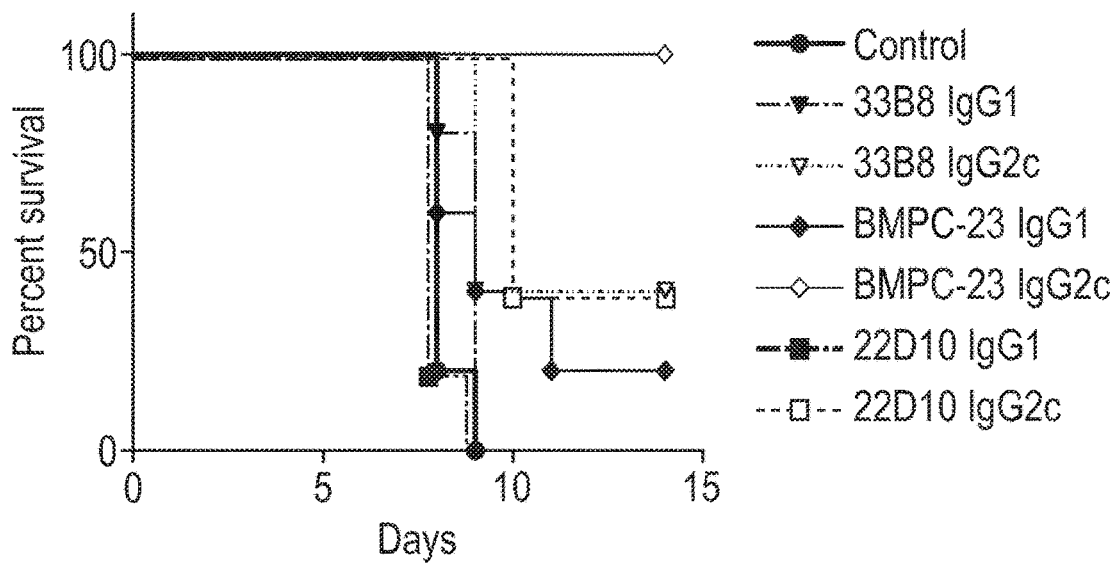
FIGS. 6A-6C: Passive transfer of mice with cloned HSV reactive IgG2c antibodies (BMPC-23, 33B8, and 22D10) provides protection against lethal HSV-2 challenge in overall survival (FIG. 6A), as well as in epithelial (FIG. 6B), and neurological assays (FIG. 6C).
Figure 6B:
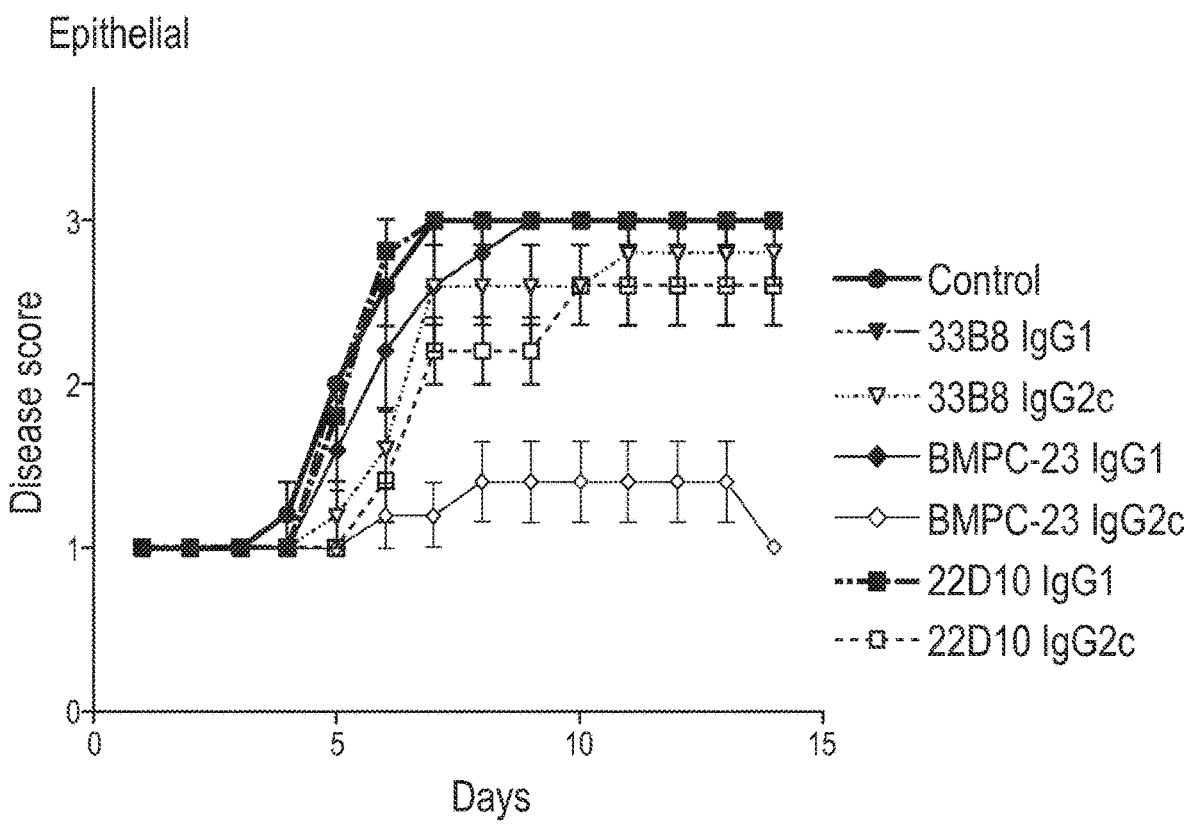
Figure 6C:
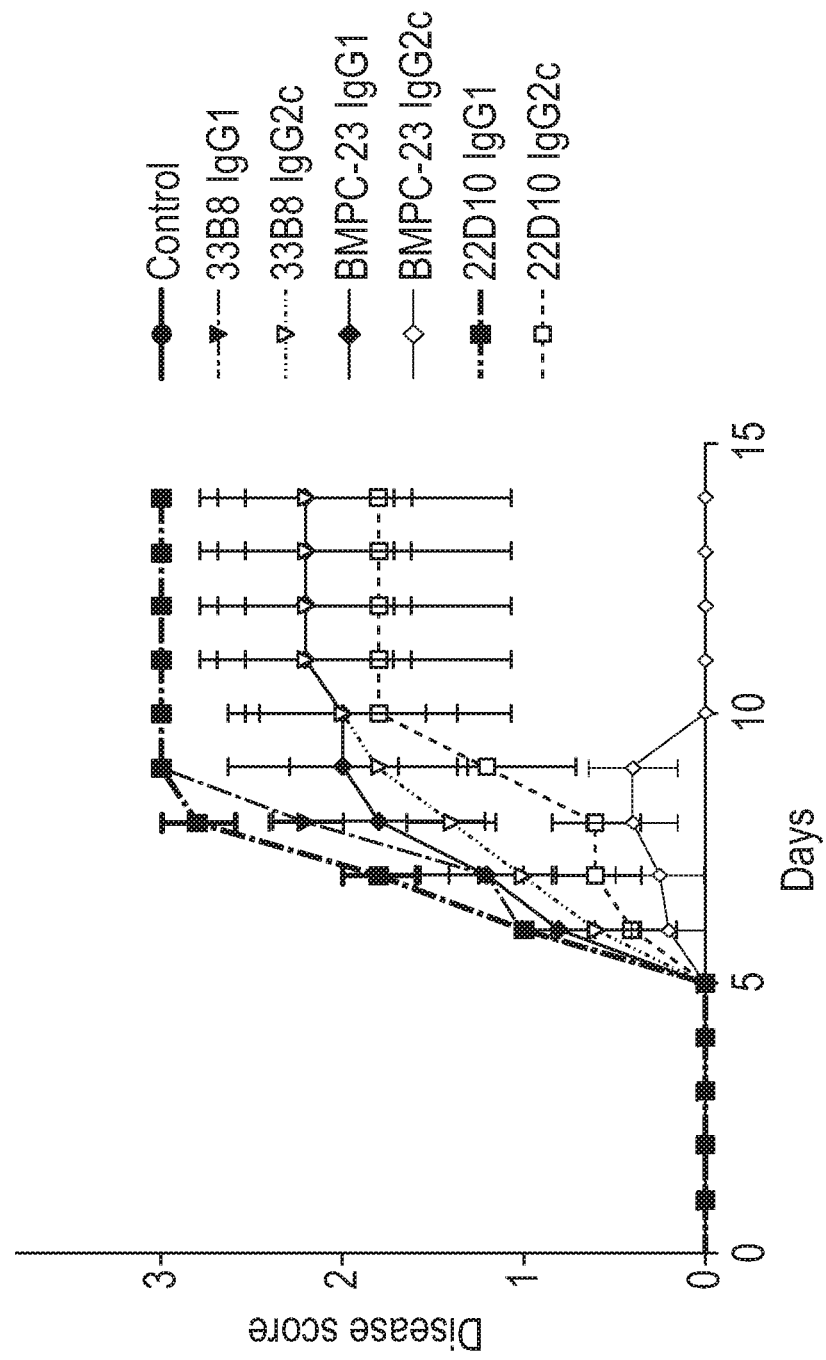

Both IgG1 and IgG2c forms of 22D10, 33B8, and BMPC-23 antibodies (≥4 mg each) were assessed for reproducibility of in vivo protection assay, and any dependency on Ig isotype for protection. A representative experiment is shown in FIGS. 6A-6C. In brief, overall results from 2 independent experiments demonstrate that the IgG2c version of BMPC-23 protected 8/10 mice, 22D10 protected 5/10 mice, and 33B8 protected 4/10 mice from lethal challenge. Three monoclonal antibodies BMPC-23, 22D10, and 33B8 (as IgG2c) provided significant protection against HSV-2. To test roles of Ig isotypes on ability to provide protection, IgG1 and IgG2c isotypes of these three antibodies were generated and assessed for ability to activate mFcγRIV signaling (as a measurement for ADCC), and for in vivo protection assay. The results are shown in FIG. 4

Figure 7A:
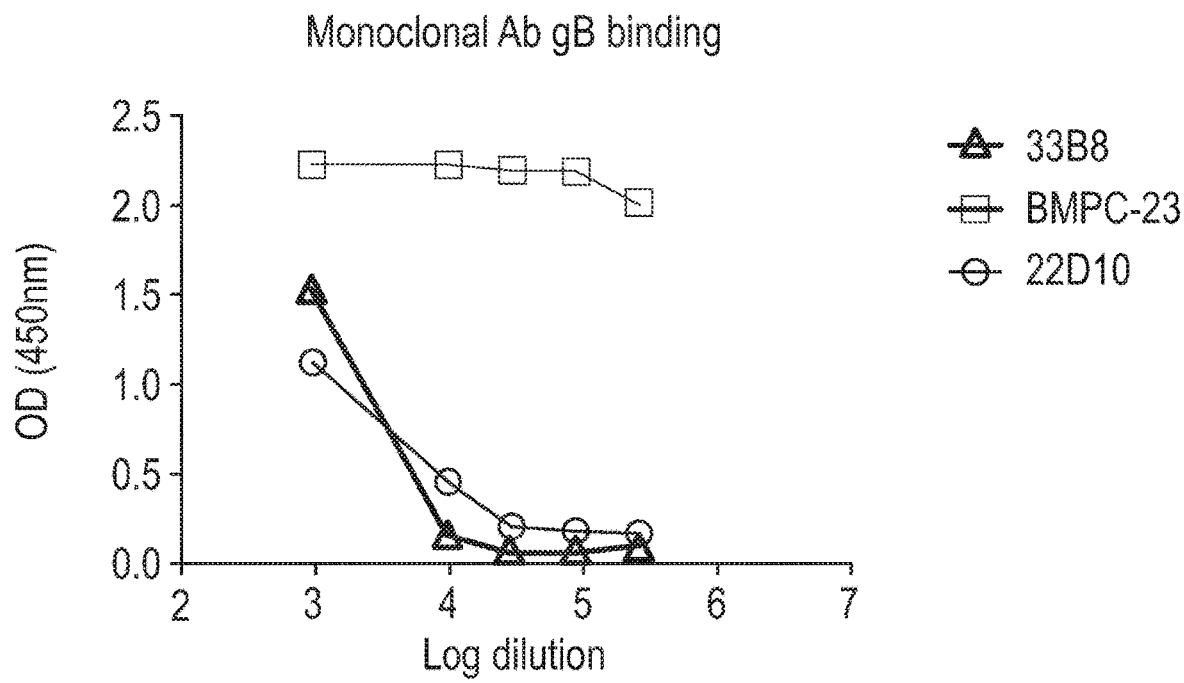
FIG. 7A-7B. Immunoprecipitation-Mass Spectrometry (IP-MS) was performed to identify the binding targets of 22D10, 33B8, and BMPC-23 antibodies. The results identify human herpesvirus glycoprotein B (gB) as a target.
Figure 7B:
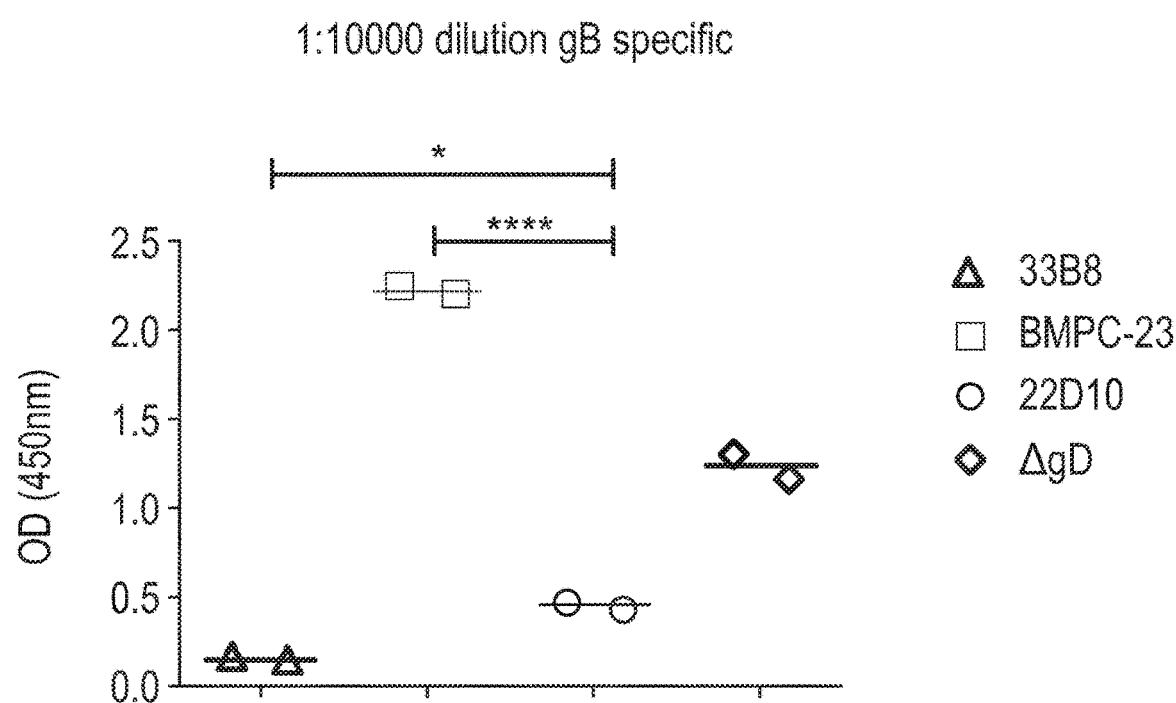

IP-MS was performed to identify the targets of 22D10, 33B8, and BMPC-23 antibodies. The results are shown in FIGS. 7A and 7B, identifying human herpesvirus glycoprotein B (gB) as a target.

Figure 8:
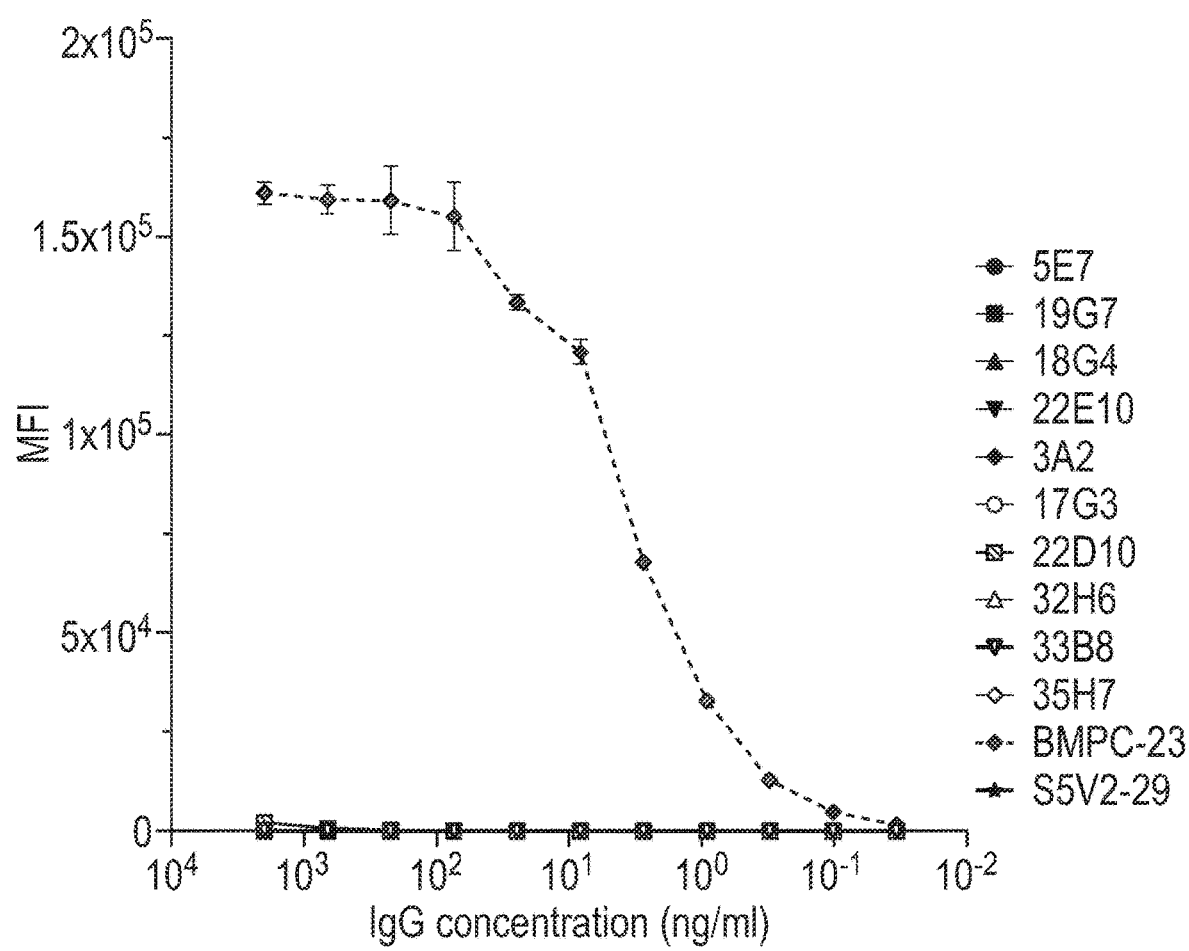
FIG. 8: shows the binding of the recombinant antibodies to glycoprotein B of HSV-1 (gB-1) as measured by Luminex multiplex assay.

BMPC-23 binds HSV-1 gB (gB-1). The gB-1 binding of the antibodies was determined by Luminex multiplex assay. Mixtures of antigen (gB-1)-conjugated microspheres (1,000 counts each) were added to each well of 96-well filter plates (Millipore). After washing with PBS containing 1% BSA, 0.05% Tween 20 and 0.05% NaN$_3$, serially diluted recombinant antibodies (5E7, 19G7, 18G4, 22E10, 3A2, 17G3, 22D10, 32H6, 33B8, 25H7, BMPC-23, and S5V2-29) were added to the plates and incubated for 2 hours at room temperature, with mild agitation of the plates. Samples were diluted in PBS containing 1% cow milk, 1% BSA, 0.05% Tween 20 and 0.05% NaN$_3$. After washing, PE goat anti-mouse IgG was added to the plates and incubated for 1 hour at room temperature with mild agitation. After washing, microspheres were resuspended in PBS containing 1% BSA, 0.05% Tween 20 and 0.05% NaN$_3$ and fluorescent signals from each microsphere were measured in a Bio-Plex® 3D machine. As shown in FIG. 8, the only antibody demonstrating substantial binding to gB-1 was BMPC-23.

Finding gB-1 specific HSV antibodies. After Nojima culture (single B-cell culture), HSV-specific antibodies were cloned from germinal center B cells and tested for binding to HSV-1 gB-1 by Luminex multiplex assay as described above. FIGS. 9A and 9B show the gB-1 binding results for 10 antibodies in comparison with BMPC-23. The cell origin and isolation methods for the antibodies tested are shown in Table 3. With the exception of BMPC-23, the antibodies in Table 3 were derived from germinal center B cells (lymph nodes) taken 15-17 days after primary vaccination with ΔgD-2. BMPC-23 was derived from bone marrow plasmacytes taken 2 weeks post-boost with ΔgD-2. Nucleotide sequences and amino acid sequences for the heavy-chains and light chains are shown in Table 4, as are the amino acid sequences for the light chain and heavy chain CDR1, CDR2, and CDR3.

Figure 10A:
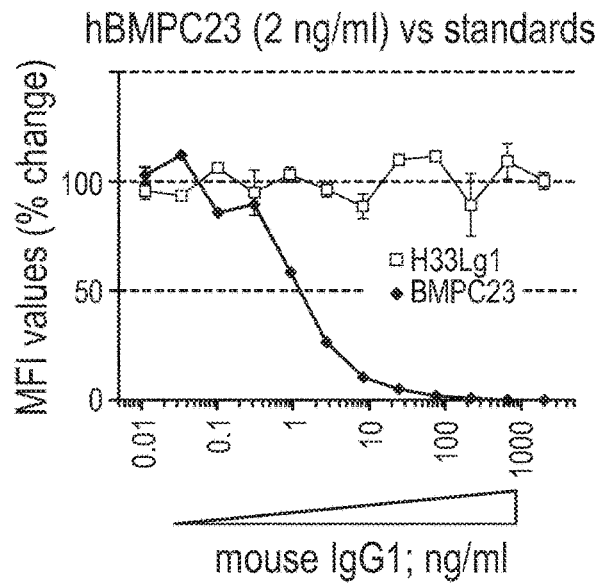
FIGS. 10A-10G show the capacity of gB-1 specific mouse monoclonal IgG antibodies to inhibit binding of BMPC-23 human IgG antibodies to gB-1.
Figure 10B:
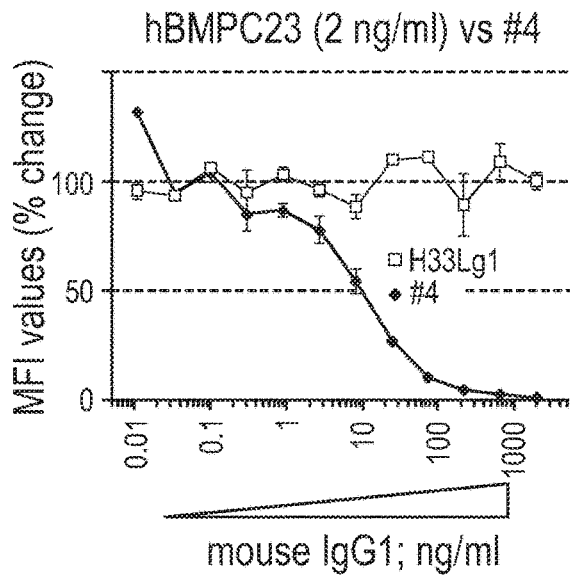
Figure 10C:
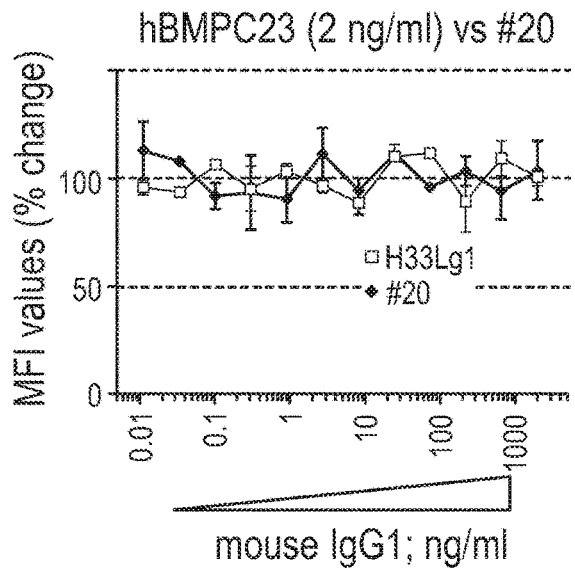
Figure 10D:
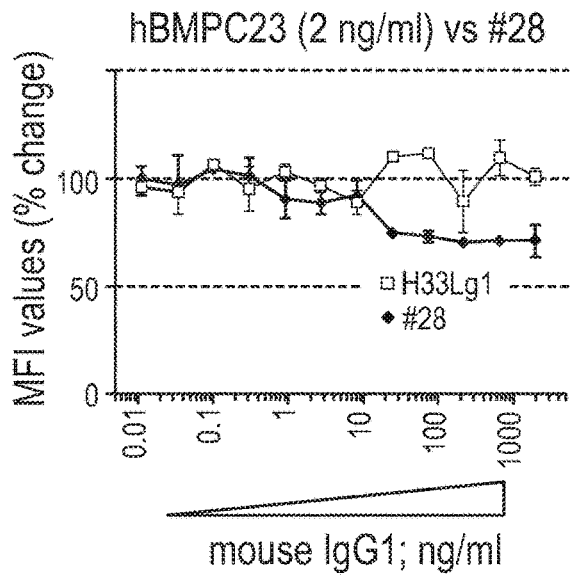
Figure 10E:
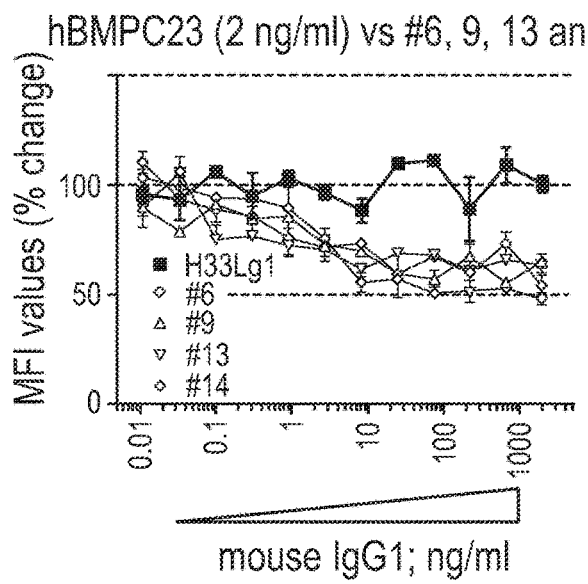
Figure 10F:
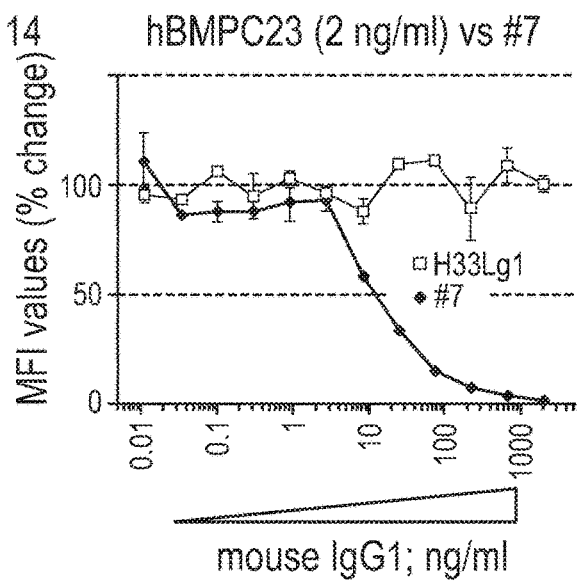
Figure 10G:
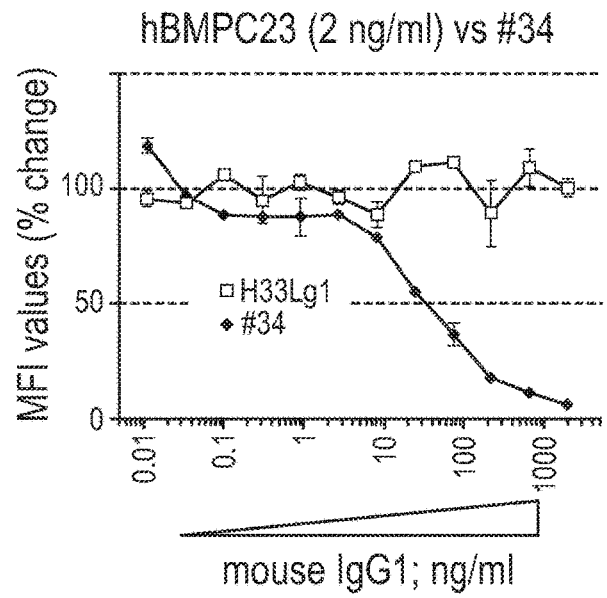

Finding BMPC-like antibodies. Nine out of 10 gB-1 specific mouse monoclonal IgG antibodies in FIG. 3 were tested for their capacity to inhibit binding of BMPC-23 human IgG antibodies to gB-1. Serially diluted, gB-1 specific mouse monoclonal antibodies or irrelevant, control mouse antibody (H33Lγ1) were incubated with gB-1 conjugated Luminex beads. After incubation, fixed concentration (2 ng/ml) of BMPC-23 human IgG antibodies were added to each well. After washing, mouse anti-human IgG-PE was added to detect binding of human BMPC-23 antibodies. The y-axis indicates MFI percentage of maximal binding, determined as the mean MFI in the presence of a control IgG, H33Lγ1 that do not bind to gB-1. FIG. 10A shows BMPC-23 mouse IgG (at 222 ng/ml) inhibited human BMPCs >99%. Strong inhibition by HSV010-4 (>95% at 222 ng/ml), HSV010-7 (>90% at 222 ng/ml), and HSV010-34 (>80% at 222 ng/ml), shown in FIGS. 10B, 10F, and 10G, respectively, indicates these antibodies bind epitopes on gB-1 closely overlapping with the one recognized by BMPC-23. Therefore, similar protective efficacy as BMPC-23 is expected from these antibodies (experiments in progress). Mild inhibition by HSV010-28 (30% inhibition at 222 ng/ml in FIG. 10D) and by HSV010-6, 9, 13, 14 (32%-48% at 222 ng/ml in FIG. 10E) indicates that epitopes on gB-1 recognized by these antibodies partially overlap with the one recognized by BMPC-23. No inhibition by HSV010-20 as shown in FIG. 10C indicates that epitope recognized by this antibody does not overlap with the one recognized by BMPC-23. Protective efficacy of these antibodies need to be tested (experiments in progress). The above-described data is also summarized in Table 3 below.

Additional Experiments. Determination of the target antigen for antibodies 22D10 and 33B8 will be conducted using methods similar to those used for antigenic determination of the BMPC-23 antibody. For example, methods such as mass spectrometry of proteins bound by 22D10 or 33B8 antibodies and/or screening 22D10 or 33B8 against other non-gB purified antigens from HSV-1 can be used.

The ability of the 12 untested antibodies in Table 3 to protect against ocular infection by HSV-1 will be evaluated using the methods described above.

Structural determination of epitopes for the HSV-1 binding antibodies in Table 3 will be conducted. Such methods include co-crystallization of the Fab fragment of the antibody with the HSV-1 protein (e.g., gB-1), X-ray diffraction, and analysis by XDS. (See for example Watanabe et al, 2019, Cell, 177, 1124-1135).

TABLE 3

| ID | Isolation method | Binding to HSV-lysate | in vivo protection | Target antigens | V(D)J sequence | Competition with BMPC-23 | Clonal relationship |
|---|---|---|---|---|---|---|---|
| BMPC-23 | single-cell PCR | Yes | Yes | gB | Yes | Strong | Singleton |
| 22D10 | Nojima culture | Yes | Yes | TBD (not gB) | Yes | Not tested | Singleton |

TABLE 3-continued

| ID | Isolation method | Binding to HSV-lysate | in vivo protection | Target antigens | V(D)J sequence | Competition with BMPC-23 | Clonal relationship |
|---|---|---|---|---|---|---|---|
| 33B8 | Nojima culture | Yes | Yes | TBD (not gB) | Yes | Not tested | Singleton |
| HSV010-4 | Nojima culture | Yes | TBD | gB | Yes | Strong | HSV010-4, 8 |
| HSV010-8 | Nojima culture | Yes | TBD | gB | Yes | ND | HSV010-4, 8 |
| HSV010-7 | Nojima culture | Yes | TBD | gB | Yes | Strong | Singleton |
| HSV010-34 | Nojima culture | Yes | TBD | gB | Yes | Strong | Singleton |
| H5V010-6 | Nojima culture | Yes | TBD | gB | Yes | Weak | H5V010-6, 9, 13, 14, 15 |
| H5V010-9 | Nojima culture | Yes | TBD | gB | Yes | Weak | HSV010-6, 9, 13, 14, 15 |
| HSV010-13 | Nojima culture | Yes | TBD | gB | Yes | Weak | HSV010-6, 9, 13, 14, 15 |
| HSV010-14 | Nojima culture | Yes | TBD | gB | Yes | Weak | HSV010-6, 9, 13, 14, 15 |
| HSV010-15 | Nojima culture | Yes | TBD | gB | Yes | ND | HSV010-6, 9, 13, 14, 15 |
| H5V010-16 | Nojima culture | Yes | TBD | gB | Yes | ND | H5V010-16, 28 |
| HSV010-28 | Nojima culture | Yes | TBD | gB | Yes | Weak | HSV010-16, 28 |
| HSV010-20 | Nojima culture | Yes | TBD | gB | Yes | No competition | Singleton |

TABLE 4

| ID | IgH/IgL* | Sequence | Complete sequence | CDR1 | CDR2 | CDR3 | VH/VL | D | JH/JL |
|---|---|---|---|---|---|---|---|---|---|
| BMPC-23 | IgH | DNA | SEQ ID No: 19 | | | | | | |
| | | AA | SEQ ID No: 20 | GYSFTTYD SEQ ID NO: 1 | IYPREGST SEQ ID NO: 2 | ATYGSSRYYTMDY SEQ ID NO: 3 | IGHV1-85 | IGHD 1-1 | IGHJ4 |
| | IgL | DNA | SEQ ID No: 21 | | | | | | |
| | | AA | SEQ ID No: 22 | ESVDNFGISF SEQ ID NO: 4 | AAS SEQ ID NO: 5 | QQSKEVPLT SEQ ID NO: 6 | IGKV3-2 | | IGKJ5 |
| 22D10 | IgH | DNA | SEQ ID No: 23 | | | | | | |
| | | AA | SEQ ID No: 24 | GYSITNGNH SEQ ID NO: 7 | IRSSGSS SEQ ID NO: 8 | ARGGGLRHYFDY SEQ ID NO: 9 | IGHV3-4 | IGHD 2 | IGHJ2 |
| | IgL | DNA | SEQ ID No: 25 | | | | | | |
| | | AA | SEQ ID No: 26 | GNIHNY SEQ ID NO: 10 | HAE SEQ ID NO: 11 | QHFWSTPYT SEQ ID NO: 12 | IGKV12-41 | | IGKJ2 |
| 33B8 | IgH | DNA | SEQ ID No: 27 | | | | | | |
| | | AA | SEQ ID No: 28 | GFTFTDYY SEQ ID NO: 13 | IRNKANGYTT SEQ ID NO: 14 | ACGNYVGYAMDY SEQ ID NO: 15 | IGHV7-3 | IGHD 2-1 | IGHJ4 |
| | IgL | DNA | SEQ ID No: 29 | | | | | | |
| | | AA | SEQ ID No: 30 | QSLLNSRTRKNY SEQ ID NO: 16 | WAS SEQ ID NO: 17 | KQSYNLYT SEQ ID NO: 18 | IGKV8-21 | | IGKJ2 |
| HSV010-4 | IgH | DNA | SEQ ID No: 31 | | | | | | |
| | | AA | SEQ ID No: 32 | GFSLSRHD SEQ ID NO: 79 | IWGDGST SEQ ID NO: 80 | AKEDYGIFPY SEQ ID NO: 81 | IGHV2-3 | IGHD 2-1 | IGHJ3 |
| | IgL | DNA | SEQ ID No: 33 | | | | | | |
| | | AA | SEQ ID No: 34 | QDISSY SEQ ID NO: 82 | RAN SEQ ID NO: 83 | LQYDEFPLT SEQ ID NO: 84 | IGKV14-111 | | IGKJ5 |
| HSV010-8 | IgH | DNA | SEQ ID No: 67 | | | | | | |
| | | AA | SEQ ID No: 68 | GFSLNNYD SEQ ID NO: 85 | IWGDGST SEQ ID NO: 80 | AKEDYGIFPY SEQ ID NO: 81 | IGHV2-3 | IGHD 2-1 | IGHJ3 |
| | IgL | DNA | SEQ ID No: 69 | | | | | | |

TABLE 4-continued

| ID | IgH/IgL* | Sequence | Complete sequence | CDR1 | CDR2 | CDR3 | VH/VL | D | JH/JL |
|---|---|---|---|---|---|---|---|---|---|
| | | AA | SEQ ID No: 70 | QDINSY SEQ ID NO: 86 | RAN SEQ ID NO: 83 | LQYDEFPLT SEQ ID NO: 84 | IGKV14-111 | | IGKJ5 |
| HSV010-7 | IgH | DNA | SEQ ID No: 35 | | | | | | |
| | | AA | SEQ ID No: 36 | GYTFTNYD SEQ ID NO: 87 | IYPRDGST SEQ ID NO: 88 | ARGIFYVNYDVY SEQ ID NO: 89 | IGHV1-85 | IGHD 2-1 | IGHJ3 |
| | IgL | DNA | SEQ ID No: 37 | | | | | | |
| | | AA | SEQ ID No: 38 | DHINNW SEQ ID NO: 90 | GAA SEQ ID NO: 91 | QQYWSSPLT SEQ ID NO: 92 | IGKV13-85 | | IGKJ5 |
| HSV010-34 | IgH | DNA | SEQ ID No: 39 | | | | | | |
| | | AA | SEQ ID No: 40 | EYEFPSHD SEQ ID NO: 93 | INSDGGST SEQ ID NO: 94 | ARHSSGYVLDY SEQ ID NO: 95 | IGHV5-2 | IGHD 3-2 | IGHJ4 |
| | IgL | DNA | SEQ ID No: 41 | | | | | | |
| | | AA | SEQ ID No: 42 | DHINHW SEQ ID NO: 96 | GAT SEQ ID NO: 97 | QQYWSTPYT SEQ ID NO: 98 | IGKV13-85 | | IGKJ2 |
| HSV010-6 | IgH | DNA | SEQ ID No: 43 | | | | | | |
| | | AA | SEQ ID No: 44 | GYFTFNYW SEQ ID NO: 99 | IHPNIGIT SEQ ID NO: 100 | ARGSDSGSAWFAY SEQ ID NO: 101 | IGHV1-64 | IGHD 3-2 | IGHJ3 |
| | IgL | DNA | SEQ ID No: 45 | | | | | | |
| | | AA | SEQ ID No: 46 | DHINNW SEQ ID NO: 90 | GAT SEQ ID NO: 97 | QQYWSTPLT SEQ ID NO: 102 | IGKV13-85 | | IGKJ5 |
| HSV010-9 | IgH | DNA | SEQ ID No: 47 | | | | | | |
| | | AA | SEQ ID No: 48 | GYTFTSYW SEQ ID NO: 103 | IHPNSGIT SEQ ID NO: 104 | ARGSNSGSAWFAY SEQ ID NO: 105 | IGHV1-64 | IGHD 3-2 | IGHJ3 |
| | IgL | DNA | SEQ ID No: 49 | | | | | | |
| | | AA | SEQ ID No: 50 | DHINNW SEQ ID NO: 90 | GAT SEQ ID NO: 97 | QQYWSTPLT SEQ ID NO: 102 | IGKV13-85 | | IGKJ5 |
| HSV010-13 | IgH | DNA | SEQ ID No: 51 | | | | | | |
| | | AA | SEQ ID No: 52 | GYTFTSYW SEQ ID NO: 103 | IHPNSGIT SEQ ID NO: 104 | ARGSSSGSAWFAY SEQ ID NO: 105 | IGHV1-64 | IGHD 3-2 | IGHJ3 |
| | IgL | DNA | SEQ ID No: 53 | | | | | | |
| | | AA | SEQ ID No: 54 | DHINNW SEQ ID NO:90 | GAT SEQ ID NO: 97 | QQYWSSPLT SEQ ID NO: 92 | IGKV13-85 | | IGKJ5 |
| HDV010-14 | IgH | DNA | SEQ ID No: 55 | | | | | | |
| | | AA | SEQ ID No: 56 | GYTFTSYW SEQ ID NO: 103 | IHPNSGIA SEQ ID NO: 106 | ARGSSSGSAWFAY SEQ ID NO: 105 | IGHV1-64 | IGHD 3-2 | IGHJ3 |
| | IgL | DNA | SEQ ID No: 57 | | | | | | |
| | | AA | SEQ ID No: 58 | DHINNW SEQ ID NO: 90 | GAT SEQ ID NO: 97 | QQYWSTPLT SEQ ID NO: 102 | IGKV13-85 | | IGKJ5 |
| HSV010-15 | IgH | DNA | SEQ ID No: 71 | | | | | | |
| | | AA | SEQ ID No: 72 | GYTFTSYW SEQ ID NO: 103 | IHPNSGIT SEQ ID NO: 104 | ARGSSSGSAWFAY SEQ ID NO: 105 | IGHV1-64 | IGHD 3-2 | IGHJ3 |
| | IgL | DNA | SEQ ID No: 73 | | | | | | |
| | | AA | SEQ ID No: 74 | DHINNW SEQ ID NO: 90 | GAT SEQ ID NO: 97 | QQYWSSPLT SEQ ID NO: 92 | IGKV13-85 | | IGKJ5 |
| HSV010-16 | IgH | DNA | SEQ ID No: 75 | | | | | | |
| | | AA | SEQ ID NO: 76 | GYTFTTYG SEQ ID NO: 107 | INTYSGVS SEQ ID NO: 108 | AQLNYGMDY SEQ ID NO: 109 | IGHV9-3 | IGHD 2-12 | IGHJ4 |
| | IgL | DNA | SEQ ID No: 77 | | | | | | |
| | | AA | SEQ ID No: 78 | QDVSTS SEQ ID NO: 110 | SAS SEQ ID NO: 111 | HQHYSIPRT SEQ ID NO: 112 | IGKV6-17 | | IGKJ1 |

TABLE 4-continued

| ID | IgH/IgL* | Sequence | Complete sequence | CDR1 | CDR2 | CDR3 | VH/VL | D | JH/JL |
|---|---|---|---|---|---|---|---|---|---|
| HSV010-28 | IgH | DNA<br>AA | SEQ ID No: 59<br>SEQ ID No: 60 | GYTFTTYG<br>SEQ ID<br>NO: 107 | INTYSGVS<br>SEQ ID<br>NO: 108 | AQVNYAMDY<br>SEQ ID NO: 113 | IGHV9-3 | IGHD 2 | IGHJ4 |
|  | IgL | DNA<br>AA | SEQ ID No: 61<br>SEQ ID No: 62 | QDVSTA<br>SEQ ID<br>NO: 114 | SAS<br>SEQ ID<br>NO: 111 | QQHYSTPRT<br>SEQ ID NO: 115 | IGKV6-17 |  | IGKJ1 |
| HSV010-20 | IgH | DNA<br>AA | SEQ ID No: 63<br>SEQ ID No: 64 | GYSITSGYD<br>SEQ ID<br>NO: 116 | ISYSGLT<br>SEQ ID<br>NO: 117 | ARGPPWYFDV<br>SEQ ID NO: 118 | IGHV3-1 | IGHD 6-3 | IGHJ1 |
|  | IgL | DNA<br>AA | SEQ ID No: 65<br>SEQ ID No: 66 | QIVRAT<br>SEQ ID<br>NO: 119 | LAS<br>SEQ ID<br>NO: 120 | LQYWNYPYT<br>SEQ ID NO: 120 | IGKV6-14 |  | IGKJ2 |

*IgH, immunoglobulin heavy chain; IgL, immunoglobulin light chain.

What is claimed is:

1. An antibody or antigen-binding fragment, comprising:
a heavy chain variable region comprising GYSFTTYD (SEQ ID NO:1), IYPREGST (SEQ ID NO:2), and ATYGSSRYYTMDY (SEQ ID NO:3); and/er a light chain variable region comprising ESVDNFGISF (SEQ ID NO:4), AAS (SEQ ID NO:5), and QQSKEVPLT (SEQ ID NO:6), or
a heavy chain variable region comprising GYSITNGNH (SEQ ID NO:7), IRSSGSS (SEQ ID NO:8), and ARGGGLRHYFDY (SEQ ID NO:9); and/er a light chain variable region comprising GNIHNY (SEQ ID NO:10), HAE (SEQ ID NO:11), and QHFWSTPYT (SEQ ID NO:12), or
a heavy chain variable region comprising GFTFTDYY (SEQ ID NO:13), IRNKANGYTT (SEQ ID NO:14), and ACGNYVGYAMDY (SEQ ID NO:15); and/er a light chain variable region comprising QSLLNSRTRKNY (SEQ ID NO:16), WAS (SEQ ID NO:17), and KQSYNLYT (SEQ ID NO:18), or
a heavy chain variable region comprising GFSLSRHD (SEQ ID NO:79), IWGDGST (SEQ ID NO:80), and AKEDYGIFPY (SEQ ID NO:81); and/er a light chain variable region comprising QDISSY (SEQ ID NO:82), RAN (SEQ ID NO:83), and LQYDEFPLT (SEQ ID NO:84), or
a heavy chain variable region comprising GYTFTNYD (SEQ ID NO:87), IYPRDGST (SEQ ID NO:88), and ARGIFYVNYDVY (SEQ ID NO:89); and/er a light chain variable region comprising DHINNW (SEQ ID NO:90), GAA (SEQ ID NO:91), and QQYWSSPLT (SEQ ID NO:92), or
a heavy chain variable region comprising GFSLNNYD (SEQ ID NO: 85), IWGDGST (SEQ ID NO: 80), and AKEDYGIFPY (SEQ ID NO:81); and a light chain variable region comprising QDINSY (SEQ ID NO:86), RAN (SEQ ID NO:83), and LOYDEFPLT (SEQ ID NO:84); or,
a heavy chain variable region comprising EYEFPSHD (SEQ ID NO:93), INSDGGST (SEQ ID NO:94), and ARHSSGYVLDY (SEQ ID NO:95); and a light chain variable region comprising DHINHW (SEQ ID NO:96), GAT (SEQ ID NO:97), and QQYWSTPYT (SEQ ID NO:98).

2. The antibody or antigen-binding fragment of claim 1 having an IgG2c isotype.

3. The antibody or antigen-binding fragment of claim 1, which is a humanized antibody.

4. The antibody or antigen-binding fragment of claim 1, comprising an Fc region which binds a human Fc gamma receptor RIII (FcγRIII).

5. The antibody or antigen-binding fragment of claim 1, which binds a herpes simplex virus-2 (HSV-2) antigen.

6. The antibody or antigen-binding fragment of claim 1, which binds an HSV-2 glycoprotein B.

7. The antibody or antigen-binding fragment of claim 1, wherein a framework region of the light chain, a framework region of the heavy chain, or a combination thereof is a human framework region, or has a 85% or greater identity to the human framework region.

8. The antibody or antigen-binding fragment of claim 7, wherein the framework region of the light chain, the framework region of the heavy chain, or the combination thereof is the human framework region.

9. A nucleic acid encoding a heavy chain variable region of an antibody, wherein the heavy chain variable region has an amino acid sequence comprising:

```
                                        (SEQ ID NO: 1)
GYSFTTYD, (SEQ ID NO: 2)
IYPREGST,
and (SEQ ID NO: 3)
ATYGSSRYYTMDY;
or (SEQ ID NO: 7)
GYSITNGNH, (SEQ ID NO: 8)
IRSSGSS,
and (SEQ ID NO: 9)
ARGGGLRHYFDY;
or (SEQ ID NO: 13)
GFTFTDYY, (SEQ ID NO: 14)
IRNKANGYTT,
and (SEQ ID NO: 15)
ACGNYVGYAMDY;
or
```

GFSLSRHD, (SEQ ID NO: 79)

IWGDGST, (SEQ ID NO: 80)
and

AKEDYGIFPY; (SEQ ID NO: 81)
or

GFSLNNYD, (SEQ ID NO: 85)

IWGDGST, (SEQ ID NO: 80)
and

AKEDYGIFPY; (SEQ ID NO: 81)
or

GYTFTNYD, (SEQ ID NO: 87)

IYPRDGST, (SEQ ID NO: 88)
and

ARGIFYVNYDVY; (SEQ ID NO: 89)
or

EYEFPSHD, (SEQ ID NO: 93)

INSDGGST, (SEQ ID NO: 94)
and

ARHSSGYVLDY. (SEQ ID NO: 95)

10. The nucleic acid of claim 9, further comprising a nucleic acid sequence which encodes a human heavy chain framework region.

11. The nucleic acid of claim 9, further comprising a nucleic acid sequence which encodes a human Fc region.

12. A nucleic acid encoding a light chain variable region of an antibody, wherein the light chain variable region has an amino acid sequence comprising:

ESVDNFGISF, (SEQ ID NO: 4)

AAS, (SEQ ID NO: 5)
and

QQSKEVPLT; (SEQ ID NO: 6)
or

GNIHNY, (SEQ ID NO: 10)

HAE, (SEQ ID NO: 11)
and

QHFWSTPYT; (SEQ ID NO: 12)
or

QSLLNSRTRKNY, (SEQ ID NO: 16)

WAS, (SEQ ID NO: 17)
and

KQSYNLYT; (SEQ ID NO: 18)
or

QDISSY, (SEQ ID NO: 82)

RAN, (SEQ ID NO: 83)
and

LQYDEFPLT; (SEQ ID NO: 84)
or

QDINSY (SEQ ID NO: 86)

RAN, (SEQ ID NO: 83)
and

LQYDEFPLT; (SEQ ID NO: 84)
or

DHINNW, (SEQ ID NO: 90)

GAA, (SEQ ID NO: 91)
and

QQYWSSPLT; (SEQ ID NO: 92)
or

DHINHW, (SEQ ID NO: 96)

GAT, (SEQ ID NO: 97)
and

QQYWSTPYT. (SEQ ID NO: 98)

13. The nucleic acid of claim 12, further comprising a nucleic acid sequence which encodes a human light chain framework region.

14. An isolated host cell comprising one or more of the nucleic acids of claim 9.

15. A method of inhibiting a herpes simplex virus-2 (HSV-2) activity in a subject, the method comprising:
administering the antibody of claim 1, in an amount effective to inhibit HSV-2 activity in the subject.

16. The method of claim 15, wherein the subject is infected with HSV-2.

17. The method of claim 15, wherein the subject is not yet infected with HSV-2.

18. The method of claim 15, wherein the subject is immunocompromised.

19. The method of claim 15, wherein the subject is pregnant or is a neonate.

20. The method of claim 15, wherein the subject is receiving or has received an anti-viral drug.

21. The method of claim 20, wherein the anti-viral drug comprises acyclovir.

22. A pharmaceutical composition, comprising:
the antibody or antigen-binding fragment of claim 1; and
a pharmaceutically acceptable carrier or excipient.

23. The pharmaceutical composition of claim 22, further comprising a small molecule anti-viral drug.

24. The pharmaceutical composition of claim 23, wherein the small molecule anti-viral drug is acyclovir.

25. The pharmaceutical composition of claim 22, wherein the antibody or antigen-binding fragment is present in an amount effective for treating or preventing a disease or condition that is associated with an herpes simplex virus-2 (HSV-2) infection in a subject.

26. A method of activating antibody-dependent cellular cytotoxicity (ADCC) of a cell infected with herpes simplex virus-2 (HSV-2), comprising:
   contacting the cell with an isolated antibody or antigen-binding fragment according to claim 1, in an amount which effects ADCC of the cell.

27. The method of claim 26, wherein the cell is in a subject who is infected with HSV-2.

* * * * *